(12) United States Patent
Barnes

(10) Patent No.: US 8,414,839 B1
(45) Date of Patent: Apr. 9, 2013

(54) OZONE GENERATOR RETROFIT APPARATUS FOR JETTED TUBS, SPAS AND OTHER WATER CIRCULATION FACILITIES

(76) Inventor: Ronald L. Barnes, Owens Crossroads, AL (US)

( * ) Notice: Subject to any disclaimer, the term of this patent is extended or adjusted under 35 U.S.C. 154(b) by 0 days.

(21) Appl. No.: 12/931,008

(22) Filed: Jan. 21, 2011

Related U.S. Application Data

(60) Division of application No. 11/406,639, filed on Apr. 19, 2006, now Pat. No. 7,875,173, which is a continuation-in-part of application No. 11/305,975, filed on Dec. 19, 2005, now abandoned, which is a continuation-in-part of application No. 11/284,290, filed on Nov. 21, 2005, now abandoned, which is a continuation-in-part of application No. 11/190,186, filed on Jul. 26, 2005, now abandoned, and a continuation-in-part of application No. 11/165,953, filed on Jun. 24, 2005, now abandoned, which is a continuation-in-part of application No. 11/137,890, filed on May 26, 2005, now Pat. No. 7,329,343, which is a continuation-in-part of application No. 10/827,708, filed on Apr. 20, 2004, now Pat. No. 7,060,180, which is a continuation-in-part of application No. 10/061,752, filed on Feb. 1, 2002, now Pat. No. 6,723,233, which is a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,324,154, said application No. 10/827,708 is a continuation-in-part of application No. 09/794,601, filed on Feb. 27, 2001, now abandoned, which is a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, said application No. 09/794,601 is a continuation-in-part of application No. 09/393,437, filed on Sep. 10, 1999, now Pat. No. 6,192,911, said application No. 10/827,708 is a continuation-in-part of application No. 09/520,504, filed on Mar. 8, 2000, now Pat. No. 6,405,387, and a continuation-in-part of application No. 09/717,904, filed on Nov. 20, 2000, now Pat. No. 6,426,053, said application No. 11/284,290 is a continuation-in-part of application No. 10/176,299, filed on Jun. 20, 2002, now Pat. No. 6,967,008, which is a continuation-in-part of application No. 09/717,903, filed on Nov. 20, 2000, now Pat. No. 6, (Continued)

(51) Int. Cl.
*B01J 19/08* (2006.01)
(52) U.S. Cl.
USPC .................................................. 422/186.12
(58) Field of Classification Search .............. 422/186.12
See application file for complete search history.

(56) References Cited

U.S. PATENT DOCUMENTS 7,060,180 B1 * 6/2006 Barnes ..................... 210/167.11
7,186,334 B1 * 3/2007 Barnes .......................... 210/192

*Primary Examiner* — Kishor Mayekar
(74) *Attorney, Agent, or Firm* — Mark Clodfelter

(57) ABSTRACT

Retrofit apparatus for retrofitting an ozone generator to a spa, hot tub, recreational fountain, or similar facility, and a method for treating biofilms therein, are disclosed. Fittings inserted into water and air circulating lines associated with such water holding facilities, and covers provided over inlets, generally inject, retain, and concentrate ozonated gas in such lines, especially while they are not filled with water. In some embodiments, an ozone-providing plug is provided to at least one water outlet of a spa or hot tub, with other outlets being blocked. In some embodiments, covers for suction inlets, and plugs for water jets, have features to provide ozone to water circulation lines when not filled with water as well as when the tub is filled and water is circulating. In some embodiments, plugs for water jets are ejected and subsequently provide ozone to water circulating in a tub.

9 Claims, 25 Drawing Sheets

Related U.S. Application Data 428,756, said application No. 11/165,953 is a continuation-in-part of application No. 11/034,115, filed on Jan. 12, 2005, now abandoned, which is a continuation-in-part of application No. 10/923,906, filed on Aug. 23, 2004, now Pat. No. 7,658,891, which is a continuation-in-part of application No. 10/208,897, filed on Jul. 30, 2002, now Pat. No. 6,951,633, which is a continuation-in-part of application No. 09/717,904, filed on Nov. 10, 2000, now Pat. No. 6,426,053, said application No. 10/923,906 is a continuation-in-part of application No. 10/867,860, filed on Jun. 15, 2004, now abandoned, which is a continuation-in-part of application No. 09/197,036, filed on Nov. 21, 1998, now Pat. No. 6,893, 610.

(60) Provisional application No. 60/633,107, filed on Dec. 3, 2004, provisional application No. 60/166,255, filed on Nov. 18, 1999, provisional application No. 60/166,254, filed on Nov. 18, 1999, provisional application No. 60/166,255, filed on Nov. 18, 1999, provisional application No. 60/066,119, filed on Nov. 21, 1997.

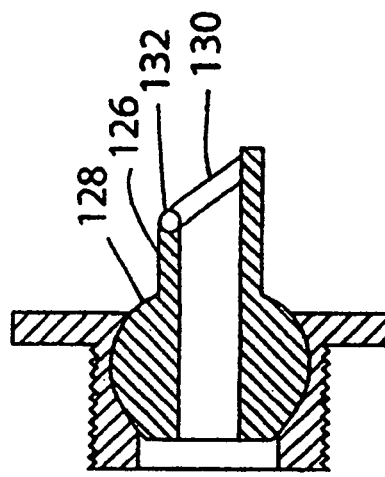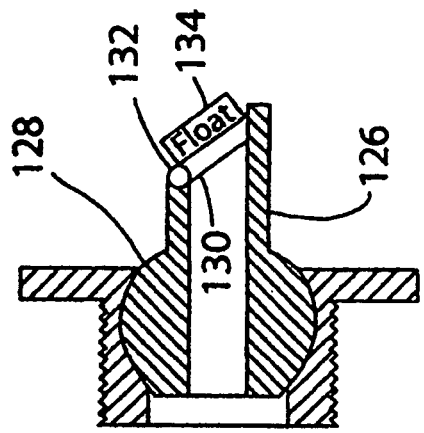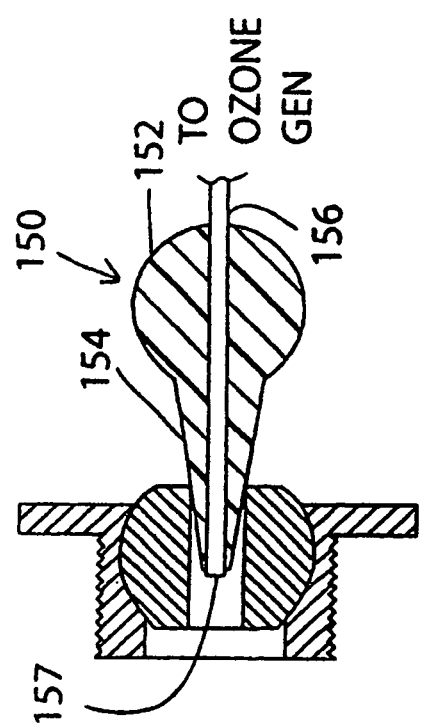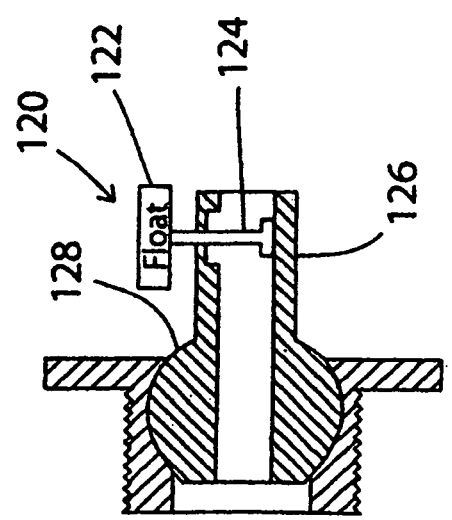

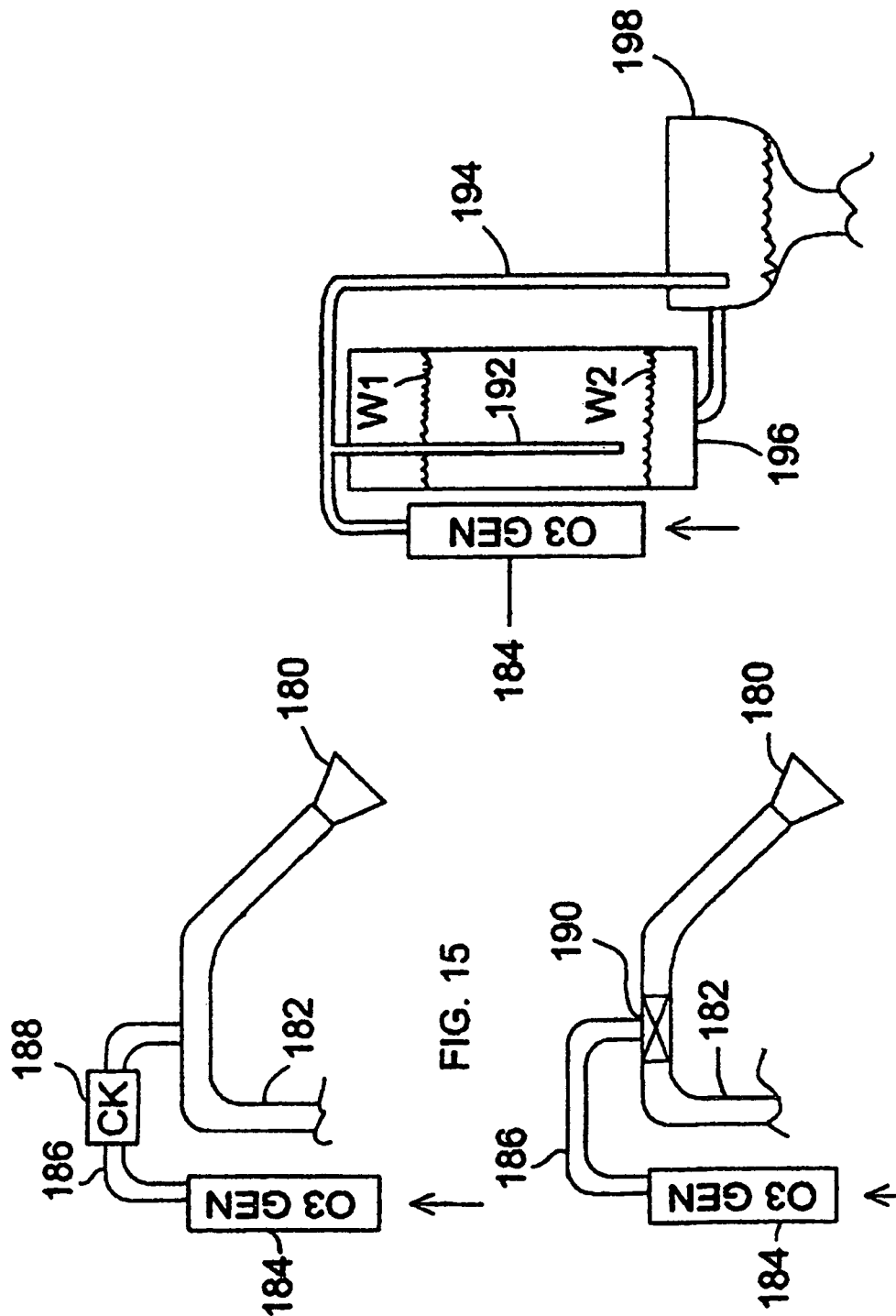

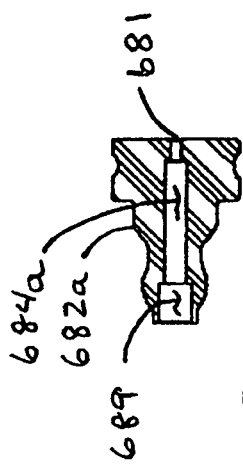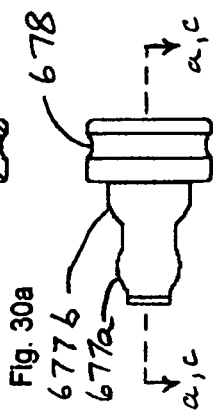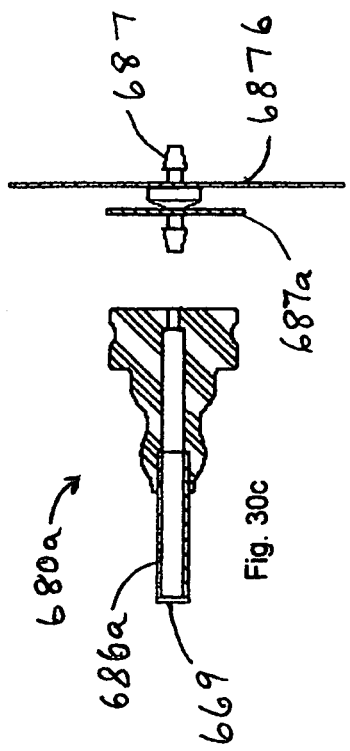

OZONE GENERATOR RETROFIT APPARATUS FOR JETTED TUBS, SPAS AND OTHER WATER CIRCULATION FACILITIES

CROSS REFERENCE TO RELATED APPLICATIONS

This application is a divisional application of Applicant's U.S. application Ser. No. 11/406,639, filed Apr. 4, 2006, now U.S. Pat. No. 7,875,173, which is a continuation-in-part no. of Applicant's U.S. patent application Ser. No. 11/305,975, filed Dec. 19, 2005, now abandoned, which is a continuation-in-part of Applicant's U.S. patent application Ser. No. 11/284,290, filed Nov. 21, 2005, now abandoned, which is a continuation-in-part of Applicant's U.S. patent application Ser. No. 11/190,186, filed Jul. 26, 2005, now abandoned, which claimed the benefit of Applicant's provisional U.S. patent application No. 60/633,107, filed Dec. 3, 2004, now expired, and which is a continuation-in-part of Applicants U.S. patent application Ser. No. 11/165,953, filed Jun. 24, 2005, now abandoned, which is a continuation-in-part of Applicant's U.S. patent application Ser. No. 11/137,890, filed May 26, 2005, now U.S. Pat. No. 7,329,343, issued Feb. 12, 2008, which is a continuation-in-part of Applicant's U.S. patent application Ser. No. 10/827,708, filed Apr. 20, 2004, now U.S. Pat. No. 7,060,180, issued on Jun. 13, 2006, which is a continuation-in-part of Applicant's U.S. patent application Ser. No. 10/061,752, filed Feb. 1, 2002, now U.S. Pat. No. 6,723,233 issued on Oct. 7, 2008, which is a continuation-in-part of Applicant's U.S. patent application Ser. No. 09/752,982, filed Dec. 31, 2000, now U.S. Pat. No. 6,623,635, which is a continuation-in-part of Applicant's U.S. patent application Ser. No. 09/418,915, filed Oct. 15, 1999, now U.S. Pat. No. 6,324,154. Application Ser. No. 10/827,708, now U.S. Pat. No. 7,060,180 issued on Jun. 13, 2006, is also a continuation-in-part of Applicant's U.S. patent application Ser. No. 09/794,601, filed Feb. 27, 2001, now abandoned, which is a continuation-in-part of Applicant's U.S. patent application Ser. No. 09/752,982, filed Dec. 31, 2000, now U.S. Pat. No. 6,623,635, issued Sep. 23, 2003, which is a continuation-in-part of Applicant's U.S. patent application Ser. No. 09/418,915, filed Oct. 15, 1999, now U.S. Pat. No. 6,342,154, issued Jan. 29, 2002. Application Ser. No. 09/794,601 is also a continuation-in-part of Applicant's U.S. patent application Ser. No. 09/393,437, filed Sep. 10, 1999, now U.S. Pat. No. 6,192,911, issued Feb. 27, 2001. Application Ser. No. 10/827,708 is also a continuation-in-part of Applicant's U.S. patent application Ser. No. 09/520,504, filed Mar. 8, 2000, now U.S. Pat. No. 6,405,387, issued Jun. 18, 2002, and application Ser. No. 10/827,708 is also a continuation-in-part of Applicant's U.S. patent application Ser. No. 09/717,904, filed Nov. 20, 2000, now U.S. Pat. No. 6,426,053, issued Jul. 30, 2002, which claimed the benefit of Applicant's U.S. provisional application No. 60/166,255, filed Nov. 18, 1999, now expired. Application Ser. No. 11/284,290, now abandoned, is also a continuation-in-part of Applicant's U.S. patent application Ser. No. 10/176,299, filed Jun. 2, 2002, now U.S. Pat. No. 6,967,008, issued on Nov. 22, 2005, which is a continuation-in-part of Applicant's U.S. patent application Ser. No. 09/717,903, filed Nov. 20, 2000, now U.S. Pat. No. 6,428,756, issued Aug. 6, 2002, which claimed the benefit of Applicant's U.S. provisional application No. 60/166,254, filed Nov. 18, 1999, now expired.

Applicant's U.S. patent application Ser. No. 11/165,953 is also a continuation-in-part of Applicant's U.S. patent application Ser. No. 11/034,115, filed Jan. 12, 2005, now abandoned, and which is a continuation-in-part of Applicant's U.S. patent application Ser. No. 10/923,906, filed Aug. 23, 2004, now U.S. Pat. No. 7,658,891, issued Jan. 20, 2010, which is a continuation-in-part of Applicant's U.S. patent application Ser. No. 10/208,897, filed Jul. 30, 2002, now U.S. Pat. No. 6,951,633, issued Oct. 4, 2005, which is a continuation-in-part of Applicant's U.S. patent application Ser. No. 09/717,904, filed Nov. 10, 2000, now U.S. Pat. No. 6,426,053, issued Jul. 30, 2002, which claimed the benefit of Applicant's provisional U.S. patent application No. 60/166,255, filed Nov. 18, 1999, now expired. Application Ser. No. 10/923,906, filed Aug. 23, 2004, now U.S. Pat. No. 7,658,891 is also a continuation-in-part of Applicant's U.S. patent application Ser. No. 10/867,860, filed Jun. 15, 2004, now abandoned, which is a continuation-in-part of Applicant's U.S. patent application Ser. No. 09/197,036, filed Nov. 21, 1998, now U.S. Pat. No. 6,893,610, issued May 17, 2005, which claimed the benefit of Applicant's U.S. provisional application No. 60/066,119, filed Nov. 24, 1997, now expired.

FIELD OF THE INVENTION

This invention relates generally to addition of ozone to treat contaminants in ventilation and circulation lines and passageways of water holding facilities, and water held therein, and particularly to various configurations of ozone generation and delivery systems for treating biofilms, bioslimes, and other contaminants in water holding facilities and associated plumbing for water and air passageways, including immersion facilities such as hot tubs, spas, jetted bathtubs, and swimming pools, as well as decorative and recreational fountains, and the like.

BACKGROUND OF THE INVENTION

Hot tubs, spas, whirlpool bathtubs, whirlpool baths such as found in hospitals, nursing homes and rehabilitation facilities, and some swimming or wading pools, all of which generally being designated herein as immersion facilities, include water circulation lines and at least one pump that cooperate to circulate water between a water intake and jets positioned under the water level of the tub, spa or bath.

Generally, recreational or decorative fountains also circulate jetted water, which may be collected through drains into a holding tank, or which may fall into a decorative reservoir, between an intake in such holding tank or reservoir and jets or nozzles positioned so as to direct a stream or spray of water into the air. Recreational fountains include pop-up fountains or other fountains wherein children run through or otherwise play in water emitted therefrom. Since children, sometimes including toddlers still in diapers, or adults may play or wade in, and possibly ingest water from, either recreational or decorative fountains, it is desirable that water contained or recirculated therein be kept free of contaminants, particularly including pathogens such as cryptosporidia and the like which may cause harmful or even fatal infections of humans or other animals exposed to such water. There have been media reports that children have become severely ill from exposure to such pathogens which infect, survive, and multiply in recreational, pop-up, run-through fountains now found in many municipal and theme parks. Due to poor water quality in some areas, or because of contamination due to breaks or construction involving supply lines, it may also be desirable to treat water from a municipal water supply or other source with ozone even before initial use for bathing or other purposes in a water holding facility to kill pathogens and/or precipitate other contaminants. Such ozone treatments may be used in conjunction with other conventional sanitizing and sterilization techniques.

In many immersion facilities, air from an adjustable air valve or other ventilating system is mixed with the water circulated through jets or nozzles to increase impingement thereof on the body and skin of the user to promote muscle relaxation. In some hot tubs, spas, whirlpool baths, and similar facilities, injection of air into water contained within such immersion tubs or similar vessels, and into streams and jets of water flowing through plumbing, pumps, nozzles, and the like associated therewith, is enhanced by use of blowers, air pumps, or other air circulation or ventilating systems that are able to deliver significant quantities of air, e.g., up to 80 cfm, more or less, at pressures sufficient to overcome static or dynamic water pressure at a point of injection. For example, some tubs or other immersion vessels, in addition to mixing air into jets of water emitted typically from nozzles positioned around a periphery of a tub or other vessel, include a ventilating system and air jets or screened or porous openings incorporated into a bottom of a tub or other immersion vessel that emit air bubbles that impinge upon a user therein for therapeutic or relaxing benefit.

A problem with hot tubs and spas, other jetted bathing tubs, pools, fountains, or other water holding facilities, including recreational or decorative fountains, wherein water is kept over a period of time and reused is that if sanitizer levels are allowed to fluctuate then all manner of amoebas, bacteria, fungi, viruses, algae and other microbiota thrive on organic compounds present in the water. Harmful species of bacteria may also grow, such as *listeria monocytogenes*, which can cause pneumonia, meningitis and septisemia, and *pseudomonas aeruginosa*, which is responsible for pneumonia and skin rashes. While various strains of *listeria* may be eliminated by sanitizers and use of disinfectants, *pseudomonas aeruginosa* is a particularly resistant organism that defies most common sanitizers and antibiotics, and can grow at temperatures up to 42 degrees Celsius. *Pseudomonas* prefers moist and humid environments, and can survive even in distilled water. Worse yet, *Legionella pneumophilia*, the bacteria responsible for Legionnnaires disease, colonizes in amoebas that thrive in spas, hot tubs and jetted tubs, as well as showers, air conditioning evaporative cooling towers and other constantly wet or humid places. It is estimated that Legionnaires disease affects between 10,000-20,000 people per year, with a fatality rate of 5%-15% or more. Thousands more are probably infected, but are not severely sickened by the disease, developing only minor illness from the infections.

In addition to the foregoing, it is generally impossible to physically clean the interior of water and air-conveying tubes of the tub or spa as with the exposed surfaces thereof. As such, a "biofilm," also called a "bioslime" herein and in some literature, of algae, fungus and a variety of bacterial colonies builds up on these interior surfaces of the tubes that is not removed by shocking the water and is not penetrated by sanitizer. As a result, a shocked immersion facility is immediately re-inoculated with bacteria, spores, or other pathogens from the bioslime upon refilling with fresh water.

As noted earlier herein with respect to decorative fountains, pop-up fountains, and other recreational fountains, water is generally captured directly in a reservoir or by gravity flow through drains and underground drain lines into a holding tank. Captured water is then recirculated by pumps or other means to jets through pressurizable distribution lines and other plumbing associated with a given fountain or fountain facility, which may include control valves to provide changes in water flow to selected nozzles to enhance decorative or recreational effects. Water is then typically released from these distribution lines in pulses or streams through fountain nozzles by valves, booster pumps, or other means. Some decorative or recreational fountain facilities are operated for a number or hours during daylight or early evening hours, then left dormant for a number of hours through the night, thereby enhancing opportunities for growth of biofilms, but also providing an opportunity, using apparatus and methods disclosed herein, to better treat biofilms and other contaminants. Wastes and other impurities that enter reservoirs or drains returning fountain water to a collection or holding tank further lead to contamination of water recirculated in such facilities and to conditions that promote growth of biofilms or other impurities within plumbing associated with such facilities. Thus, even where water in a collection reservoir is drained and replaced frequently with fresh water, biofilms and other contaminants in facility plumbing lines may quickly re-contaminate such fresh water.

Accordingly, there is a need, and as one object of the instant invention, to better sanitize hot tubs, spas, and all manner of jetted tubs, as well as decorative and recreational fountain facilities, to eliminate the above mentioned and other disease-causing organisms that live and grow in the water and air-carrying tubes of these tubs, spas, and other water holding facilities. The term water holding facilities, as used herein and in claims attached hereto, refers to and includes immersion facilities noted above as well as recreational or decorative fountains wherein contaminants may accumulate or multiply, including biofilms or bioslimes, which pose a threat to humans or other animals exposed to water therein or therefrom.

It is another object of the invention to provide apparatus and methods to enable convenient implementation, particularly in a retrofit installation, of treatment methods, including multi-phase treatment methods (described below), to oxidize and remove bioslimes and other organic contaminants in the water and air-conveying tubes of jetted tubs, spas, and fountains. It is yet another object of the invention to provide apparatus for retrofitting jetted tubs, spas, and fountains with an ozone generator communicating with water and air-carrying tubes of the system. In some embodiments, closed loop systems are disclosed that may be retrofitted or be installed during manufacture in order to prevent bubbles containing ozone from being returned to the immersion facility, these being particularly suitable for indoor use. Significantly, some of these systems are closed loop systems wherein bubbles that may contain ozone are prevented from being passed to the immersion facility. However, in other systems, bubbles containing ozone are intentionally released within plumbing and within water held within an immersion or reservoir portion of a facility in order to aid in treating chemical or biological contaminants in water held or circulated therein, and bioslimes or other deposits of contaminants that may develop within or upon pipes, pumps, and other assets associated with an immersion or fountain facility. In such embodiments, the use of injector or diffuser elements that produce small bubbles helps insure that most ozone is absorbed in the water, with little release of ozone into the air in an indoor immersion or other water holding facility.

In Applicant's prior patent application Ser. No. 09/197, 036, which is hereby incorporated herein by reference in its entirety, filed Nov. 21, 1998, now U.S. Pat. No. 6,893,610, Applicant disclosed that an ability of ozone to break down long organic chains may be exploited to break down such contaminants adhering to walls of a ventilating system. Apparatus and a method for exploiting ozone in treating bioslimes within air and water passageways associated with jetted bathing facilities were disclosed in Applicant's application Ser. No. 09/520,504, hereby incorporated herein by reference in its entirety, filed Mar. 8, 2000, now U.S. Pat. No. 6,405,387. Apparatus disclosed herein are beneficial in helping extend application of this treatment method to break down and destroy long organic chains, including organics in biofilms, associated with ventilating system lines and other air passageways and plumbing and ventilating components associated with hot tubs, spas, and other water holding facilities. In Applicant's pending U.S. patent application Ser. No. 10/867,860, hereby incorporated herein by reference in its entirety, Applicant further disclosed how hydroxyl radicals and other ozonites produced by ozone generating ultraviolet lamps and ultraviolet destroying lamps, may be enhanced and controlled to a degree to increase effectiveness of treatment of contaminants, including biological contaminants.

It is another object of the invention to provide methods and apparatus for treating biofilms/bioslimes in a dry or moist state, when not covered with water (e.g., as in a drained water circulating line before an immersion facility is refilled with water for use), with a gas mixture including ozone in a gaseous state. It is another object of the invention to also provide convenient methods and apparatus for two-phase or multiphase treatment of biofilms/bioslimes in both dry/moist states and in wet states, a wet state being when such biofilms/bioslimes are fully immersed in water, or nearly so. Such multi-phase treatments employ gaseous ozone in a gas mixture to treat biofilms/bioslimes in a dry/moist state, and employ ozone dissolved in water to treat biofilms/bioslimes when immersed in water. It is thought that different susceptibilities and interaction mechanisms occur in the different states, which can be exploited in a multi-phase treatment methodology. For example, a multi-phase treatment methodology may comprise treating dry or moist biofilms with ozone in a gas mixture and subsequently treating the same biofilms when wet, i.e., covered with water, with ozone dissolved in such water, possibly also followed by another exposure to ozone gas of the biofilms just after water has been drained or otherwise emptied from a water circulation line, pipe, duct, or other passageway or surface (e.g., as a hot tub or whirlpool bathtub is being drained or just after draining) and is no longer covering the biofilm. In order to kill the cells in a bioslime, penetration into a biofilm/bioslime may be more important than just concentration of ozone. Single cell organisms may be lysed by a single ozone molecule. Ozone molecules in a gas have a much higher mean velocity than ozone molecules absorbed in water or another liquid and are thus able to penetrate deeper into the biofilm/bioslime than ozone molecules in a liquid. Additionally, when a biofilm/bioslime is dry, or only slightly moist, cracks or fissures may open in outer surfaces of the biofilm/bioslime due to drying and shrinkage of cells at or near the surface, thereby exposing cells normally protected by surface cells to direct attack by ozone molecules in a gas, and also creating more surface area that may be attacked directly by gaseous ozone. Furthermore, biofilms/bioslimes act as a semi-permeable membrane selectively passing ozone and ozone will then further break down the polysaccharide bonding material between cells in the biofilm/bioslime and further decompose structural strength of the biofilm/bioslime so that cells, or clumps of cells, formerly in the biofilm/bioslime, may be swept away by moving air or water. Alternately applying ozone in a gaseous state, then in a liquid absorbed state, further stresses the biofilm/bioslime, killing cells therein and weakening bonds so that components of the biofilm/bioslime may float away or be removed by motion of a fluid (i.e., gas or liquid) flowing by a thus weakened biofilm/bioslime. Applying ozone gas to a moist biofilm, just after water has been removed, further exploits the penetration capability of gaseous ozone when the biofilm is more active and expanded, and potentially more susceptible to damage by ozone. Applying ozone gas in higher concentrations, e.g., on the order of 100 ppm and higher, using techniques disclosed herein, has an advantage of destroying biofilms/bioslimes faster and apparatus and methods disclosed herein provide for controlling or reducing off-gassing or other release of ozone into air in a room containing a jetted tub or other bathing facility. Present day ozone producing vacuum ultraviolet lamps produce more ozone due to improved transmission of 185 nm wavelength radiation from the mercury vapor plasma in such lamps. However, features of the instant invention provide for control of air flow rates and time on to provide for intentionally limiting production or concentration of ozone. Other features control release of ozone into room air by blocking escape of ozone from air or water passageways, or by generating smaller bubbles of gas containing ozone, thereby improving absorption of ozone into water in a tub or flowing through a passageway. Accordingly, other systems, particularly retrofit systems, are also disclosed wherein one or more injectors used to emit ozone in a gas mixture into dry lines of a facility (i.e., before water is pumped into such lines), to treat biofilms, are subsequently used to continue to emit bubbles containing ozone into water in an immersion tub to enhance treatment of such water and other portions of a facility. Devices and treatment methods disclosed herein may also be used in numerous other applications where water standing in a line may promote growth of biofilms or bioslimes that may contaminate or recontaminate water flowing therethrough with harmful pathogens. Such other applications may include, for example, spray misters used in grocery stores to keep vegetables moist and fresh, or even lawn sprinkler systems. Such applications also include treating contaminants in water lines and ice containers in ice making or ice vending machines (e.g., such as associated with beverage dispensers in quick-stop service stations/grocery stores). Additional objects of the invention will become clear upon a reading of the following specification.

BRIEF DESCRIPTIONS OF THE DRAWINGS

FIGS. 4-10 are various embodiments of flap valves covering tub jets of a jetted tub or spa.

FIG. 11 is one embodiment of a plug fitting for providing ozone to or from a jet of a jetted tub or spa.

FIGS. 15-16 diagrammatically illustrate an ozone generator in combination with a showerhead and associated plumbing.

FIG. 17 is a diagrammatic illustration of a toilet tank and associated bowl with an ozone generator providing ozone to both the tank and bowl.

Figure 18:
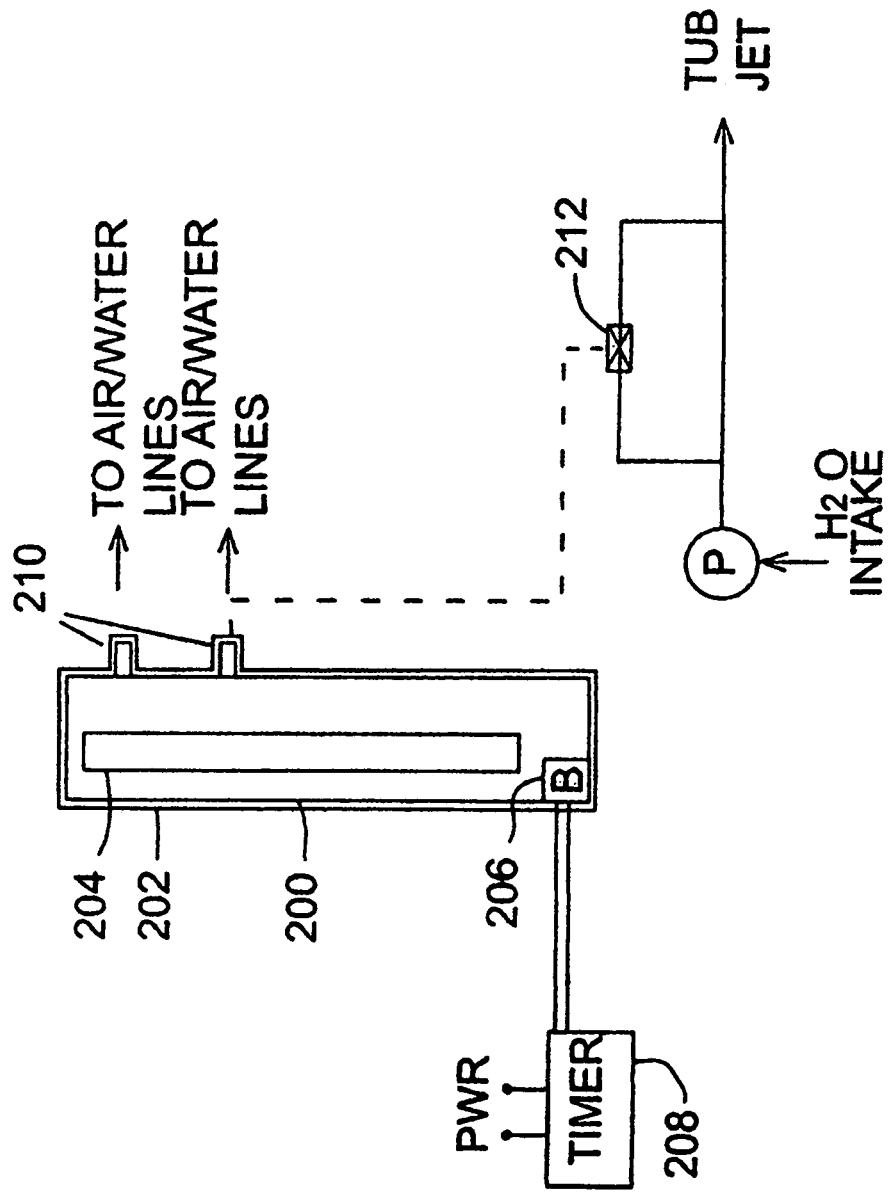

FIG. 18 is a diagrammatic illustration of an ozone generator coupled to an intake and at least one jet output of a jetted tub or spa.

Figure 19:
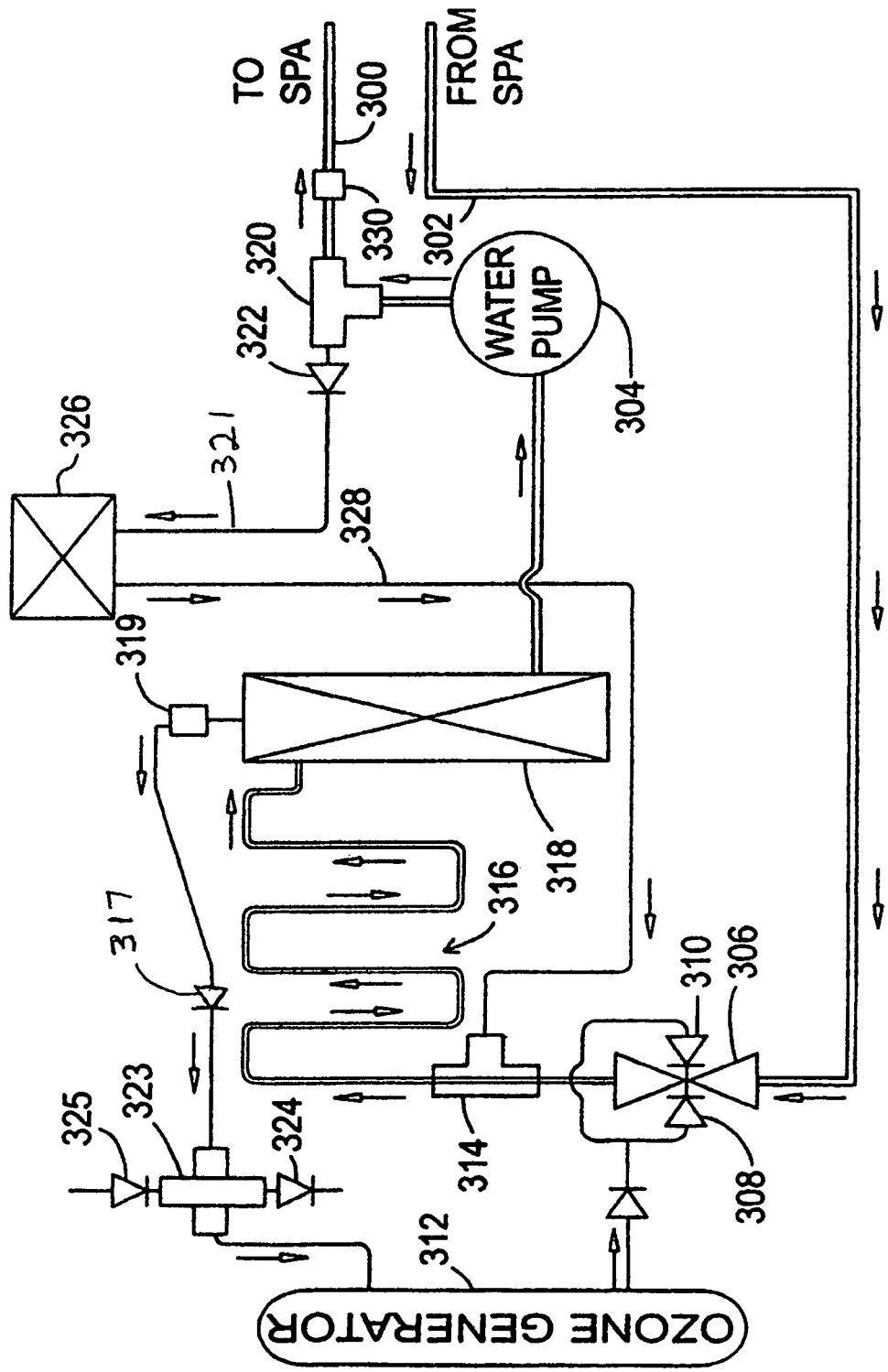

FIG. 19 is a schematic illustration of a stand-alone sanitizing system for a spa, hot tub, jetted tub or other similar recreational facility.

Figure 20:
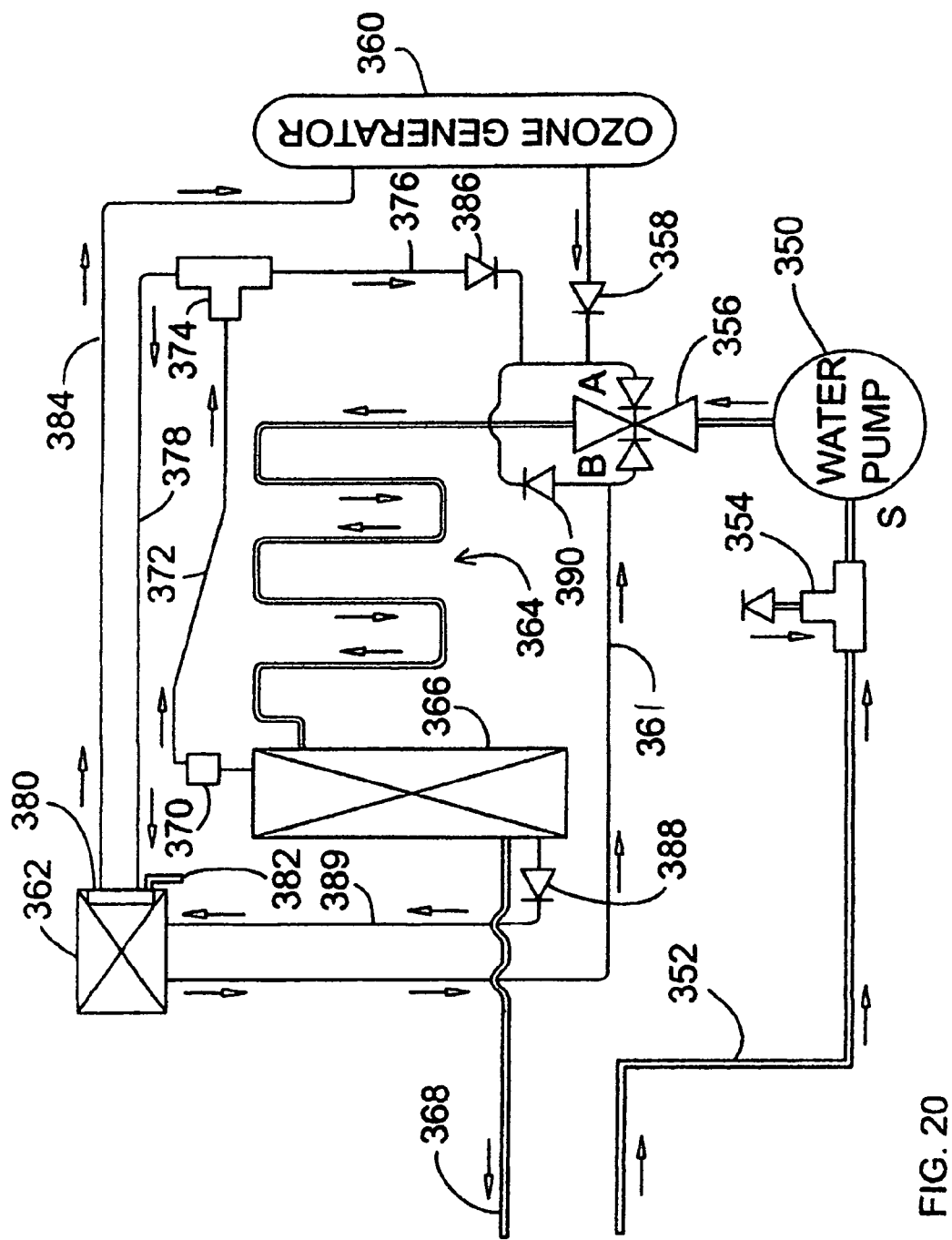

FIG. 20 is a schematic illustration similar to FIG. 19 of another embodiment of a stand-alone sanitizing system.

Figure 21:
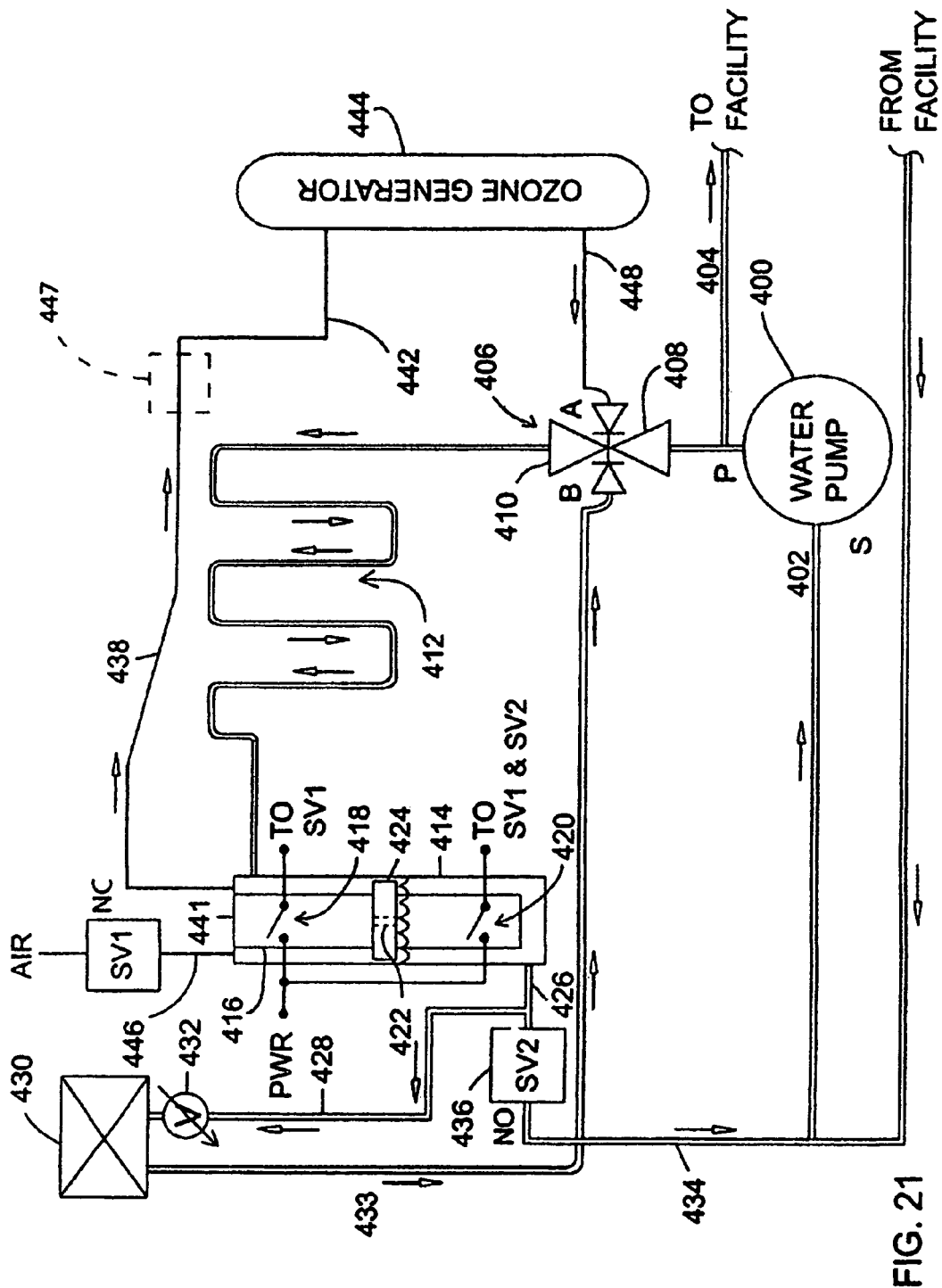

FIG. 21 is a schematic view of a closed loop system coupled in parallel with a flow of water to and from the immersion facility and wherein a combination of air and water is controlled.

Figure 22:
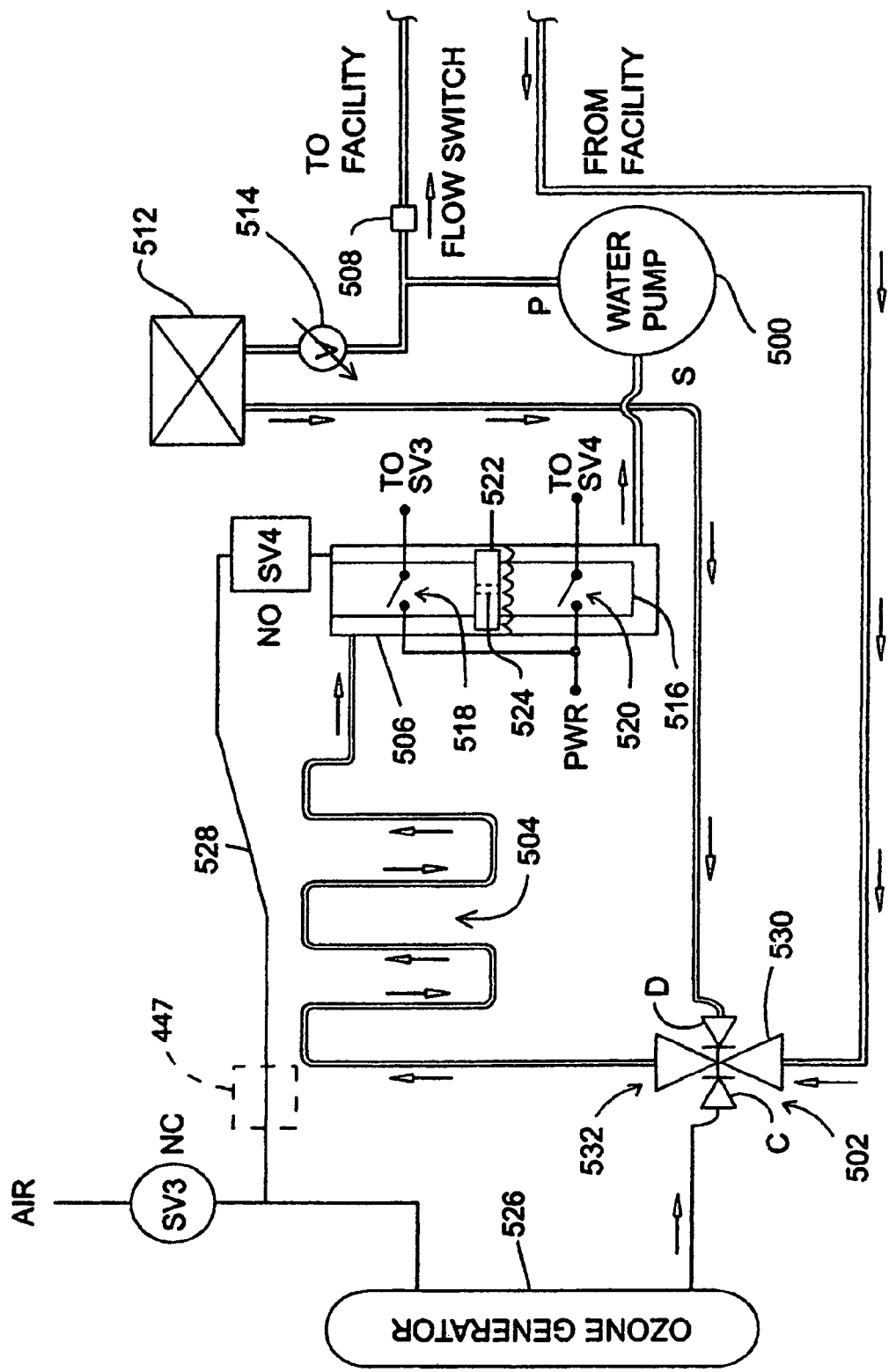

FIG. 22 is a schematic view of a closed loop system coupled in series with a flow of water to and from the immersion facility and wherein a flow of air is controlled.

Figure 23:
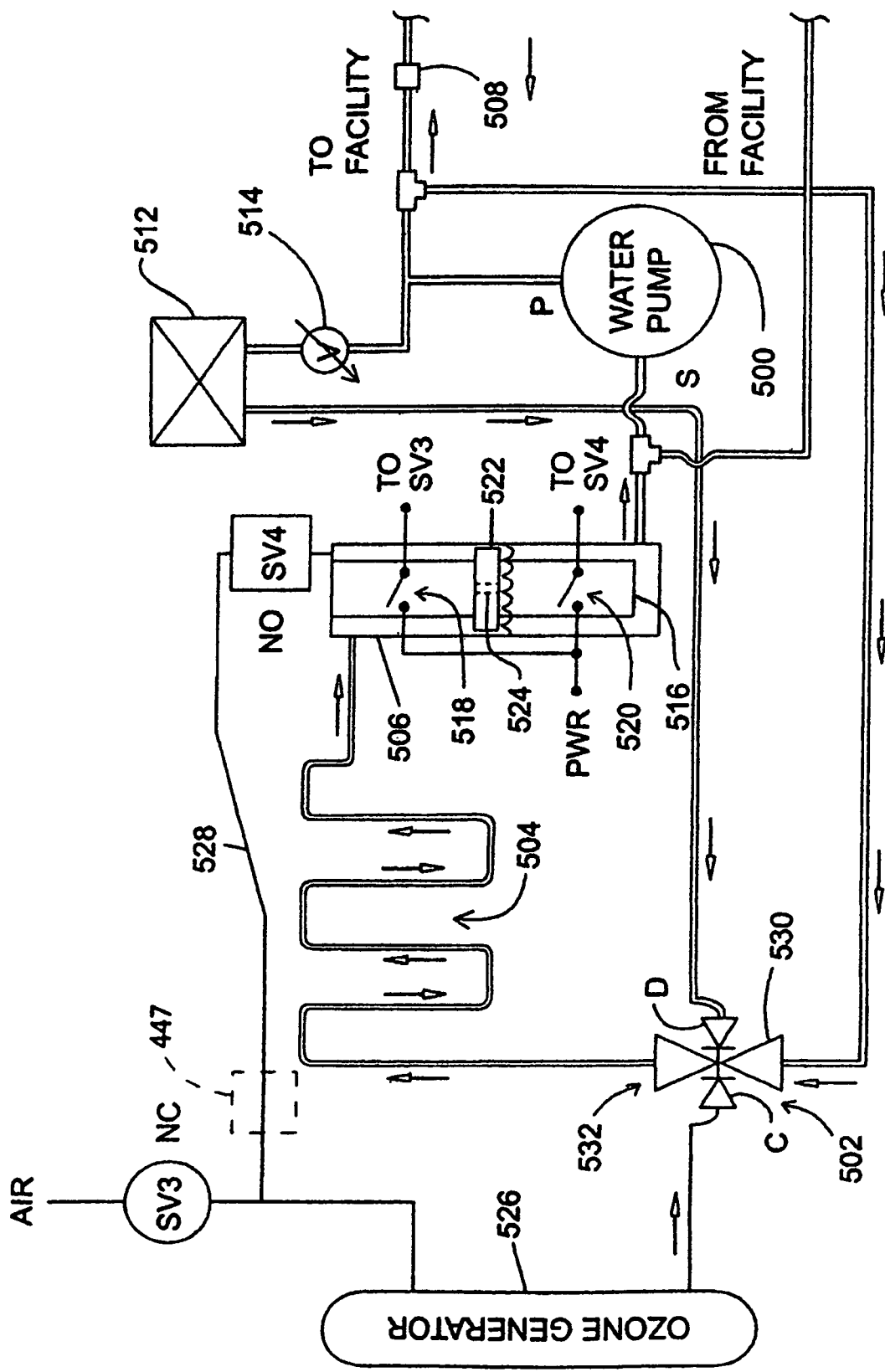

FIG. 23 is a schematic view of a closed loop system coupled in parallel with a flow of water to and from the immersion facility and wherein air is controlled.

Figure 24:
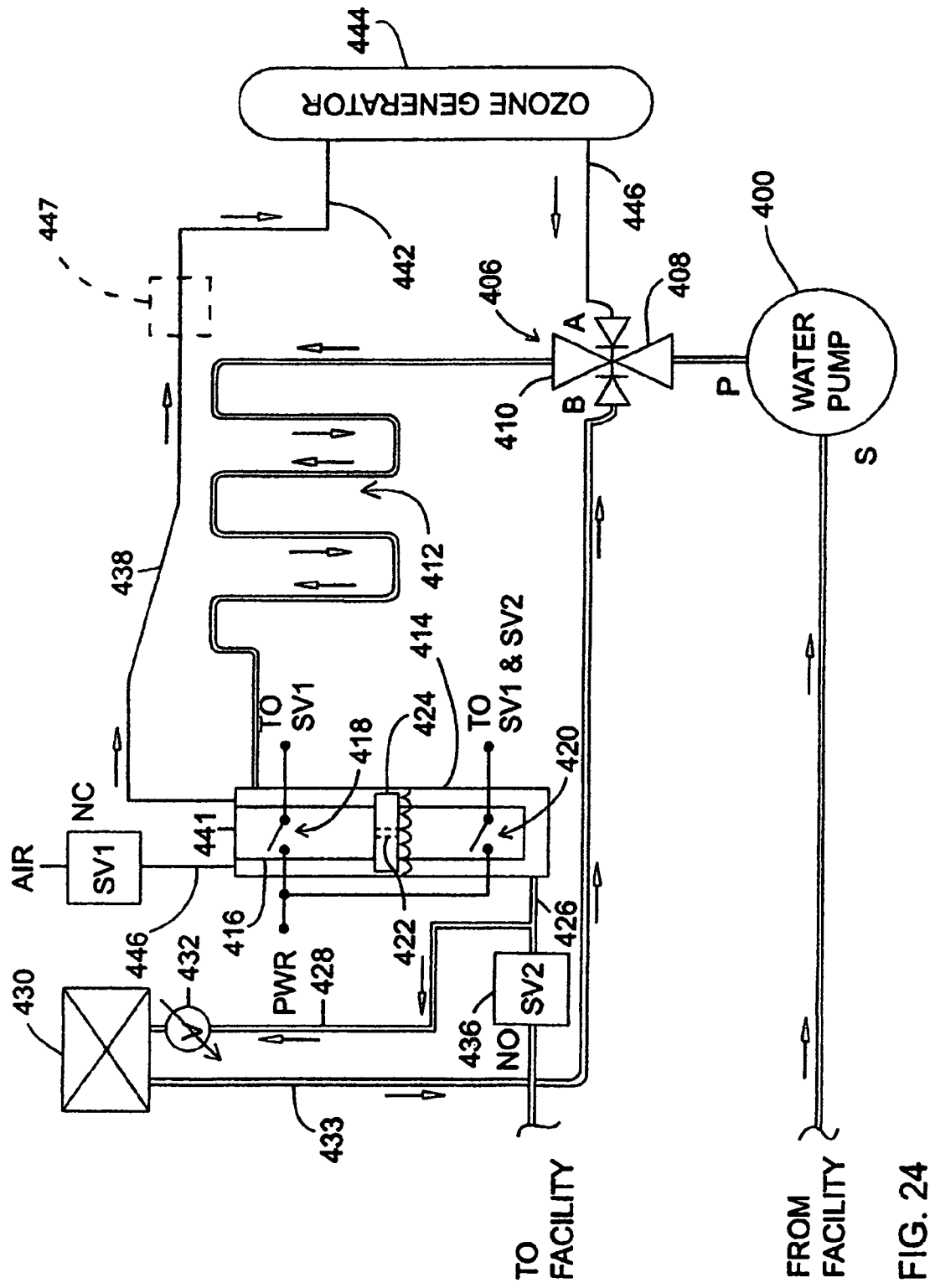

FIG. 24 is a schematic view of a closed loop system coupled in series with a flow of water to and from the immersion facility and wherein a combination of air and water is controlled.

Figures 25A, 25C:
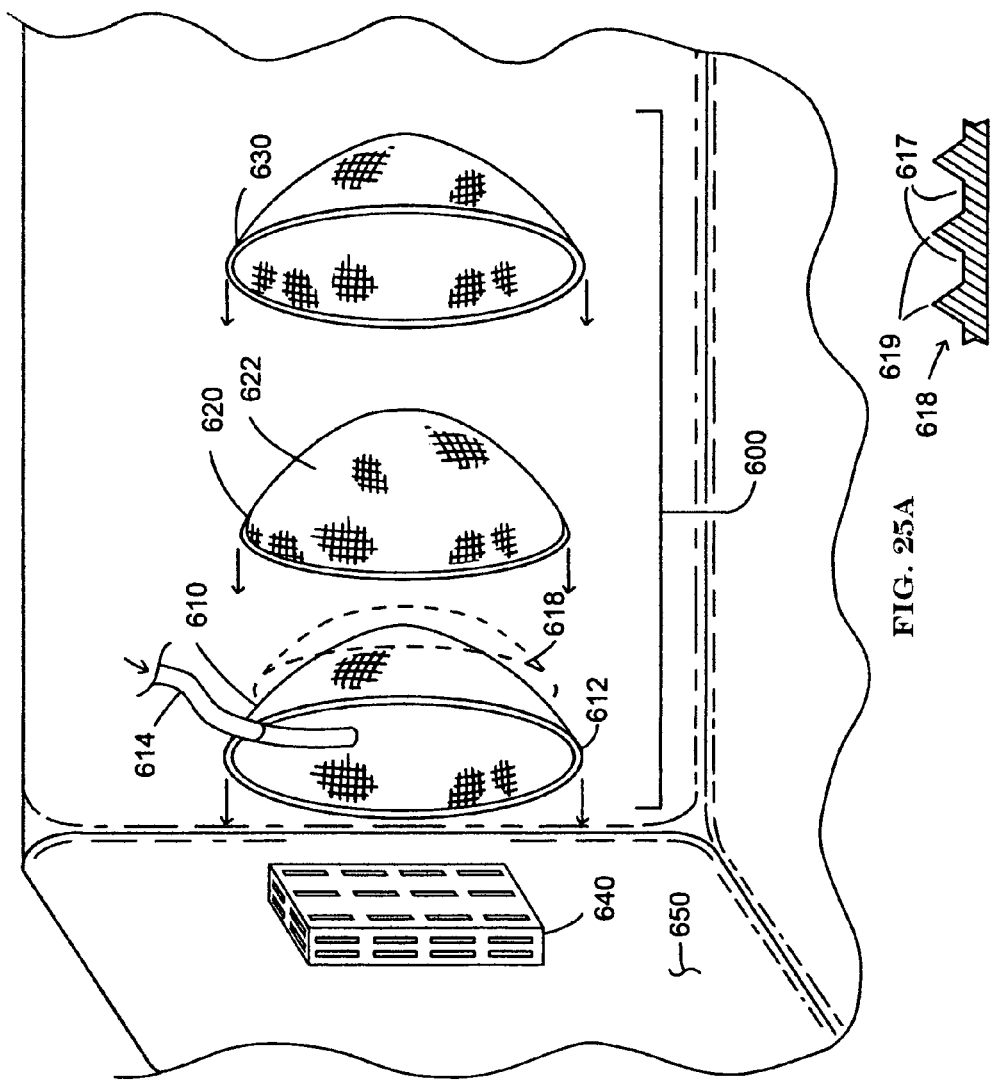

FIG. 25*a* illustrates components of a filter assembly that may be used to introduce ozonated gas into plumbing lines empty of water, then filter treated water when a circulation pump is activated.

Figure 25B:
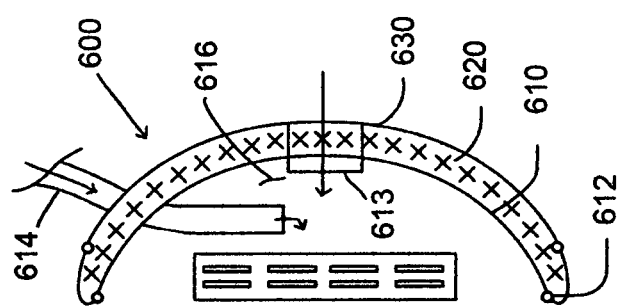

FIG. 25*b* provides a sectional view of a filter assembly installed over an inlet of a water circulation system of a jetted tub.

FIG. 25*c* is a sectional view of a layer of slitted resilient material that may be used to retard flow of a low pressure ozonated gas then permit flow of water at higher pressure differential.

Figure 26:
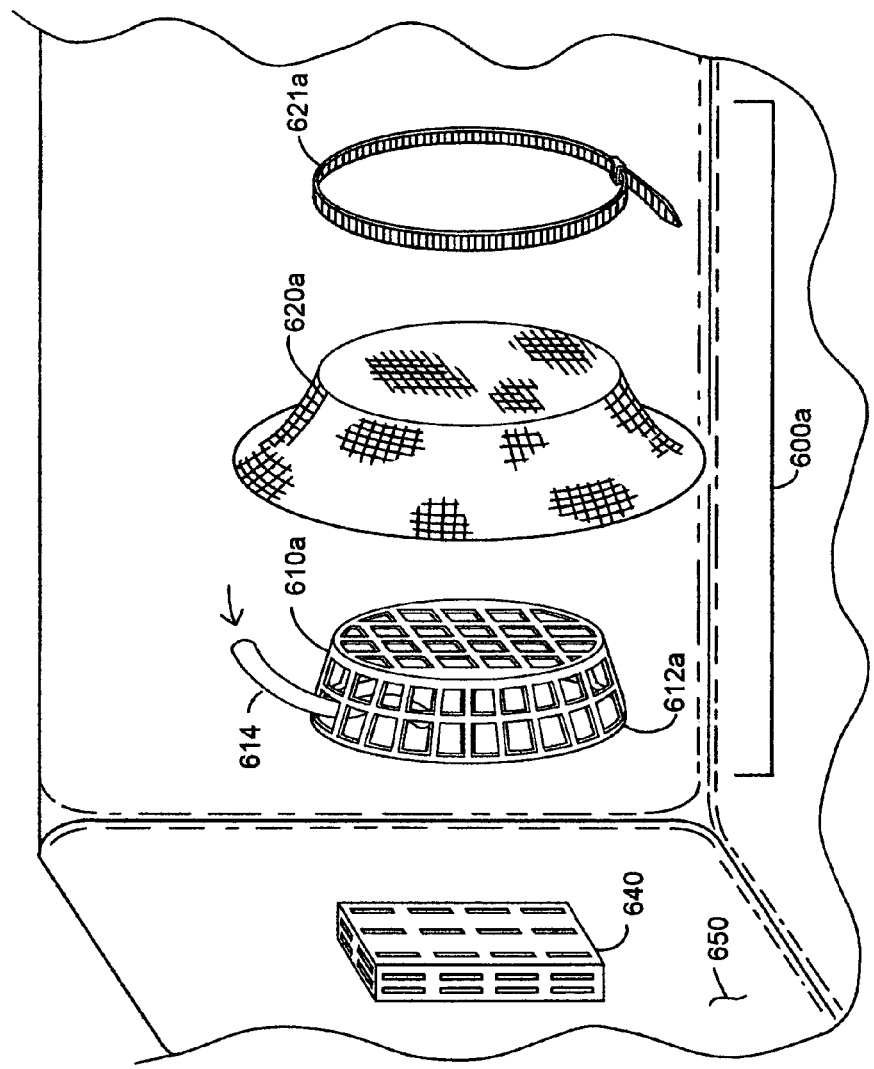

FIG. 26 illustrates components of a different embodiment of a filter assembly that may be used with the instant invention.

Figure 27:
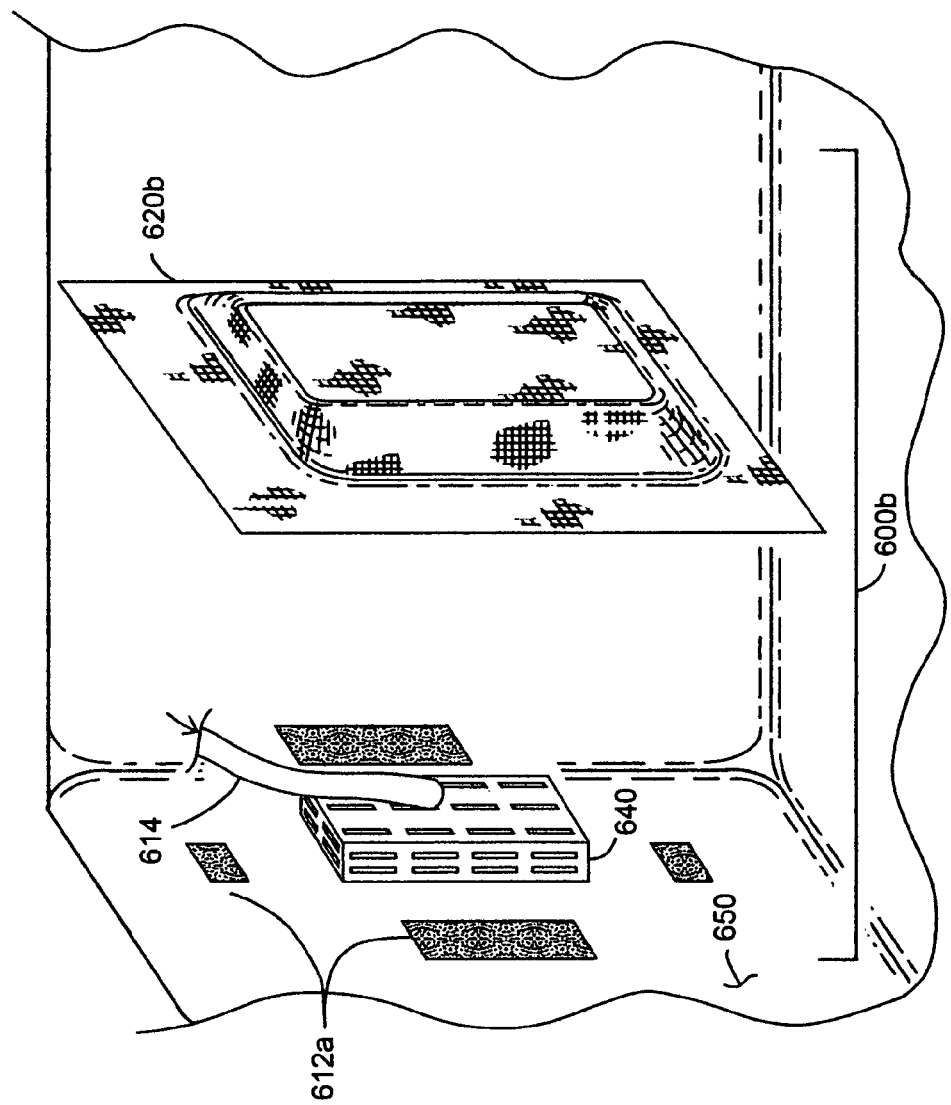

FIG. 27 illustrates another embodiment of a filter assembly that may be used with the instant invention.

Figure 28:
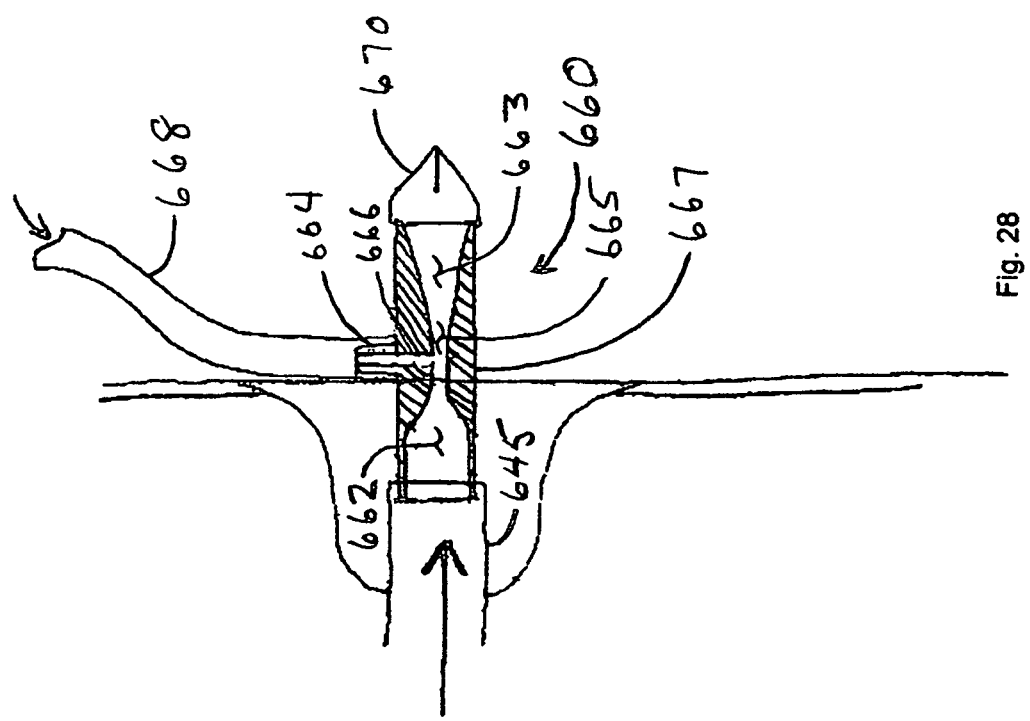

FIG. 28 is a sectional view of an ozone emitting and injection device that may be used to admit ozone to plumbing lines empty of water and then allow, and inject ozone into, a flow of water when a circulation pump is activated.

Figure 29:
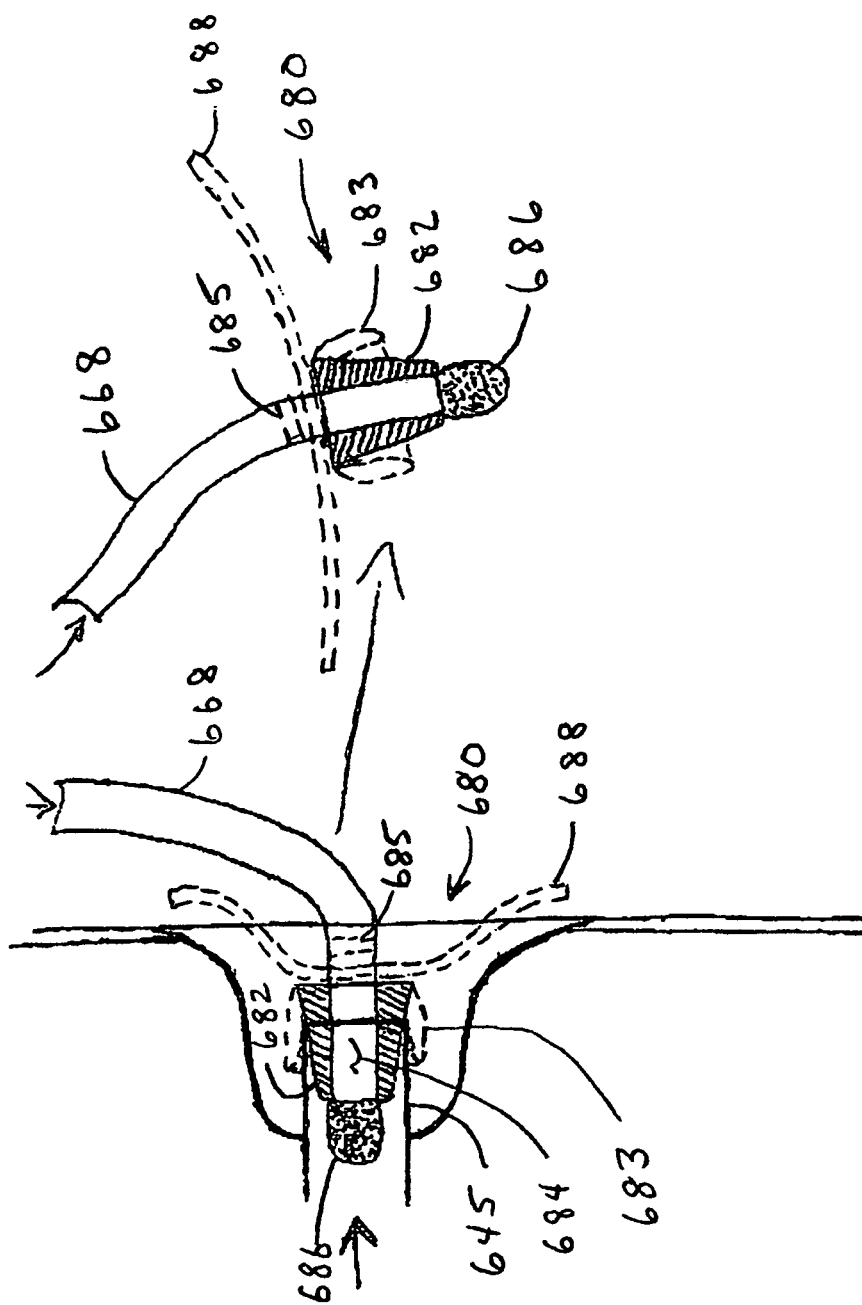

FIG. 29 is a sectional view of an ozone emitting device that may be used to emit ozone into plumbing lines empty of water and then be ejected and continue to emit ozone into water in a tub.

FIG. 30*a* is a sectional view of a molded plug that may be used in embodiments of an ozone emitting device.

FIG. 30*b* is an exterior view of the plug of FIG. 30*a*.

FIG. 30*c* is a sectional view of the plug of FIG. 30*a* wherein an ozone diffuser is inserted into a cavity.

FIG. 30*d* is an exterior view of a coupling fitting that may be used to attach an ozone supply hose to the plug of FIG. 30*c* with sectional views of optional weight and drag enhancement attachments that may be added thereto.

Figure 31C:
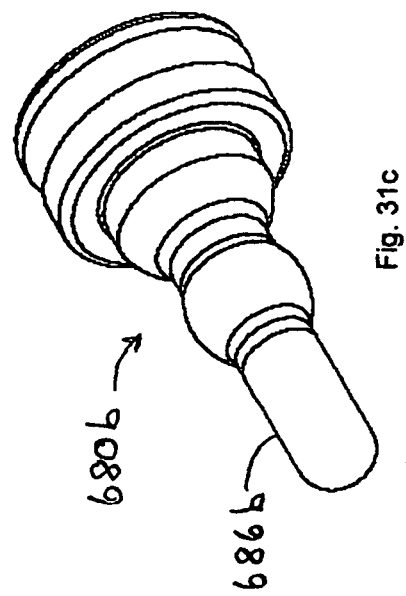
Figure 31A:
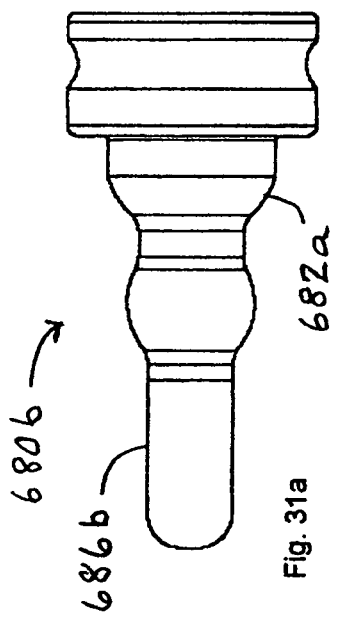

FIG. 31*a* is a view of a plug assembled with a different embodiment of a diffuser.

Figure 31B:
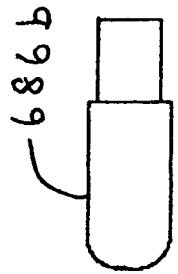

FIG. 31*b* is a view of a diffuser component that may be used with an ozone emitting device.

FIG. 31*c* is an isometric view of an assembled plug and diffuser of an ozone emitting device.

DETAILED DESCRIPTION OF THE DRAWINGS

Figure 1:
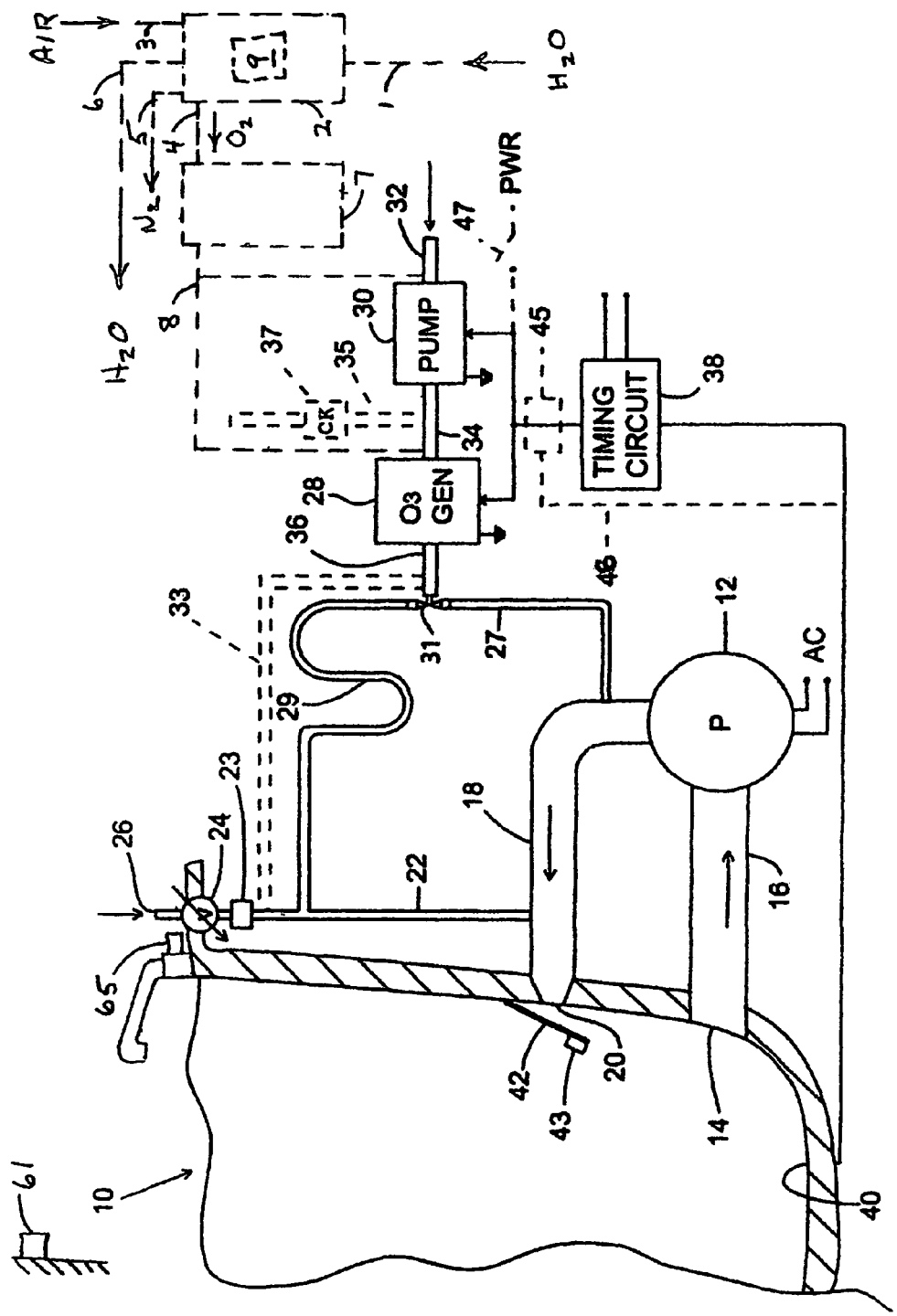
FIG. 1 is a schematic drawing of one embodiment of the invention.

Referring, by way of example, to FIG. 1, a broken-away portion of a hot tub, spa or jetted tub 10 is shown. Conventionally, a water pump and motor combination 12, hereinafter denoted as pump 12, draws water through an intake 14 from tub 10 through a tube or pipe 16 and provides relatively high pressure water via tube or pipe 18 to a jet 20. The water exits jet 20 in a high velocity stream and impinges on the user. In most instances, an air tube 22 communicates between tube 18 and an adjustable air valve 24 provided with an air intake 26. With this construction, valve 24 is adjustable to vary a quantity of air drawn by Venturi principles into the high pressure stream of water exiting jet 20. While only one jet 20 is shown, it is to be understood that the majority of all such tubs are equipped with a plurality of jets and associated, circuitously routed tubes or pipes 18 from pump 12, and at least 1 water intake 14 communicating with one or more jets. Significantly, as some spas and tubs may have "dead legs" that basically are selectively switched water paths selectable by a user and which may be infrequently used, providing ozone to the air intake tubes 22, or in some instances to the jets, ensures that these dead legs are provided with ozone on a regular basis and thus are free of bioslime and associated disease-causing bacteria or other pathogens. Also, it should be noted that with water flowing through plumbing of the tub, a negative pressure will exist in tube 22 that tends to draw air thereinto. Thus, providing ozone to tube 22 when the tub is in use provides ozone to the water circulating through all the jets.

In a large spa or hot tub, a water pump generally has at least a low and high speed setting (or multiple pumps), with adjustable air vents that allow variable amounts of air to be selectively drawn into some or all of the jets. In contrast, the pump for a jetted tub typically has only one speed setting with adjustable air vents as described for spas.

For oxidizing and eliminating bioslime that forms on the interior of tubes 16, 18 and 22 as well as interior water-contacting surfaces of pump 12 and other interior surfaces not accessible for cleaning, Applicant proposes use of an ozone generator 28, which may be of the type that uses photodisassociation to break diatomic atmospheric oxygen ($O_2$) apart whereupon many atomic oxygen atoms combine with diatomic oxygen molecules to form ozone ($O_3$). Such an ozone generator may utilize an ultraviolet discharge tube of from about 10 watts up to about 40 or 50 watts or more with a length of about 8 inches to about 32 inches or more, respectively, that emits ultraviolet light including a wavelength of 185 nanometers, which is known to break diatomic oxygen into monatomic oxygen. This lamp is similar to a fluorescent lamp tube, and may produce from about 50 mg to about 500 mg of ozone per hour of ozone depending on airflow past the lamp tube. Here, for example, an airflow of about 5 liters per minute past the lamp tube may generate ozone at a rate of about 70 mg per hour at a concentration of about 100 PPM, while an airflow of 10 liters per minute may generate ozone in the range of about 150 milligrams per hour at a concentration of about 100 PPM.

Of course, chamber design and power levels influence production rate of ozone. In the above and following examples, rates of ozone generation are based on Applicant's commercially available ozone generator design and power levels. An airflow greater than about 10 liters per minute doesn't significantly produce more ozone, but reduces concentration of the ozone that is produced. Likewise, a lower airflow generally produces less ozone, but due to the reduced airflow, the concentration of ozone in the air is increased. Alternately, a corona-type ozone generator may be employed, which generally produce more ozone than lamp-type ozone generators. In any case, it is beneficial to provide ozone at different rates of flow and at different concentrations so that when the tub is in use, i.e water flowing through the water circulation system of the tub, ozone is provided at a higher flow rate and lower concentration so as to sanitize the water while minimizing outgassing, and when the tub is not in use a low to very low flow rate of air is used to develop a higher concentration of ozone in order to oxidize bioslime and clean interior surfaces of water and air carrying tubes, including wetted surfaces of the pump. In some embodiments, a lower concentration is developed in conjunction with a smaller lamp tube, on the order of 8 inches and 10-20 watts or so, at very low flow rates, on the order of ¼ to ½ liter per minute and producing about 200 PPM to minimize outgassing while allowing ozone concentrations in tubing or other receptacles to build or accumulate due to pooling of the ozone. In other embodiments, an air and ozone mixture may be continually recirculated through tubing of the tub in order to increase ozone concentrations over time.

In one instance where the ozone generator is used with a jetted tub, spa or hot tub, an air pump or compressor 30 similar to a small aquarium pump, and which pumps about 1-2 liters per minute of air through a lamp-type ozone generator of about 10 watts or so, producing a concentration of ozone of about 80-100 PPM, may be used to pump air from an intake 32 via a tube 34 to and through ozone generator 28, and a tube 36 conveys air containing ozone, referred to as ozonated air, to a mixing device 31. In some embodiments, an ozone generator feed gas mixture other than normal atmospheric air may be employed, so long as the feed gas mixture includes oxygen, with higher concentrations of oxygen generally leading to production of higher concentrations of ozone in an ozone generator 28. In embodiments where a corona discharge type of ozone generator is used, another benefit of a higher concentration of oxygen is a reduced concentration of nitrogen, and reduced production of oxides of nitrogen in a corona discharge ozone generator. For example, a conventional oxygen concentrator, such as available under a DeVilbliss™ brand name from Sunrise Medical (www.sunrisemedical.com), an international company with an office in Longmont, Colo., USA, or a water pressure driven oxygen concentrator 2, such as disclosed in Applicant's U.S. patent application Ser. No. 11/305,975, filed Dec. 19, 2005, now abandoned, which is hereby incorporated herein by reference in its entirety, may be used to provide a gas mixture having an increased concentration of oxygen as a feed gas to ozone generator 28. As disclosed in application Ser. No. 11/305,975, oxygen concentrator 2 uses pressurized water from a water supply line 1 to drive one or more diaphragms that compress air received into respective chambers from an air intake 3, and uses a zeolite or other molecular sieve material to adsorb nitrogen, so that an unadsorbed gas mixture comprising mostly oxygen and argon may be released from an outlet port 4 directly to intake line 34 to ozone generator 28, to intake line 32 to pump 30, or to a buffer tank 7, from which feed gas may be drawn as needed. Lower pressure water discharged from water outlet line 6 may be routed to fill tub 10, or may be routed to a conventional drain line. A control system 9 controls water flow valves and gas release valves as needed to implement a pressure swing adsorption oxygen concentration process as disclosed in application Ser. No. 11/305,975. Electrical power for control system 9 may be provided from a convention source (e.g., household electrical supply or batteries) or from electrical power generation coils incorporated into oxygen concentrator 2. Where a feed gas mixture including an enhanced concentration of oxygen, as from a pressure swing adsorption oxygen concentrator, is supplied to ozone generator 28, an output gas in tube 36 from ozone generator 28 may be referred to herein as an ozonated gas or an ozonated feed gas. The term ozonated gas, as used herein, includes any gas mixture including ozone, and may include ozonated air or an ozone-containing airstream. Where ozonated air is used herein, it should be understood that concepts, configurations, and methods disclosed herein could also be adapted to develop and use an ozonated feed gas. In embodiments using a corona discharge ozone generator, a conventional dessicant or dessicant stage may be employed to reduce concentration of water vapor supplied to ozone generator 28. Device 31 may be a venturi/mixer such as is commonly found in agricultural applications where liquid concentrated fertilizer is mixed with water and subsequently sprayed or otherwise distributed to a crop, or it may simply be a T-type fitting. In the latter instance, a check valve would typically be provided in the air line from the pump to prevent water from entering the air pump or ozone generator. In the instance where device 31 is a venturi/mixer, ozone may be mixed with a stream of water from pump 12 so that the bubble size is very small, greatly enhancing diffusion of ozone into the water. The device 31 may also be connected in a bypass configuration as shown where some of the water from tube 18, being under pressure from pump 12, passes through a tube 27 to mixer 31 where the water is mixed with ozone, and thereafter the ozonated water flows through a contact section of tubing 29, diagrammatically shown as serpentine tubing. In a typical installation, this contact tubing may be something on the order of 3 to 8 feet or so, and allows thorough mixing and diffusing of the ozone into the water. The ozonated water then passes into tube 22 at or below air valve 24, where it is mixed with the water and air emerging from jet 20. A check valve 23 may be used to prevent any water from being expelled from valve 24, although this is unlikely since a negative pressure exists in tube 22 during use. In another embodiment, as illustrated by dashed lines 33, ozonated air may be pumped or drawn directly from ozone generator 28 to tube 22, where it is provided to the water-carrying tube 18. In the above embodiments, pump 30 may limit an amount of air drawn by venturi principles through the ozone generator in order to develop a higher concentration of ozone. As such, there may be differing flow rates of ozonated air provided to the water circulation system depending on whether the tub is in use, is idle or is in the process of being emptied or refilled with water.

Significantly, ozonated air may be pumped into tube 22 during a time when the tub and plumbing are empty of water. In this embodiment, flap valves 42 and other valves closing the plumbing and air system may be omitted. Here, low flow rates and high concentrations of ozone as described above, in conjunction with limited duration of operation of the ozone generator, such as 10-30 minutes or so, causes the ozone to be consumed by organic loading in the plumbing and air system before outgassing becomes a concern. In addition, any outgassing that does occur within the tub results in the ozone pooling in the bottom of the tub and drain where it reacts with organic compounds until consumed. Thus, outgassing is kept within acceptable limits.

In whirlpool tubs, spas, and other water holding facilities wherein a higher volume, and generally higher pressure, air pump or blower is used to provide pressurized air to enhance release of bubbles or introduce air into a flow of jetted water, an ozone generator may be integrated with an intake of such air pump, or within a pressurized flow path of air leaving such pump, in order to introduce ozone into a flow of pressurized air flowing through tubes or other plumbing features to be introduced directly into a tub, or to be introduced into water flowing into a tub, as by a Venturi or other injector. However, even in such embodiments, it is still desirable to provide a means to provide a low flow of ozonated air having a higher concentration of ozone when water and air lines are empty to help oxidize biofilms, and a higher flow rate having a lower concentration of ozone to be injected into flowing water or water within a tub. Such means may employ a lower capacity air pump, such as used with an aquarium, to pump air at a lower flow rate and pressure through an ozone generator and thence into air and water tubing associated with a tub, when such tubes are empty of water, and when such higher capacity air pump is not operating. In some embodiments, such higher capacity air pump or blower as noted above may also have a low flow rated operating mode so that ozone may be generated at a higher concentration to be introduced into air and water tubing when such tubes are empty of water. Such means may also employ an ozone generator such as disclosed below which itself, in some modes, develops a low flow rate of air and provides ozone at a higher concentration.

Figure 1A:
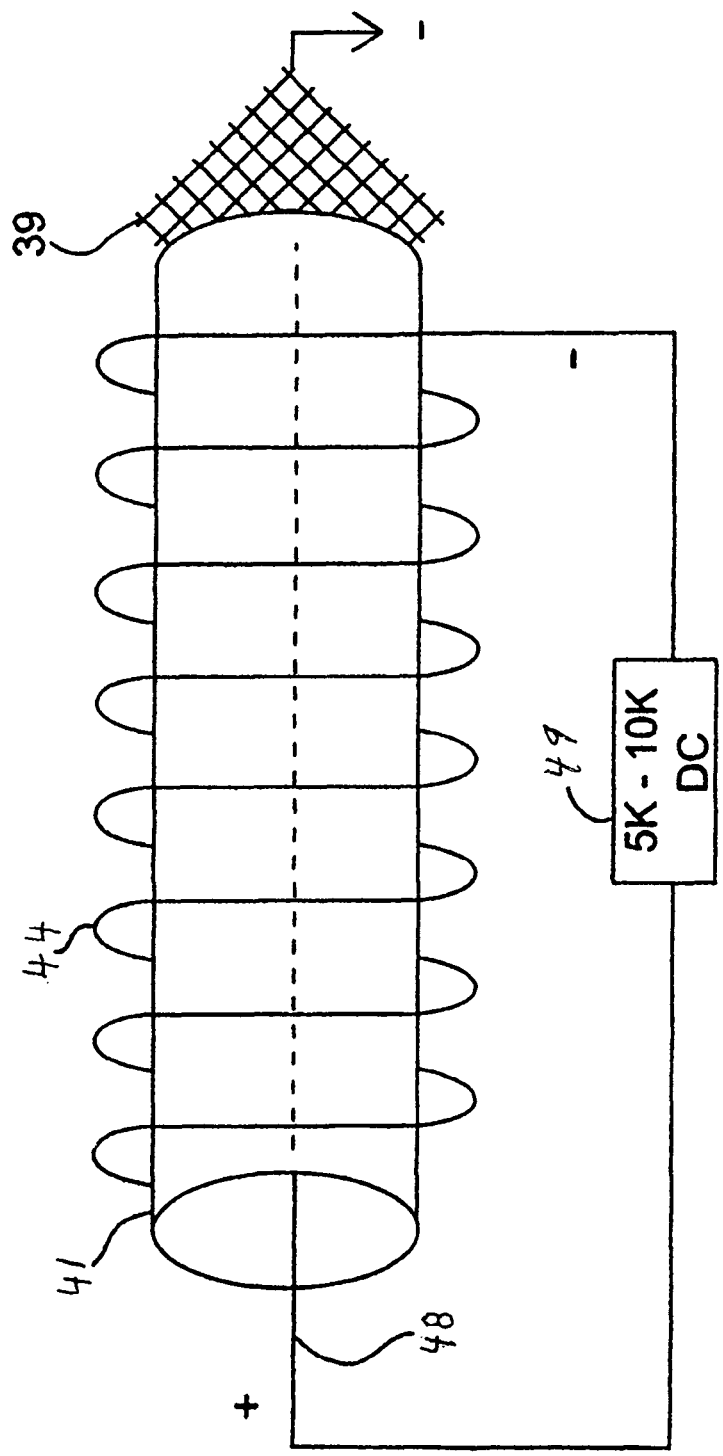
FIG. 1a is a diagrammatic illustration of a new ozone generator of the present invention.

FIG. 1a illustrates another type of ozone generator wherein a low rate of airflow, on the order of about ¼ to about ½ liters per minute, is developed by the ozone generator without a separate pump in order to produce ozone, on the order of about 20-40 PPM, or even higher concentrations of up to 100 PPM or greater, but which may also generate a larger quantity of ozone at lower concentrations when the airflow is drawn through the ozone generator by a venturi, or by an air pump or blower. In this embodiment, a tube 41 of an insulative material, such as glass or plastic, is provided with an exterior conductive winding 44. An inner electrode 48 extends generally coaxially through the length of tube 41. Winding 44 and electrode 48 are coupled to a DC power supply 49 that provides a DC potential of between 5,000 and 15,000 volts DC, with a positive DC potential from power supply 49 applied to center electrode 48 and a negative potential applied to winding 44. With this construction, diatomic oxygen is ionized by the potential between the center electrode and the winding, which then reforms into ozone.

A screen or grid 39 may be positioned at an end of tube 41 opposite the end where electrode 48 enters the tube, and has a negative charge imposed thereon with respect to electrode 48. This embodiment functions to generate ozone in a similar manner as a corona ozone generator, but needs no fan, injector or other apparatus to drive air through the ozone generator. Rather, positively charged ions that are generated by the corona are drawn toward grid 39, which in the process creates an airflow through tube 41. This ozonated airflow may be coupled to the tubing of a hot tub, spa or any other such water circulatory system when it is not in use in order to oxidize bioslime and to sterilize the interior parts of the tubing. In addition, such an ozone generator may be used in conjunction with a venturi injector or other mixing device when water is circulating through the tubing in order to provide a much higher airflow of about 2-3 liters per minute at a reduced concentration of about 5-10 PPM or so of ozone to the water. Of course, such a low concentration of ozone in the water reduces outgassing.

As stated, for some embodiments, when the tub or spa is in operation, the amount of air provided to ozone generator 28 may be limited by pump 30 to generally the pump capacity or slightly greater, typically 1-2 liters per minute at a concentration of about 100 PPM, depending on the design of the pump. This has the effect of increasing concentration of ozone provided to mixing device 31. By providing a bypass 35 and check valve 37 (dashed lines), which may be a biased check valve, a larger quantity of air flow, on the order of 2-4 liters per minute at a concentration of about 50-75 PPM may be freely drawn through mixer 31 by venturi principles. This tends to reduce outgassing of the ozone from the tub during use. Conversely, as stated, when the tub is in a dry or semi-dry state, operation of pump 30 develops less airflow of about 1-2 liters per minute through generator 28 with a corresponding increase of ozone concentration to about 100 PPM or more. During this mode of operation, it is desirable that the airflow be selected so as to produce the most concentrated levels of ozone, which when constrained within the tubes of the tub, as will be explained, completely sanitizes and oxidizes bioslime within these tubes, eliminating the possibility of providing an environment conducive to growth of microbiota therein.

A timing circuit 38 may be coupled to ozone generator 28 and pump 30, and may be used to energize pump 30 and ozone generator 28 for selected intervals of time. In one embodiment, a water presence sensor 40 provided in tub 10 is used in conjunction with timing circuit 38 to indicate presence or absence of water in tub 10, as when the tub is being filled for use or emptied or when the tub is empty of water. It is to be emphasized that such a sensor merely senses presence of any water in, or in some embodiments, entering, the tub, as contrasted with a level sensor that senses a level of water in a receptacle. Here, a level sensor that allows operation of a water pump responsive to a sensed level of water in the tub will not work with Applicant's invention because with such a level sensor, the plumbing of the tub would already be filled with water by the time the ozone generator is actuated, thus not affording an opportunity for the ozone generator to fill the lines with gaseous ozone while there is no water in the plumbing. However, a water level sensor may be used to provide a signal that may be used to change a mode of operation of an ozone generator and/or an associated air pump from a low rate, high ozone concentration mode to a higher flow rate, lower ozone concentration mode, when a tub if filled and associated water tubing contains water, particularly when a water circulating pump is energized and operating. Where tub 10 is a hot tub, spa or the like, the water presence sensor, or a combination of a water presence sensor and a water level sensor, may be configured so as to sense and provide a signal indicative of an empty condition of the tub, as well as when the tub is being emptied or refilled. In this instance, such an empty condition could be opportunistically used to oxidize bioslime and sanitize the tubes of the tub or spa. Here, the timing circuit would activate ozone generator 28 and pump 30 for a predetermined period of time, such as 30 minutes or so, or until a signal from a water level sensor provides an indication that a tub is filled. In the case of a jetted tub that is filled and emptied with each use, the timer may be used to activate ozone generator 28 and pump 30 upon initial detection of water in the tub, such as when the tub is being filled, to pump a relatively higher concentration of ozone through the empty tubes of the tub as the tub fills. In some embodiments, an optional personnel presence or motion or temperature sensor 61, which may be an ultrasonic or infrared sensor, or a pressure sensing pad, may be used to detect presence of a user near a tub or water entering the tub and provide a signal via wired, fiber optic, or wireless connection to activate ozone detector 28 and pump 30 to provide a longer period for treatment of bioslimes and other contaminants in a dry/moist state with ozonated gas before a tub is filled. After the tub is filled, ozone generator 28 and pump 30 operate either for a period of time sufficient for a person to use the tub and empty the tub of water, or upon detection of an empty condition of the tub, depending on the type of sensor 40. Here, sensor 40 would typically measure impedance between two electrodes and provide an indication of water being in the tub if any change in resistance, capacitance, or inductance is found. Sensor 40 may also be a sensor based on an interaction of one or more optical fibers with water, such as a change in a reflected signal due to a change in optical impedance when water surrounds a reflecting facet on a fiber, or a change in transmission of a signal between a transmitting and a receiving fiber due to presence of water. Use of a fiber optic based signal would offer a potential safety advantage in not requiring a direct connection to an electrical component in contact with water.

In other embodiments, other devices and techniques may be used to detect initial filling of a tub, or when a tub is empty. Such other techniques include use of one or more sensors 65, which may be acoustic or vibration sensors, or thermocouples or other temperature sensors that may be easily attached, as original equipment or as a retrofit, to faucets or other lines used to admit water to a tub, spa, or other water holding facility. or to a drain line used to empty a tub. Integrated circuits are now readily available, e.g., as in glass breakage sensors for burglar alarm systems, that will issue a signal via wired, fiber optic, or wireless connection to a timing circuit 38 or other control element when a particular acoustic or vibration spectrum or waveform, as may be a useful, characteristic discriminant for running water, is experienced by such a transducer. Similarly, a temperature sensor attached to a hot water line may be used to indicate filling of a tub, thereby providing a signal, via wired, fiber, or wireless connection, that can be used to energize an ozone generator and air pump as described herein. A temperature sensor attached to a drain line may also provide a signal that can be used to energize an ozone generator and timer to pump ozonated air through emptying or empty plumbing lines used in a jetted tub, spa, or other facility. In some embodiments, an infrared sensor (e.g., sensor 61), such as commonly mounted on a wall and used to detect human presence, or an infrared thermometer, may also be used to activate an ozone generator and/or timer. Such an infrared sensor/thermometer may be mounted and restricted in field of view to "see" only water entering or present in a tub, or surfaces warmed by such water, or may be mounted to detect presence of a person in a vicinity of a tub, and issue signals that may be used to energize an ozone generator and air pump so as to treat air or water plumbing lines before they are filled with water, or immediately after they are emptied of water, as described herein.

After the tub is emptied, such condition may be sensed by the water presence sensor, and the timer energized to operate ozone generator 28 and pump 30 for a selected time interval, such as 15 minutes or so, in order to allow the higher concentrations of ozone to suffuse through the system of tubes, pipes and pump, displacing atmospheric gasses in the process, in order to sterilize the interiors thereof immediately after use.

The ozone may be generally constrained within the tubes, pipes and pump by a valve 42 that blocks jet 20, which valve 42 may be a flap valve that simply lowers by gravity to cover the opening of the jet when the tub is empty. As shown, a recess or clearance may also be provided for the valve so that when open, it does not protrude into the tub. Also, the valve 42 is shown in FIG. 1 as being of exaggerated size, it need only be slightly larger than the jet opening and be hinged just above the jet opening. Alternately, a check valve may be incorporated in the jet or tubing near the jet, such a valve being of the type wherein low impedance is presented to water flowing to the jet during operation, but which blocks flow of air when water pressure is diminished. An example of such a valve is illustrated and described later herein (FIG. 28). After the water level in the tub is above the flap valve, the flap valve floats to a generally vertical position so that the jet is open, this floating action being facilitated by either a buoyant material 43 fixed to flap 42, or the flap itself may be constructed of a buoyant material. In some embodiments, particularly those involving retrofit use of an ozone generator with an existing tub or spa, as illustrated and described later herein (FIGS. 29-31c), a plug having a porous section for emitting a gas mixture including ozone into water circulation lines 18 when they are empty of water may be manually inserted into or otherwise affixed to jet openings in such a manner that they may be ejected by water pressure when pump 12 is energized.

When sterilizing the tubes and pipes of the tub in an absence of water, air valve 24 may be manually closed, thus the closed air valve and flaps over the jets generally prevent escape of the ozonated air from the pipes and tubes around the tub. A one-way or other type valve may be placed in tubing 16 to prevent escape of ozone, but it is believed the impeller blades in pump 12, while allowing positive pressure to escape and possibly permit some leakage of ozone, would generally prevent larger quantities of ozone from escaping from intake 14. Here, leakage of ozone around the impeller blades of pump 12 should be sufficient to sterilize tube or pipe 16 when it is empty of water. Further, as ozone is heavier than air, any ozone that escapes from the water inlet would simply pool in the bottom of the tub and drain until it dissipates or reacts with other compounds. However, in some embodiments, particularly those involving retrofit of an ozone generator to an existing tub or spa, a special cover, which may include a filter, having provisions for admitting ozone into line 16, may be placed over an pump inlet cover, as illustrated and described later herein (FIGS. 25a through 27). With air valve 26 closed and flap valve 42 blocking jet 20 as described, ozone concentration rapidly builds up within the air and water-conveying pipes and tubes of the tub, killing any microbiota therein including protozoa, algae, molds, fungi, bacteria, viruses and others. Also, the bioslime coat that otherwise would accumulate on the interior surfaces of these tubes is oxidized by the higher concentrations of ozone, the bioslime being mechanically removed by the high rate of water flow through the tubes during use. After the tub or spa is filled with water, the timing circuit may be activated to energize ozone generator 28 and pump 30 for selected intervals as described, or ozone generator 28 and pump 30 may simply be operated continuously as long as pump 12 is operated. This injects ozone at a lower concentration directly into the circulating water, sterilizing the water of the tub and oxidizing contaminants therein. Alternately, as shown by dashed line 46, the timing circuit 38 may be omitted, with sensor 40 coupled to a switch, such as a latching relay (schematically illustrated at dashed line box 45), that maintains operation of ozone generator 28 and pump 30 as long as there is water contacting sensor 40, i.e. water in the bottom of tub or receptacle 10, or in an absence of water in the tub, again depending on the type of sensor 40. Thus, as water is first being introduced into tub 10 and before the water level rises to a point where it enters the jet tubing, and possibly before it enters the intake tubing where such an intake is mounted to a side wall of the tub, ozone generator 28 and pump 30 are energized to pump a higher concentration of ozone into the empty tubes of the tub. This sterilizes and cleans these tubes prior to water being introduced thereinto. Likewise, as water is being drained from the tub, the ozone generator continues to operate until sensor 40 no longer senses water in the tub, allowing ozone to be pumped through the emptying tubes of the tub, sterilizing these tubes after use. Again, sensor 40 may be of the type that energizes the ozone generator upon detection of an empty condition of the tub, and be connected to a timer to operate the ozone generator for a selected length of time. In a variant of this embodiment, a manually operated switch 47 (dashed lines) may be used to manually switch the ozone generator and associated pump 30 "on" and "off" with or without a sensor 40 and timing circuit. This embodiment may be more applicable to larger spas or hot tubs where water is retained therein for longer periods of time. In this instance, during a water change, the ozone generator may be switched "on" after the tub is emptied, and may be left to operate for a longer period of time, possibly for hours, in order to allow the ozone to penetrate into every crack and crevice of the tubing, valves and pump of the system. Ideally, in this application, the ozone would be recirculated through the tubing and ozone generator as will be described. The ozone generator may be also switched "on" while the tub or spa is in operation in order to sanitize the water and oxidize contaminants therein. Of course, a manual switch may also be used to operate an ozone generator used on a smaller jetted tub, this embodiment being particularly useful in hotels, motels and other similar locations where jetted tubs may be infrequently used.

Figure 9:
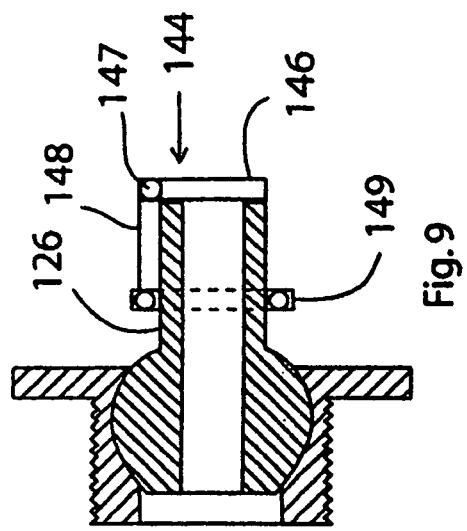
Figure 10:
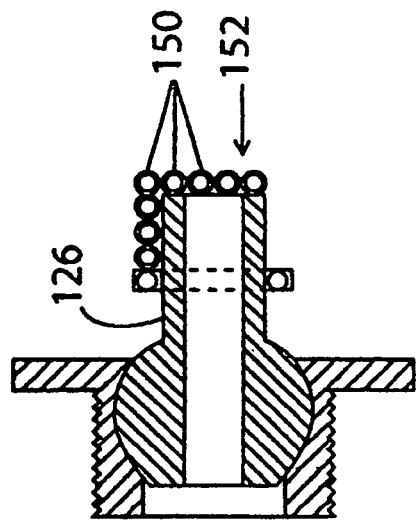
Figure 7:
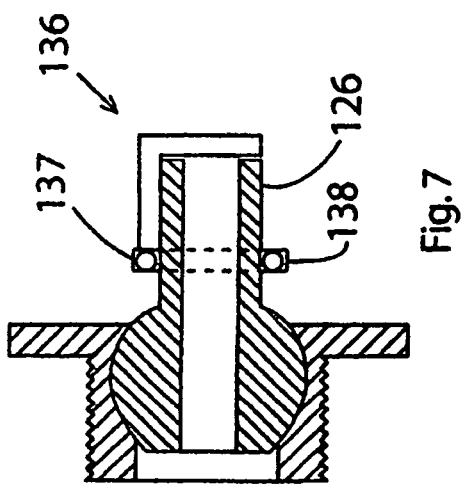
Figure 8:
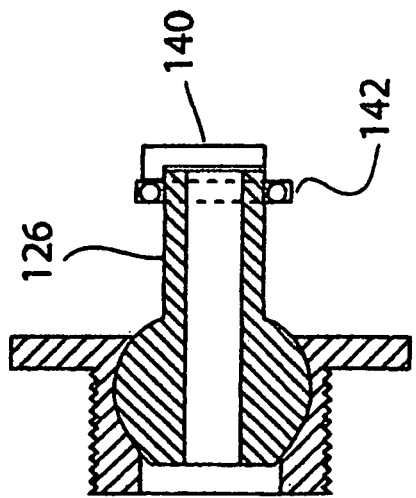

While a flap valve 42 may be suitable for some types of jetted tubs, other types of valves that close automatically when the tub is emptied may be used. For instance, FIG. 4 shows a gate-type valve 120 having a float 122 and a gate portion 24 that is raised and lowered as water covers and uncovers the jet, respectively. This embodiment, and the others that follow, are suitable for use with jet nozzles having a short, tube-like extension 126 typically extending just past a ball portion 128 of the nozzle. FIG. 5 shows an embodiment wherein a flap portion 130 hinged at 132 closes the jet by gravity while water pressure during operation raises flap portion 130. FIG. 6 shows an embodiment wherein a flap portion hingably connected as described above incorporates a float 134 so that when water covers float 134, flap portion 130 is raised to open the jet. FIG. 7 shows an L-shaped flap valve pivotally connected at 137, with a mounting clamp 138 affixing the flap valve to extension 126. FIG. 8 shows a differently configured L-shaped flap valve 140 having a clamping member 142 that clamps to an end region of extension 126. In addition, the embodiment of FIG. 8 may be clamped to a shorter extension 126 than that shown. FIG. 9 shows a flap valve 144 having a flap portion 146 pivotally attached at 147 to a float 148, and clamped to extension 126 at 149. Here, float 148 partially lifts flap 146 from the end of extension 126 when water covers the jet. FIG. 10 illustrates an embodiment wherein a plurality of pivotally linked tubes 150 form a flap 152. These tubes may be hollow and closed at ends thereof so that they float away from an end of extension 126, or of a solid construction from a buoyant material. Alternately, the tubes may not necessarily need to float, but simply be pushed aside by water pressure during operation. For retrofit applications, as illustrated later herein, openings or fittings may be included in flaps illustrated in FIGS. 5 through 10 and used to admit ozone from an external ozone generator into lines 18 when they are empty of water and such flaps are closed, preventing or reducing escape of ozone from such nozzles during treatment periods when pump 12 is not in operation. One could also use a spring-loaded iris valve or a valve comprising multiple flexible, resilient, or spring-loaded flaps, which may be triangular shaped, extending from a ring placed in a nozzle, such that pressure of water from pump 12 deflects the flaps to allow relatively unrestricted flow of water, but wherein each flap returns to a relaxed position such that one or more flaps generally close such opening, when pump 12 is not providing pressurized water to such nozzles. A spring-loaded iris valve may be configured having spiral groves in an outer ring such that pressure of water displaces the valve longitudinally a small amount so that movement of pins in such spiral groves, relative to other portions of such valve, causes vanes of the iris valve to be opened.

While a number of closures for the water jets are disclosed, it should be appreciated that any closure that generally closes such a jet in the absence of water and which is opened by operating water pressure of the tub or flotation or a combination of both may be used. Further, such a closure need not necessarily be air tight, but should serve the purpose of generally constraining ozone within plumbing of the system. Also, the air intake system would typically be closed during sterilizing operations in the absence of water in the tubing. In some embodiments, automated closure of the air tube may be effected by a spring loaded cover (not shown) mounted below a thread-in adjustable cover such that spring force is just sufficient to pull a cover into place so as to block flow of air (or water) from tube 22 when pressure in tube is nearly equal to or exceeds pressure of outside air.

There is at least one jetted tub manufacturer constructing jetted tubs wherein a smaller pump and motor assembly is used for each jet, with the output of each pump and motor assembly coupled directly to a jet in the tub. Thus, in this construction, a plurality of pump and motor assemblies are mounted directly against the outer wall of the tub. Here, air from a valve such as valve 24 communicates with the suction line for each pump so that the pumps draw a mixture of air and water. In this instance, ozone may be provided to this air line in a similar manner to line 33 (dashed lines in FIG. 1), allowing ozonated air to be drawn into the mixture of air and water. Turbulence in the pump would assist in diffusing the ozone into the water. When the tub is empty of water, as before or after use, the air valve may be closed and the ozone generator and pump combination activated, pumping ozonated air through the tubes and piping of the tub. Impeller blades at each pump would allow concentration of ozone to build up to sanitizing levels while allowing any positive pressure to escape, sterilizing the pump and jet in the process.

Figure 2:
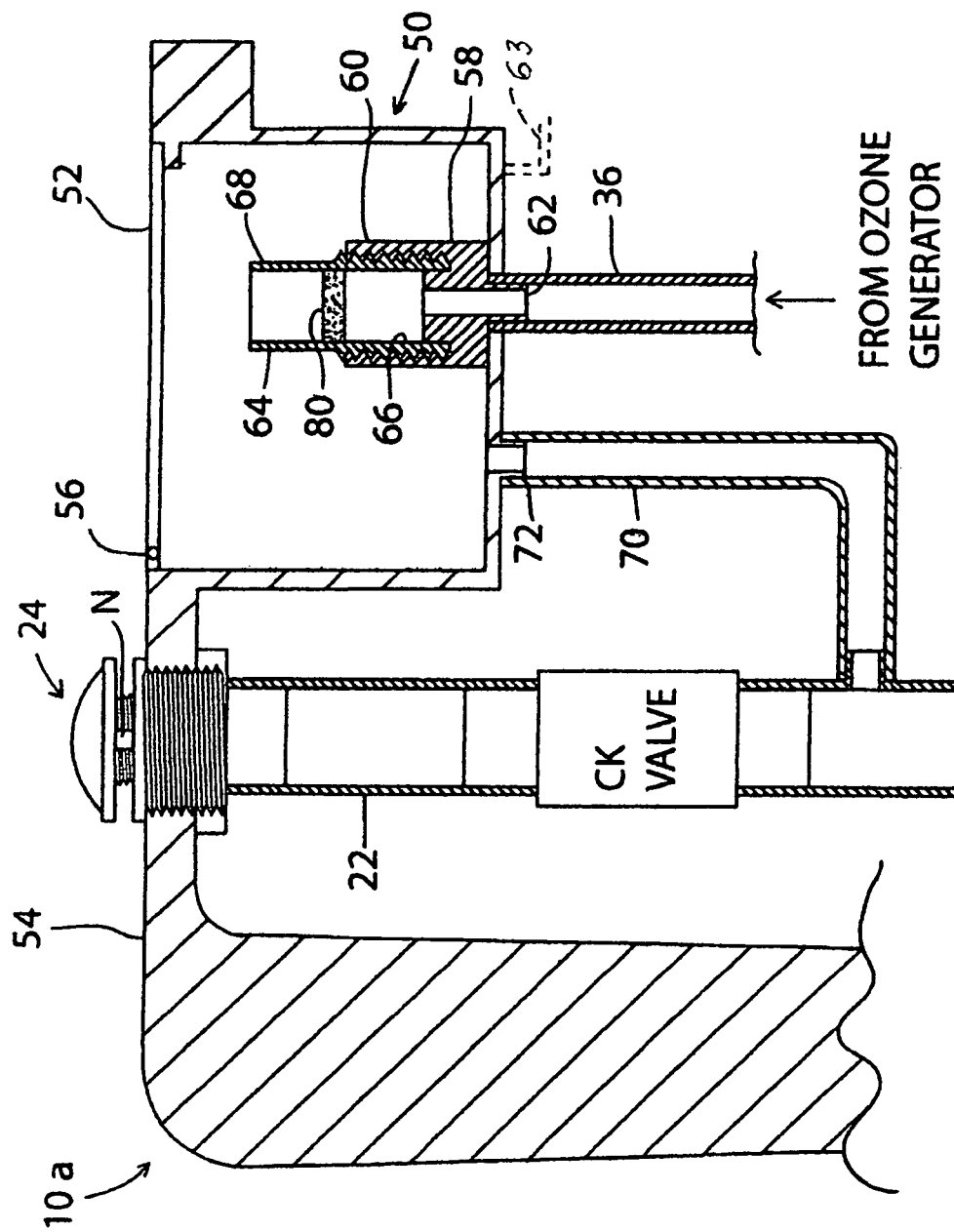
FIG. 2 is a schematic drawing of a second embodiment of the invention.

In another embodiment wherein structure for providing aromatherapy is incorporated in the tub, such structure may be combined with an ozone generator. Referring to FIG. 2, a jetted tub or spa 10a (shown broken away) may incorporate an enclosure 50 having a closure 52 that may be generally flush with an upper surface of the tub edge, and bearing against a lip or flange 54 extending around an opening of the enclosure. Closure 52 preferably would be constructed so as to seal enclosure 50 generally airtight during operation, as should be evident to one skilled in the art. Closure 52 may be attached to tub 10a as by a hinge 56, or closure 52 may be a freely removable cover, and provided with convenient means for lifting (not shown), such as a knob, as also should be apparent to one skilled in the art.

Inside enclosure 50 is provided an adapter 58 having a relatively wide, female threaded region 60 extending into an interior of enclosure 50, and a port 62 adapted to receive a tube, such as tube 36, from ozone generator 28 (FIG. 1). In this embodiment, a second ozone generator may be used, or a larger ozone generator than that described for FIG. 1 (30 watts or so) may be used and the flow therefrom divided between injector/mixer 31 and enclosure 50.

A cylindrical housing 64 open at both ends is threaded at an end 66 to threadably engage female threaded region 60 of adapter 58, and end 68 of housing 64 may be left open. Note that although conventional helical threads are illustrated in the instant example, other types of connections, such as twist-lock or bayonet mount, or use of a compression fitting such as found on lavatory drains, that can withstand a modest pressure differential between an interior of tube 36 and an interior of enclosure 50, and generally prevent passage of gas therebetween except through diffuser 80, while also providing a convenient means for removing and replacing tube 64 within adapter 58, may also be used. A tube 70 is connected to a port 72 on an exterior of enclosure 50, tube 70 communicating between air tube 22 and port 72, as by a T-fitting. With this construction, aromatherapy vapor and ozone from port 72 is drawn into the airstream flowing through tube 22 from valve 24. Thus, valve 24 may be adjusted by a user to vary a quantity of air, ozone and aromatherapy available to the jets of the tub or spa. If desired, a second valve may be provided in line 70 to vary the quantity of ozone and aromatherapy independently of air available from valve 24. Of course, the parts exposed at least to higher concentrations of ozone would be constructed of materials resistant to attack by the ozone, as should be apparent to one skilled in the art.

Inside housing 64 is mounted a diffuser 80, which may be a disk of a sintered material, such as stainless steel, through which ozone from ozone generator 28 is passed, the ozone possibly reacting with selected aroma therapy compounds to provide a more intense or therapeutic aroma therapy. Diffuser 80 serves to receive compounds, generally in liquid form, used in aroma therapy and other scented compounds, the vapor from these compounds being drawn into the airstream for the tub or spa jets and thereafter into the water of the tub. Due to the relatively large bubble size produced by mixing of air, aromatherapy vapor and ozone at jet 20, little diffusion into the water of the aromatherapy vapor and ozone would occur prior to the bubbles rising to the surface and scenting the air above and around the tub with the aromatherapy scent and ozone. As is known, ozone is produced in nature during thunderstorms and other natural phenomena, the scent of which being associated with a "freshness" and "outdoorsy" quality. To this end, quantity of ozone from the ozone generator may be regulated or metered to aromatherapy enclosure 50 as by a valve or constriction in tube 36. In this instance, extra air may be provided in enclosure 50, as by an extra air port 63 (dashed lines) sized to allow a selected quantity of air to be drawn into enclosure 50.

While a diffuser of a sintered material is disclosed, the diffuser may be constructed of any suitable material in any form that would pass ozone and receive an aromatherapy compound that would impart a particular scent to the air circulating over and around through the tub. In a variant of the embodiment shown in FIG. 2, the diffuser structure may be placed directly in the airstream from valve 24 and be provided with a port to draw ozone from ozone generator 38.

Housing 64 containing diffuser 80 is constructed to be easily replaceable so that a user may readily remove a housing 64 containing one aromatherapy compound and replace it with another housing 64 and diffuser 80 having a different aromatherapy compound thereon. Here, the user simply opens closure 52 and unscrews housing 64 from adapter 58 and replaces that housing 64 with another housing 64 containing the different aromatherapy compound. This eliminates the need to clean housing 64 and diffuser 80 each time a different aroma therapy compound is desired to be used. As such, a user may purchase separately or be provided with a collection of housings 64, each with its own distinct aromatherapy compound so that the user to may select a particular aroma or other compound according to his/her preferences. In some embodiments, diffuser 80 may be formed with integral threads or other coupling features, or adapter 58, diffuser 80, and other elements (e.g., O-rings, finger grips) may be designed to permit convenient, direct removal and replacement of diffuser 80. In the instance where the aroma in a housing 64 fades, the user may simply renew the aroma by placing a drop or so of the aromatherapy compound in its liquid form onto the diffuser 80 or elsewhere within housing 64. In another embodiment for aromatherapy, housing 50 may be constructed as a separate housing not physically attached to the immersion facility, but rather be mounted to a wall adjacent the facility or in some other convenient location with air lines leading to and from the facility. Alternately, housing 64 containing the aromatherapy compound may be supported or hung by itself at any convenient location near an immersion facility or within an enclosure of an immersion facility, with air lines leading to and from housing 64. In this instance, the air line 36 of FIG. 2 would go directly to a housing 64, and possibly to a base 58 as shown, with a second air line leading from a top 68 of housing 64 to air line 70. This would allow aromatherapy to be added as a retrofit, with the housing 64 easily interchangable by simply disconnecting it from the air lines or where a base is used, by disconnecting it from the base and the air line at the top of housing 64.

Figure 3:
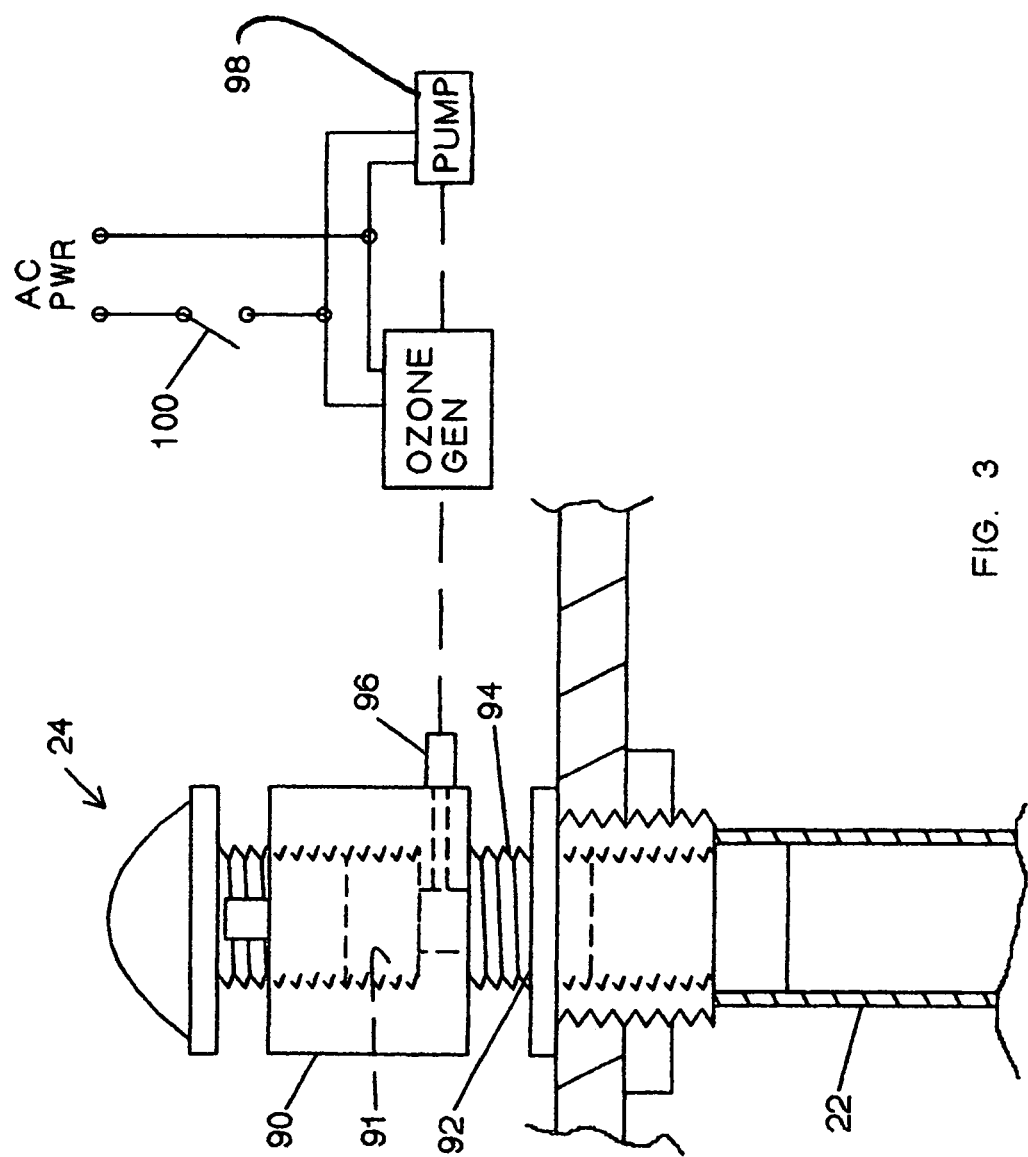
FIG. 3 is a diagrammatic view of one embodiment of the invention for retrofit to a jetted tub or spa.

In one embodiment for retrofitting an existing installed jetted tub or spa with an ozone generator, reference is made to FIG. 3. Here, the air valve 24 (FIG. 1), which in most instances is a threaded plug having a notch N running the length of the threaded portion, is replaced by an adapter 90, shown partially threaded into opening 92 that otherwise would receive valve 24. Adapter 90 may be constructed including a valve 24, or the existing valve 24 may be removed from opening 92 in order to accommodate adapter 90, and then valve 24 may be threaded into opening 91 (dashed lines) of adapter 90. Opening 91 in turn communicates with tube 22 via an opening through threaded portion 94 of adapter 90. A port 96 may be provided in adapter 90, port 96 coupled at least to an ozone generator, and possibly a pump 98 located or mounted inside the enclosure area of the tub or remote from the tub. A switch 100 may be provided to switch the ozone generator, and if used, pump 980N and OFF. Flap valves may be installed over each jet, or plugs may be provided to plug the jets. In some instances, these plugs may be provided with a relief mechanism or be made somewhat porous to prevent significant positive pressure from building up within the tubes and piping of the tub. Here, and in the other embodiments, some airflow through the jets is necessary in order to displace air therein with ozonated air.

Figure 12:
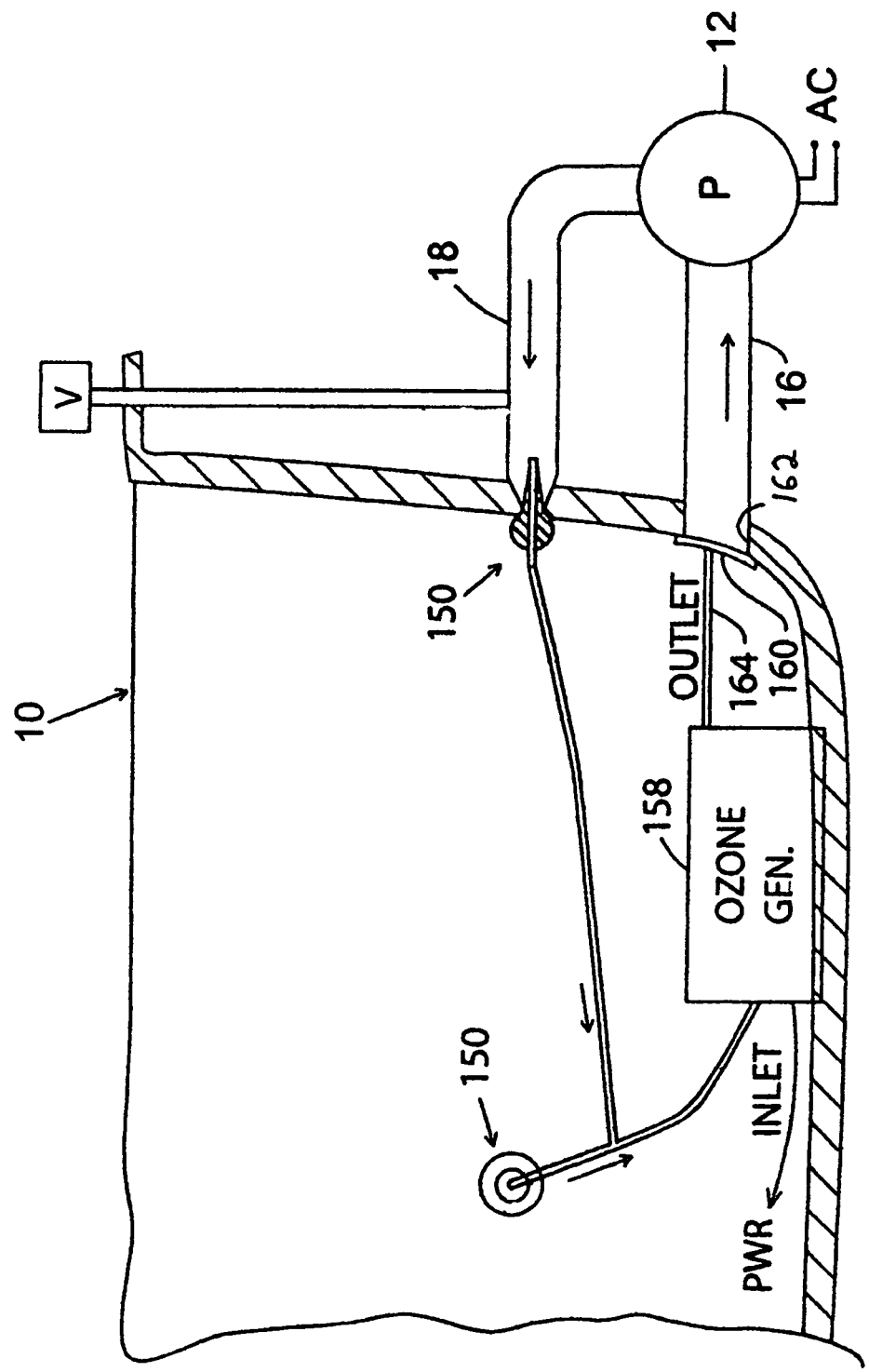
FIG. 12 is a diagrammatic illustration of one embodiment of a portable sanitizing apparatus of the present invention.

In another embodiment of a retrofit ozone system for recirculating ozone back through the tubing of the spa, and referring to FIG. 11, a plug 150 having a generally spherical grip portion 152 and a tapered plug portion 154 is shown. A flexible tube 156 either extends through or communicates with an opening 157 through plug 150, the tube being connected to an ozone generator 158 (FIG. 12), which may be portable or mounted in a safe location. In the instance where the ozone generator is portable, the ozone generator may be housed in a generally waterproof housing and simply be placed in a tub or spa as shown in the absence of water in the tub during a sanitizing operation. In retrofit embodiments, ozone generator 158 may incorporate a low flow air pump in order to pump a mixture of ozone and air into the jets and the tubing of the tub, or may employ an ozone generator permanently retrofitted in the tub enclosure and utilizing a different mechanism, such as a convection effect, in order to provide a low rate of ozone flow to the air tubes and plumbing of the tub, as will be further explained. As shown in FIG. 12, a cover 160 may be used to cover a water intake 162 of the tub, this cover attaching to the water intake by any conventional means available to one skilled in the art, such as a close fit where the water intake protrudes from a side or bottom of the tub, suction cups that hold the cover in place, or where there is a grating in the bottom of a spa, a mat-like cover may simply be placed over the grating.

In a similar manner as disclosed for the plugs 150, a flexible tube 164 may connect a cover 160 to an air intake port of the pump within ozone generator 158, making the system a closed loop system. In this embodiment, ozone-containing air may be circulated at a low rate of flow, which may be on the order of around 0.5 to about 2.0 liters of air per minute with a resulting concentration of about 150-50 PPM, throughout the plumbing system of the tub simply by pumping it into the jets and returning the ozonated air to the pump via water suction intake 162. In the instance where an air pump is used, seals and other parts of the air pump may be constructed of ozone-resistant material such as TEFLON™, VITON™ or other similar materials. With such a closed loop system, concentration of ozone increases over time to a higher level than in a system wherein ozone is simply injected into the water, insuring that any bioslime deposits are oxidized and the plumbing, pump and other interior parts of the tub or spa are completely sterilized. As stated, ozone generator 158 may be placed in the bottom of the tub, hung on a wall adjacent the tub or placed in any other convenient location, including the tub enclosure containing the tub plumbing and pump. A timer as described above may also be incorporated in the ozone generator to allow the ozone generator to operate for only a selected period of time, such as an hour or so. Alternately, ozone-containing air may be pumped into water suction inlet 162 and returned to ozone generator 158 via jets 50 and tubing 156. As should be apparent, the output of the ozone generator may be coupled to any of the ports, with the intake of the ozone generator being coupled to any oppositely positioned port in the water or air circulation system in order to effect a circulation of ozone through plumbing and tubing of the tub. Likewise, the output of the ozone generator may be applied to a plurality of the ports, with the remaining ports coupled to the intake of the ozone generator.

Figure 13:
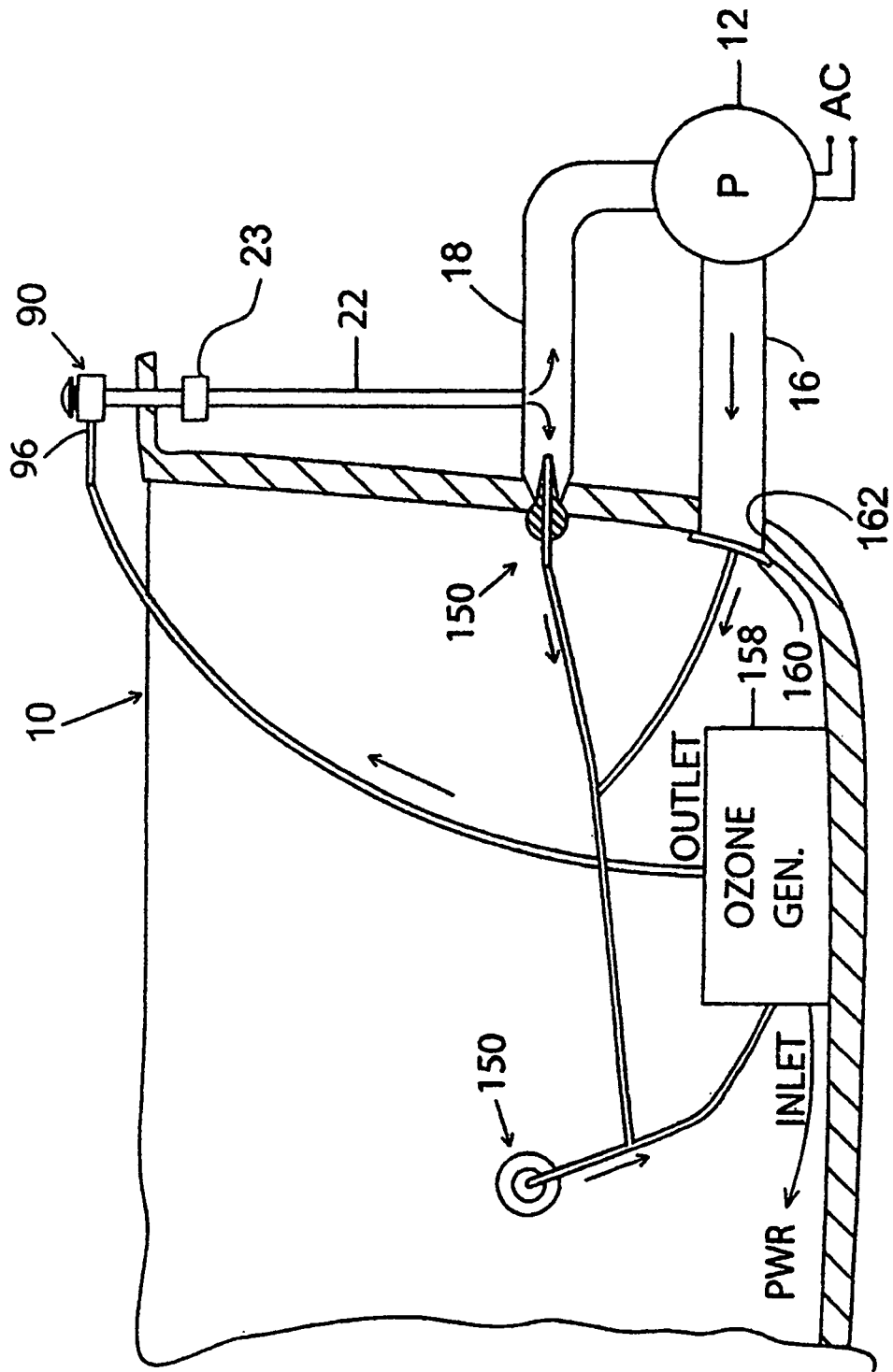
FIG. 13 is another embodiment of a sanitizing apparatus of the present invention.

A closed loop system may also be coupled with the retrofit embodiment as shown in FIG. 13, with tubing coupled to port 96 of the adapter simply by a friction fit by a quick-disconnect coupler, or by other conventional means. Alternately, a tube to/from the ozone generator to the air intake system may simply be positioned therein with a plug as described for the jets. Here, flow of ozone-containing air may be in either direction through adapter 90, or, with valve 24 removed, directly into opening 92, which in turn communicates as described via the air intake tubing 22, tubing 18, pump 12 and tubing 16 to the ozone generator. In this manner, the air and ozone mixture is continuously recycled through the ozone generator in a closed loop that builds up and maintains a relatively high concentration of ozone for oxidizing and preventing bioslime growth.

When the tub is to be used, the cover over the water intake is removed and the plugs removed from the jets, allowing the ozone generator and associated tubing, plugs and cover to be stored. As stated above, and with respect to FIG. 3, an ozone generator may be permanently or semi permanently installed in conjunction with adapter 90 for allowing ozone to be injected into the water during use, with other water circulation openings in the tub being left open.

Figure 14:
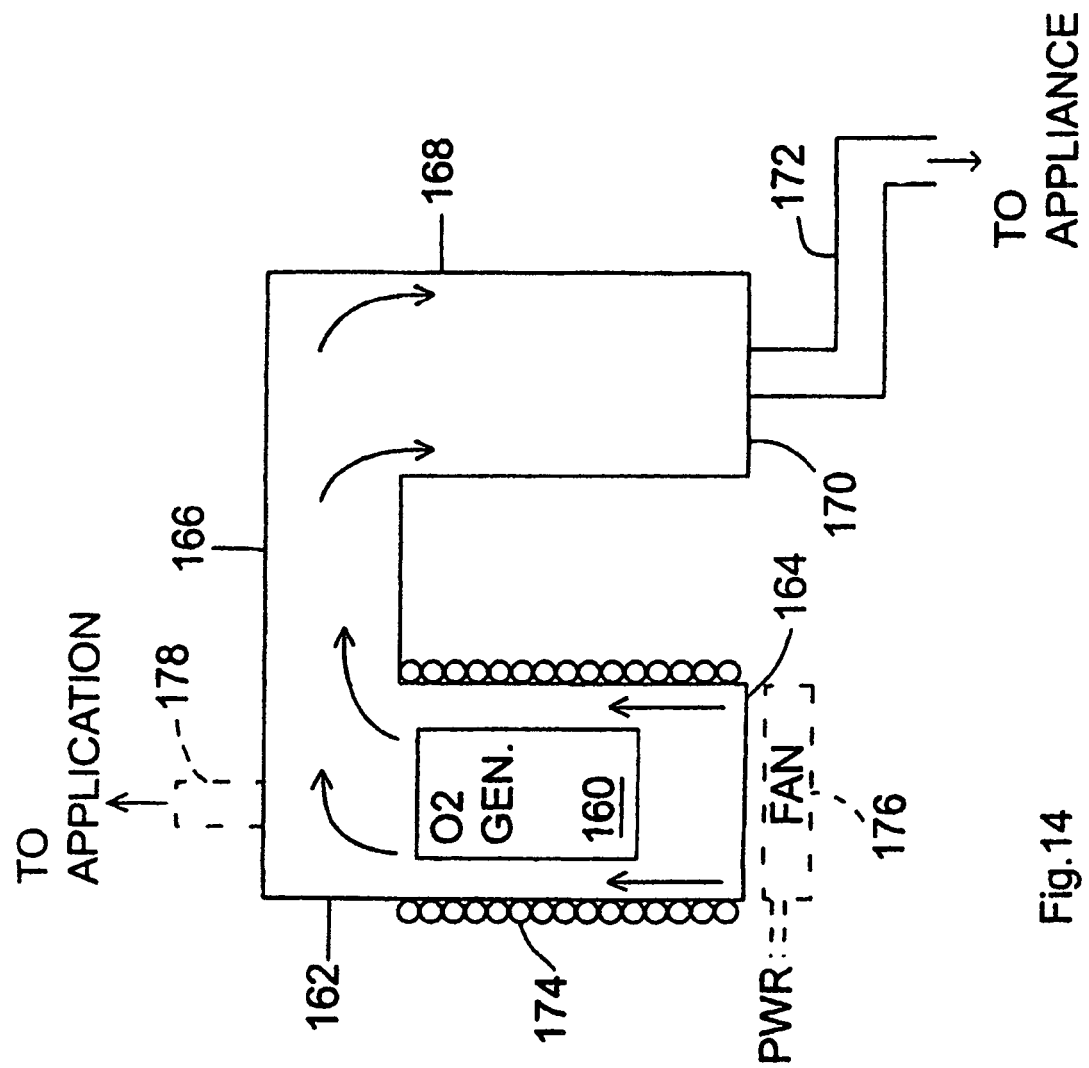
FIG. 14 is one embodiment of an ozone generator utilizing a chimney effect to move air therethrough.

In another embodiment of an ozone generator, and as shown in FIG. 14, an ozone generator 160, which may be a corona discharge ozone generator or a ultraviolet light type ozone generator as described above, is positioned or mounted in a vertically oriented housing 162 having a generally open bottom 164. A top region 166 of housing 162 communicates with a downwardly extending housing 168. A bottom region 170 of housing 168 may be open, or may be connected to a tube 172 through which air containing ozone is provided to the article to be sterilized or sanitized. In this embodiment, a chimney or convection effect is used to draw air upward past the ozone generator and into housing 168, where the ozonated air is cooled, causing it to sink to the application. As such, heat developed from operation of the ozone generator causes air to rise past the ozone generator 160 and into communicating member 166. In some instances, a heating coil 174 may be wrapped around housing 162 to increase the chimney effect from heating, or a coil with water circulating therethrough may be wrapped around housing 168 to increase cooling of the air. Additionally, a fan 176 (dashed lines) may be located at the opening 164 of housing 162 in order to increase air moving through the apparatus. In yet another embodiment, the housing 162 may be used by itself with an ozone generator 160 therein, with heated ozone-containing air being passed from a tube or connection 178 (dashed lines) at an upper end of housing 162.

As stated, as ozone is heavier than air, the ozone in the air tends to settle through housing 168 and emerge at the open end 170 thereof or settle into tube 172. In this type of ozone generator, airflow past the ozone generator portion is relatively slow, which tends to develop a relatively high concentration of ozone that provides optimum sterilization and oxidation of bioslime and associated organisms. Thus, such an embodiment is useful where out gassing from the application is a concern.

The embodiment of an ozone generator as shown in FIG. 14 is useful inasmuch as it does not require an air pump to move air past the ozone generator portion of the apparatus and subsequently into plumbing and air tubes of a jetted tub, hot tub, spa or other similar facility. Further, as stated, this embodiment of an ozone generator provides a low rate of airflow, perhaps ⅛ to ½ liter per minute at a concentration of 300-50 PPM. As the ozone is recirculated, the concentration rises to levels required to oxidize bioslime.

In other anticipated uses, such a convection driven ozone generator may be used to provide ozonated air having a relatively high concentration of ozone to a shower head 180 and associated plumbing 182, as shown in FIG. 15. Here, a convection driven ozone generator 184 draws a low rate of air flow as described by a chimney effect into a bottom thereof, as indicated by an arrow, with the heated air rising through a tube 186 and through a check valve 188 to the plumbing 182 and shower head 180. FIG. 16 shows an embodiment similar to that shown in FIG. 15 except a venturi 190 is shown connected in the flow of water to shower head 180. In this embodiment, ozone would also be provided to sanitize water emitted from the shower head. As described, when the shower is not in use, the ozone would tend to settle into the plumbing 182, displacing air within the plumbing down to a point where a selection valve is typically located that switches water flow from the tub to the shower head. This sanitizes the interior of such plumbing and oxidizes any bioslime that forms. This embodiment is ideal for shower installations such as in hospital rooms, motels, hotels and the like where the showers may not be used daily. Even where the showers are used daily, such as in a residential application, such an installation would maintain plumbing in a sanitized condition. In the embodiment of FIGS. 15 and 16, the ozone generator may be continuously energized, or operated by a timer for selected periods of time. For example, a timer may be reset by a pressure switch within a shower head or riser such that an ozone generator is automatically energized to operate for a period, say 30 minutes to 1 hour, after a shower. As stated, out gassing of ozone through the shower head would be minimal due to the low air flow through the ozone generator and settling of the ozone into the plumbing. In this instance, the ozone generator may be restricted or otherwise constructed to provide an airflow through the ozone generator of from about 0.01 to 0.5 liters per minute at 30-40 PPM or so depending on a power rating of a combined ballast and lamp in an ultraviolet ozone generator or corona-type ozone generator. In addition, such an embodiment is useful to provide relatively high concentration of ozone to a water circulation system of a spa, hot tub or the like, particularly where flap-type valves are provided to block the water outlets and a cover is used to block the water inlet. Here, if the ozone is provided at a highest point in the water circulation system, outgassing is minimized because the pooled ozone in the water circulation system would simply back up to the ozone generator, where it would generally stop airflow therethrough, limiting leakage of ozone into the tub area. In some embodiments, a frequency doubled laser diode or vertical cavity surface emitting laser (VCSEL) device or array capable of emitting ultraviolet radiation in a wavelength range from about 170 to 210 nm, as disclosed in Applicant's patent application Ser. No. 11/190,186, now abandoned, which is hereby incorporated herein by reference in its entirety, may be used for generation of ozone in order to eliminate a need for a high voltage ballast output in a vicinity of a shower or other plumbing.

FIG. 17 shows a convection driven ozone generator 184 as described in the foregoing connected to provide ozone via a tube 192, 194 to a tank portion and bowl portion 196, 198, respectively, of a toilet. Significantly, tube 192 in toilet tank 196 is of a length so that the tube 192 extends downward into the tank to a point above a water level W2 that the water drops to at its lowest point during flushing. In this embodiment, heated air would rise through ozone generator 184 and, when tank 196 is filled with water to water level W1, i.e. blocking tube 192, ozone flows through tube 194 and settles into toilet bowl 198, thus sanitizing, toilet bowl 198. During a flushing operation of the toilet, the water level in the tank 196 and tube 192 drops rapidly, drawing an impulse of ozonated air through tube 192 and into toilet tank 196. In this manner, sanitizing ozone may be provided to a toilet tank 196 during a flushing operation, where it is constrained, and continuously to a toilet bowl 198. Where a buildup of ozone concentration in a rest room, or energy conservation, are of concern, a switch or piezo-electric signal generator integrated into a toilet seat, an infrared detector, or a signal from an existing infrared sensing flush valve may be used to reset a timer such that an ozone generator is energized while a toilet is being used, to provide ozone for a toilet tank 196 during a flush, and to the toilet bowl 198 for a period thereafter, e.g., 30 minutes.

In another embodiment for use with a jetted tub, reference is made to FIG. 18. Here, a convection driven ozone generator 200 is shown having a vertically oriented housing 202 containing an ultraviolet lamp 204 and associated ballast 206, or alternately a corona ozone generator. A timer 208 may be used to provide power to the ballast at timed intervals. Air heated by ballast 206 and lamp 204 rises and exits at tubes or fittings 210, in turn coupled to air plumbing and water plumbing (diagrammatically illustrated as dashed lines) of a jetted tub. In addition, ozone-containing air from ozone generator 200 may, but not necessarily, be provided to a venturi 212 for mixing ozone into water of the tub or spa. In this embodiment, and as described in the foregoing, ozone generator 200 provides a low air flow of a higher concentration of ozone when the jetted tub is empty of water, and a lower concentration of ozone to water if used in this manner when the tub is in use. Thus, outgassing of ozone when the tub is not in use is largely prevented due to the low air flow rate, and when the tub is being used, outgassing is minimal due to the lower concentration of ozone provided to the water. As stated, this ozone generator may be allowed to operate continuously or during intervals as determined by timer 208.

In use, and referring to FIG. 1, as a user of a jetted tub begins to fill the tub 10, sensor 40 detects the presence of water filling the tub, and provides a signal to timing circuit 38. Circuit 38 is initialized responsive to the signal from sensor 40, or a signal from a switch, thermocouple, acoustic sensor, fiber optic sensor, piezo-electric device, or other sensor or signal generation device integrated with a faucet or other element of a particular installation to indicate the beginning of the filling of the tub, and provides an energizing current to ozone generator 28 and pump 30, which begin to pump a higher concentration of ozone into the water and air conveying tubes of the tub. With the flaps of the various valves covering the jets and air valve 24 closed by the user, ozone concentration rapidly increases within the tubes of the tub, serving to immediately sterilize the interior of these tubes and oxidize contaminants therein prior to water filling the tub. Any positive pressure building up in the tubes is released by at least one of the flaps briefly opening by the pressure to relieve the pressure. Timing circuit 28 may be set to cause ozone generator 28 and pump 30 to operate after the tub is filled, sterilizing the water as it is circulated through the tubes. Alternately, as described, a switch may be used to activate ozone generator 28 and pump 30 prior to use. As sensor 40, or a switch incorporated into a drain lever, may also detect when the tub is emptied, the timing circuit may be set to operate ozone generator 28 and pump 30 for a short interval after the tub is emptied, insuring the tubes are sterilized and any bioslime oxidized after use. Where a switch is used, generator 28 and pump 30 may simply be left ON for a period of time after the tub is drained. Circuit 38 or a switched embodiment may further incorporate a clock/timer in order to operate ozone generator 28 and pump 30 on a daily basis for a relatively short interval, such as 15 minutes or so, at a time when the tub is not in use, such as in the middle of the night or during the day, so as to daily sterilize the tubes at a preset time.

In the instance of a spa where the water is maintained in a manner similar to a swimming pool, timing circuit 38 may be set to energize ozone generator 28 and pump 30 for a preset period of time upon activation of pump 12, i.e. when the spa is in use. Additionally, a clock/timer as described above may be set to initiate operation of pump 12, ozone generator 28 and pump 30 for a preset interval on a daily basis in order to sterilize water in the spa. Additionally, when the water is changed, a sensor 40, float switch, a manual switch, or other means as described above may be incorporated to energize an ozone generator to produce ozone at a higher concentration to sterilize the tubes and oxidize contaminants when the spa is emptied of water. Additionally, the ozone generator as described may be used in combination with conventional sanitizers to sterilize water in a hot tub or spa.

The embodiment of FIG. 2 would operate as described above, with the user selecting a particular aroma or scent to be imparted into the air over and around the tub. As described, to change the aromatherapy, the user merely opens closure 52 and unscrews one housing 64 containing one aromatherapy and replaces it with another housing 64 containing a different aromatherapy, after which the ozone generator and pump would be ready for operation. In this embodiment, the ozone flowing therethrough would also keep the environment of the aromatherapy structure sterile.

In order to sterilize the tubes of the tub or spa using the embodiment of FIG. 3, air valve 24 is closed and switch 100 operated to energize generator and pump 98. This pumps a higher concentration of ozone into the empty pipes and tubes of the tub. After the tub is filled, valve 24 may be opened to provide a mix of ozone and air to water of the tub, although less diffusion of ozone into the water in the tub would occur due to larger bubble size, as earlier described. Operation of the embodiments of FIGS. 4-18 is as described in the foregoing.

Referring now to FIG. 19, a schematic diagram of a stand-alone ozonating and sanitizing system is shown. The term "stand-alone" refers to an integrated system that may be simply attached, to a hot tub or spa without disturbing existing plumbing thereof. Here, referring to lines 300 and 302 of FIG. 19, line 300 is a return line to the spa and line 302 is a suction line through which water is drawn from the spa. As such, the only modification to a spa for installation of the systems of FIG. 19 and FIG. 20 is to cut openings for lines 300 and 302. In some embodiments and installations, suction and return lines may simply be dropped over a side into a tub or spa, preferably on opposite ends/sides, so as to promote transverse flow across a tub/spa. While the embodiments of FIGS. 19 and 20 are primarily intended for and sized to use in conjunction with a hot tub or spa wherein water is maintained for longer periods of time, such as a month or so, these systems may also be constructed on a larger scale for use with swimming pools.

Initially, a water pump 304, which may be a relatively small capacity circulation pump of about 5 gallons per minute, draws water from the spa through line 302. However, the water so drawn is not routed directly to a suction side S of pump 304. Rather, the water is drawn, as a motive flow, through a venturi 306 incorporating check valves 308 and 310, such a venturi being disclosed in Applicant's U.S. Pat. No. 6,192,911, which is hereby incorporated herein by reference in its entirety. Venturi 306 serves to mix ozonated air from ozone generator 312, which may be configured as shown in Applicant's patent application Ser. No. 09/717,904, filed Nov. 20, 2000, now U.S. Pat. No. 6,426,053, which is hereby incorporated herein in its entirety by reference. The motive flow from venturi 306 then passes to a T-fitting 314 where chemicals including sanitizing compounds are mixed with the motive flow. Advantageously, potassium bromide may be used, which is not a dangerous chemical to transport via conventional, inexpensive transport services. Likewise, sodium bromide may also be used, which is also transportable by conventional transport services, and alternately, sodium hypochlorite may be used. From T-fitting 314 the motive flow passes through a contact region 316, which may be tubing arranged in a serpentine configuration as shown, or the contact region 316 may be configured as shown in Applicant's patent application Ser. No. 09/752,982, filed Dec. 31, 2000, now U.S. Pat. No. 6,623,635, which is incorporated in its entirety herein by reference or Applicant's patent application Ser. No. 09/794,601, filed Feb. 27, 2001, now abandoned, also incorporated herein by reference in its entirety. From contact region 316 the motive flow passes into an air-removing column 318 where outgassing from the motive flow is removed. Column 318 may be configured as shown in Applicant's patent application Ser. No. 09/418,915, now U.S. Pat. No. 6,342,154, which is hereby incorporated herein in its entirety by reference. As a feature of the latter referenced patent, a float or similar valve 319 closed when a water level in the column was raised to a level where it would exit valve 319. In the instant embodiment, float valve 319 is normally open, with the outgassed air and ozone being drawn through a cross-connection 323, ozone generator 312, and back into the motive flow at venturi 306. This forms a closed-loop system with respect to outgassing. At cross-connection 323 a bleed check valve 324 and a make-up biased check valve 325 is provided, valve 325 having a selected bias of about 8 psi. Valve 324 serves to allow positive air pressure within the system to bleed off after the system is powered down. Make-up check valve 325 allows entry of air into the ozone generator to "makeup" for air dissolved or diffused into the motive flow. An optional check valve 317, oriented to prevent flow from make-up check valve 325 to column 318, may be added in the line between column 318 and cross-connection 323, preferably between float valve 319 and cross-connection 323 to enhance stability of operation and reduce risk that a pressure transient could cause valve 325 to be pulled open by suction of pump 304, allowing air from valve 325 into column 318, and thereby disrupting flow of water from contactor 316. From column 318 the motive flow is drawn into the suction side S of water pump 304. The flow is discharged from pump 304 at the discharge side D to a T-fitting 320, one side of T-fitting 320 providing flow to the spa via line 300 and the other side of fitting 320 coupled via a check valve 322 and line 321 to a chemical dispenser 326 holding at least a slow-dissolving sanitizing compound. Lines 321 and 328 are open to the sanitizing compound in dispenser 326, with water simply being exposed to the compound as it flows between lines 321 and 328. Dispenser 326 may be configured with a removable cartridge holding the sanitizing compound so that when the cartridge is removed, air is drawn into the motive flow through line 328 to fitting 314. This switches pump 304 "off", as will be described. Alternately, dispenser 326 may be configured with a removable, sealed lid or top that when removed also breaks the suction to fitting 314 to switch pump 304 "off". Alternately, an electrical switch may be incorporated in the dispenser to switch pump 304 "off" when the dispenser is opened. Check valve 322 is a biased valve requiring at least ½ PSI or so to open. However, as line 300 from discharge side D of pump 304 is sized to be nonrestrictive of water flow with respect to pump 304, the pressure required to overcome the bias of check valve 322 is developed by suction side S of pump 304 via column 318, contact region 316, connection 314 and lines 328 and 321. In addition, the pressure at which check valve 322 opens regulates flow of water through chemical dispenser 326. Thus, the bias of check valve 322 is carefully selected to mix an optimum quantity of dissolved sanitizer with ozonated water at T-fitting 314 so as to provide about 0.5 PPM of residual chlorine or about 0.1 PPM bromine in the water. Of course, other proportions of a halogen and ozone may be used, but it has been found that 0.5 PPM for chlorine and 0.1 PPM for bromine is generally optimal where the halogen is combined with ozone. Completing the system is a flow switch 330 coupled in line 300 back to the spa. Switch 330 is conventionally coupled (not shown) to provide electrical power to pump 304 as long as water flow from pump 304 is maintained. In addition, switch 330 incorporates a timer to provide a time delay of approximately two minutes or so within which chemicals may be provided to chemical dispenser 326 and the dispenser sealed, this time delay also serving to allow air to bleed from the system, as will be described.

During operation of the embodiment shown in FIG. 19, water drawn through tube 302 under influence of the suction side S of pump 304 initially passes through venturi 306 where ozonated air from ozone generator 312 is mixed with the water. As stated, air is drawn through ozone generator 312 from either or both make-up check valve 325 or the outgassing of column 318 from float valve 319. This is advantageous in that outgassing to atmosphere from column 318 is eliminated. In addition, where a corona ozone generator is used, design of such an ozone generator for use in such a humid environment would be such that there is no metal to be corroded by products generated by the arc discharge. In other words, the interior of this ozone generator would be mostly ceramic, plastic or other similar substances. While ozone output of this generator would be reduced by high humidity, this would also serve to hold the output of the ozone generator relatively constant. In addition, while the ozone output is lower, substantial quantities of hydrogen peroxide and hydroxyl radicals are produced, increasing reaction dynamics in the water that increases oxidation destruction of contaminants and organisms in the water. Further, in a closed loop system as disclosed above, argon concentration in the offgassing is gradually increased as oxygen is converted to ozone, which increases efficiency of the corona generator.

On the discharge side D of pump 304, sanitized water is returned to the spa via tube 300, with some of this water passing through check valve 322, which as described, is biased to provide a selected water flow to chemical dispenser 326, where the water is provided with sanitizer. From dispenser 326 the sanitizer-containing water is provided to T-fitting 314. Here, this sanitizer-containing water is drawn into the ozonated motive flow as a result of suction from suction side S of pump 304. The sanitizer and ozone are allowed to react with each other and with the water in contact region 316, after which the water passes to gas removal column 318, which functions generally as described in Applicant's referenced U.S. Pat. No. 6,342,154. During operation of the system, if the chemical cartridge or lid is removed from chemical dispenser 326, the suction in line 328 is interrupted, rapidly permitting line 328, contact region 316 and column 318 to be evacuated of water and fill with air. Simultaneously, interruption of the suction causes biased check valve 322 to close, diverting all the evacuated water from column 318, region 316 and line 328 to the spa via line 300 and preventing water from entering chemical dispenser 326. When a level of water in column 318 is evacuated to a point where air is drawn into suction side S of pump 304, causing pump 304 to cavitate, flow switch 330 interrupts electrical power to pump 304, switching it "off". Concurrently, the two-minute time delay is initiated. During this time delay, water from the spa enters the system via line 302 and slowly fills contact region 316 and column 318, with air therein being released or bled via check valve 324. With this construction, the system is self-priming after replenishing chemical dispenser 326. After expiration of the 2-minute time delay, and assuming that dispenser 326 is refilled and sealed, flow switch 330 applies electrical power to pump 304, initiating operation of the system which proceeds as described in the foregoing.

While potassium bromide, sodium bromide, potassium chloride and sodium hypochlorite are disclosed by way of example as sanitizing chemicals used in the chemical dispenser, other chemicals such as sodium bicarbonate, magnesium sulfate heptahydrate, (epsom salts) copper sulfate and ph buffering compounds may be included along with sanitizing compounds in the chemical dispenser either separately or in any combination. In other instances, Baquisil-type enzyme sanitizers may be used. In all these instances, the ozone reacts with the various compounds in the contact region to form energetic residual compounds (ozonites) such as hydroxyl radicals and other biologically and chemically energetic molecules. These compounds and radicals are generally slower to react than the ozone, and thus are passed to the immersion facility as a residual where they sterilize water in the facility. As a result, while the water may have a chlorine residual of about 0.5 PPM just after fitting 314, water returned to the spa typically has almost no chlorine or ozone content until the organic content and other contaminants in the water has reacted with ozone and ozonites, at which point the halogen content in the spa rises as ozone breaks down the chloramines or bromamines and releases free chlorine or bromine. Even then, as ozone reacts almost immediately with compounds in the water to form ozonites, the energetic ozonites are passed to the immersion facility as a residual, thus providing a sanitizing action in the facility without ozone actually being present. Such a sanitizing action by ozonite residuals in the immersion facility is inherent in all embodiments disclosed herein. In other embodiments lacking a chemical dispenser, chemicals may be added manually. As described, the ozone reacts with bound halogen contaminants, such as chloramines and corresponding bromine compounds, to release the halogen and precepitate the contaminant as a solid that may be removed by filtering.

FIG. 20 illustrates a similar system, one wherein a water circulation pump 350 draws water to suction side S via a line 352 and a safety valve 354 from a spa. Valve 354 operates to allow air into pump 350 in the event an inlet to line 352 becomes blocked. On the discharge side D of pump 350, water is provided as a motive, pressurized flow to venturi 356 as described in Applicant's referenced patent. On one port A of venturi 356, a check valve 358 allows ozonated air from ozone generator 360, which may be as described in the referenced patent application for FIG. 19, to be mixed with the motive flow of water. Check valve 358 is a biased valve, with the bias carefully selected so as to provide a proper proportion of ozonated air (with respect to sanitizer) to venturi 356 as described for FIG. 19. To the other port B of venturi 356 is provided via line 361 a flow of water containing sanitizer from chemical dispenser 362. From venturi 356 the motive flow passes to contact region 364, which may be as described for FIG. 19 in Applicant's referenced patent application, and from contact region 364 the motive flow passes to air separator column 366, also as generally shown in Applicant's referenced patent as described for FIG. 19. From column 366 the flow water is returned via line 368 to the spa. A float valve 370 operates with column 366 to close when water raises to a level where it would otherwise exit valve 370. As described above, water in air separator column 366 may only occasionally rise to this level, at which point some water may pass, or "sputter" through valve 370. From there, it passes via line 372 to T-fitting 374 where the water flows via line 376 under influence of gravity to the venturi and is drawn into the motive flow. Otherwise, outgassing in column 366 is passed via normally open float valve 370 via line 372, fitting 374 and line 378 to an air cavity 380 in chemical dispenser 362. Cavity 380 is open to atmospheric pressure via an inlet 382. Thus, fitting 374 serves as a second separator that separates water from air, passing water downward to venturi 356 and air upward through line 378 to air cavity 380. Here, the outgassing is drawn via line 384 through ozone generator 360 under the influence of suction from venturi 356. Air inlet 382 communicates between cavity 380 and the atmosphere, and allows extra air (makeup air) into the system as air and ozone are dissolved and diffused into the water. A biased check valve 386 having a bias of about one pound or so is provided in line 376, this valve remaining normally closed in the event no water is flowing through line 372. A combination of weight of the water in line 376 and suction from port A of the venturi occasionally causes check valve 386 to open, draining any water in line 376 to the venturi. At air separator column 366, a biased check valve 388, which may be biased with about ½ pound, opens when the suction from the venturi reaches this level. With valve 388 open, water is drawn via line 389 through check valve 388 into chemical dispenser 362 which holds a quantity of slow-dissolving sanitizer as described, and where it provides dissolved sanitizer to the water. As stated, this sanitizer may preferably be potassium bromide, sodium bromide or alternately sodium hypochlorite, or any other sanitizing or other compound that beneficially reacts with ozone. The sanitizer-containing water drawn through line 361 is provided to venturi 356 where the sanitizer and ozonated air are simultaneously mixed and provided to the motive flow. A normally closed check valve 390 opens when the chemical dispenser is opened, as will be explained.

Operation of the embodiment as shown in FIG. 20 is such that water from the spa drawn through line 352 to suction side S is passed to discharge side D to venturi 356. Ozonated air and sanitizer-containing water are mixed at venturi 356, with a proportion or ratio of ozonated air to sanitizer-containing water determined by a carefully selected bias of valve 358. As stated above this bias is selected so as to provide a residual halogen level of about 0.5 PPM just after venturi 356 as described, although other ratios may be used. The motive flow containing sanitizer and ozonated air is passed to contact region 364, where the sanitizer, ozone and water are allowed to react. From the contact region the flow is passed to air separator 366 where outgassing is provided via float valve 370 to fitting 374 where it is drawn into air cavity 380. It should be noted that air cavity 380 is separated, typically by a wall, from the chemical dispenser. The outgassing is drawn through ozone generator 360 and passed to venturi 356, thus forming a closed-loop system with respect to outgassing. Any water that passes through float valve 370 is returned via fitting 374 and check valve 386 to venturi 356. Water is also drawn under influence from venturi 356 from air separator 366 via biased check valve 388 to chemical dispenser 362. The water then takes up selected qualities of sanitizer, as determined by flow rate through the dispenser and the rate at which the sanitizer dissolves, with this sanitizer-containing water provided to venturi 356 via line 361 where it is mixed with ozonated air and water as described. Unlike the embodiment of FIG. 19, when the chemical cartridge is removed or the lid to chemical dispenser 362 is opened, water pump 350 is not de-energized. Rather, breaking the suction from venturi 356 causes biased check valve 388 to immediately close, terminating water flow to chemical dispenser 362. Also, check valve 390 opens and check valve 358 closes due to breaking of the suction, which causes both ports A and B of the venturi to initially evacuate water from the chemical dispenser and line 361. After the water is evacuated, venturi 356 simply draws air in ports A and B through the open chemical dispenser 362 via line 361 while water from air separator 366 is pumped back to the spa via line 368. When the chemical dispenser 362 is sealed after refilling with sanitizer, suction from venturi 356 is again felt in line 361, opening biased check valve 388, check valve 358 and closing check valve 390, again drawing water therethrough and through chemical dispenser 362 to venturi 356. Upon opening of check valve 358, ozone is again drawn from ozone generator 360.

In yet other embodiments of sanitization systems for pools, spas, hot tubs and the like, collectively enumerated hereafter as "immersion facilities", it has been found that in some situations electrical switches and solenoid valves may be more reliable and exert more positive control than embodiments that only utilize float valves. In addition, different manufacturers of hot tubs, spas, whirlpool tubs and swimming pools each use different pumps, tubing types and sizes, filters, heaters and different configurations for connection of their equipment. Further yet, different manufacturers have different requirements for connecting an ozone/chemical dispensing system to their spas, hot tubs, whirlpool tubs and pools. Some allow tapping into the suction and pressure sides of their pumps, in which case a bypass system may be used, and in other cases the manufacturer will not allow any modification of their equipment. In this instance, a self-contained stand-alone or retrofit system must be used. In addition, due to the different flow rates and configurations of tubs, spas and pools manufactured by different manufacturers, a pressure side system wherein water is pumped through a mixing venturi may work better in some systems while a suction side system that draws water through a mixing venturi may work better in other systems. Accordingly, Applicant proposes a suction side system and a pressure side system, each of which may take many forms, and each of which may be operated as a stand alone system, retrofit system or a bypass system. This lends flexibility to Applicant's systems in that any particular ozone and sanitizer system may be tailored to virtually any of the whirlpool, spas, hot tubs and pools manufactured today. In addition, it is generally undesirable to allow gas bubbles from the process of mixing ozone into the water from passing through the water pump and into the immersion facility. Bubbles in a pump can cause cavitation that may erode parts of the pump and tubing, and in instances where the immersion facility is enclosed, as in an enclosed recreational facility, any bubbles containing ozone may create an unacceptable buildup of ozone in the immersion facility enclosure.

Initially, and as shown in FIG. 21, a first such sanitization system for an immersion facility is a bypass system for providing ozone and sanitizer to the water of the immersion facility. Operation of this system entails a closed loop wherein chemicals are typically provided by a chemical dispenser system 430 to provide sanitizing and other beneficial chemicals to the immersion facility via a chemical feeder containing an erosion cake or other slowly-dissolving cake of beneficial and sanitizing chemicals. Alternately, a liquid sanitizer dispenser may be used. In addition, ozone is also provided in a closed loop between the reservoir and mixing venturi in order to eliminate bubbles containing ozone from passing into the immersion facility through the pump and in water circulation lines providing filtered and sanitized water to the facility. As such, this embodiment is ideal for an indoor immersion facility. Further, all the components may be built into a single housing, such as one of the housings described in my patent application Ser. Nos. 10/701,310, filed Nov. 4, 2003 now U.S. Pat. No. 7,186,334, and 10/668,504, filed Sep. 23, 2003, now U.S. Pat. No. 7,135,108, both of which are hereby incorporated herein by reference in their entireties. This makes the system easily retrofitted into an existing facility or installed during fabrication of the facility simply by tapping into the pressure and suction side water circulation lines of the water pump for the immersion facility.

In this system, and referring to FIG. 21, an existing water or circulation pump 400 for the facility draws water from the immersion facility through a suction side 402 and returns the water to the facility via a pressure side 404. Applicant's bypass system, a system coupled in a parallel configuration with water circulation lines going to and from the pump, in this instance is operated by a combination of pressure and suction from the pump, which as stated may be easily accomplished by using conventional T-connections and retrofit coupling fittings or saddle clamps to add a port to the suction tubing leading to the pump and the pressure tubing from the pump, respectively. Such saddle clamps may be as described in Applicant's patent application Ser. No. 11/137,890, filed May 26, 2005, now U.S. Pat. No. 7,329,343, hereby incorporated herein by reference in its entirety, or may be other conventional saddle clamps providing typically a ⅜ths inch to a ⅝ths inch internal diameter line, more of less, for a bypass flow. Connected as described, a venturi 406 receives at an inlet port 408 pressurized water from the pressure side 404. Venturi 406 may be a conventional multi-port venturi, a venturi as disclosed in my U.S. Pat. No. 6,192,911, which is incorporated herein by reference in its entirety, or a built-in venturi as described in my patent application Ser. No. 10/701,310, now U.S. Pat. No. 7,186,334, also incorporated herein by reference in its entirety. The pressurized water from pump 400 provides motive flow through the venturi. On outlet side 410 of the venturi the water flows through a contact region 412 illustrated as a serpentine path, which may be from about 4 to 8 feet or so in length, and within which ozone and sanitizer provided to the venturi are allowed to thoroughly mix with the water. Such a contact region is disclosed in the incorporated patent applications as noted above, and may be arranged as a counterflow path as described in the referenced patent. The contact region 412 empties into an air/water reservoir 414 containing a vial or tube 416 in watertight relation with respect to the interior of reservoir 414. Within vial or tube 416 are magnetically operated switches 418, 420, such as reed switches, that are operated by a magnet 422 affixed to a float 424. Float 424 may be maintained in a rotationally fixed orientation, as by a vertical guide (not shown) as should be apparent to one skilled in the art, so that magnet 422 is always positioned to reliably operate the reed switches. Otherwise, a toroidal magnet may be used in conjunction with an annular float, or any other float arrangement with a magnet may be used to operate the switches. However, other means, such as LEDs illuminating a mirror on a float which reflects a signal to upper and lower photocell detectors, depending upon float position, may also be used. In some embodiments, watertight tube 416 may be made wholly or partially of a material (e.g., selected glasses or quartz) that transmits ultraviolet radiation having a wavelength that will destroy ozone, and tube 416 may also contain a source of such ultraviolet radiation, such as a mercury vapor lamp that transmits 254 nm wavelength radiation, so as to promote advanced oxidation and ultraviolet germicidal action for enhanced destruction of contaminants within water and air containing ozone within reservoir 414, which also functions as a gas separator column. In some embodiments, tube 416 may be made of a material (e.g., high purity quartz) that also transmits ultraviolet radiation having a wavelength sufficiently short so as to create ozone (typically less than 210 nm), and may contain a source of such radiation, such a mercury vapor discharge lamp also enclosed in high purity quartz so that the 185 nm wavelength radiation emitted from a mercury vapor discharge is transmitted into water and air contained in gas separator reservoir column 414. Such a configuration will also create ozone, for example, within air or another oxygen containing gas in separator column 506 as well as provide advanced oxidation and germicidal action on contaminants in air and water in column 414. Similar optional modification may also be made in other embodiments described later herein.

The upper switch 418 is a normally open switch, and is positioned below the outlet from the contact region. The lower switch 420 is also a normally open switch, and is located above an outlet 426 of reservoir 414. Switch 418 is coupled to normally closed (NC) solenoid valve SV1, and switch 420 is coupled to both solenoid valves SV1 and normally open (NO) solenoid valve SV2. If necessary, amplifier circuitry or relays may be used in conjunction with the switches 418, 420 so as to minimize current flow through these switches, as also should be apparent to one skilled in the art. With this construction, as float 424 rises toward the top of vial or tube 416, switch 418 will be closed by magnet 422, in turn energizing solenoid valve SV1 open, and as float 424 falls to the lower region of vial or tube 416, switch 420 will be closed to energize solenoid valve SV2 closed and energize solenoid valve SV1 open. It is to be noted that operation of the lower switch 420 and solenoid valves SV1 and SV2 is a safety feature in the instance where too much air may be admitted into reservoir 414, as when a pool cleaner is connected to the system. During normal operation, make-up air will generally flow into the system as the air diffuses into the water at venturi 406. As will be explained, solenoid SV2, when closed by switch 420, blocks suction to the bypass system, shutting water flow through the reservoir down, while opening of solenoid valve SV1 allows water pressure in reservoir 414 developed by flow through the venturi to force excess air through the open solenoid valve SV1 and allow the reservoir to at least partially fill with water.

At outlet 426 from reservoir 414 the flow branches, with one leg 428 coupled to a sanitizer and chemical dispenser 430 via an adjustable valve 432. Valve 432 may be used to adjust the flow rate of water through dispenser 430 so as to provide a selected quantity of sanitizer, and where used, other chemicals such as baking soda for buffering pH of the facility and to generate hydroxyl radicals. This feeder may be configured for an erosion cake or a slow dissolving chemical cake that slowly dissolves or is eroded away to dispense chemicals into the flow of water. Alternately, a source of metered liquid sanitizer may be used with or without other chemicals as stated above. In any case, valve 432 allows for provision of a relatively constant, selected quantity of chemicals in order to maintain chemical balances in the immersion facility. In alternate embodiments, valve 432 may be omitted. A water line 433 from dispenser 430 provides the chemicals in solution to venturi port B.

The other leg 434 from outlet 426 of reservoir 414 initially passes through solenoid valve SV2 to the suction side 402 of pump 400. As stated, this leg 434 is coupled in parallel with water drawn by the pump from the immersion facility. Due to the pressure drop developed across the venturi while water is flowing through the venturi, the suction from the venturi side of the pump will be felt in reservoir 414 to a greater extent than pressure from the pressure side of the pump.

An air line 438 is coupled to a top 441 of reservoir 414 at a point wherein water will not enter the air line. This may be facilitated by a smaller reservoir or chamber (not shown) between the air line and reservoir 414 that initially receives any water "sputtered" upward, and which allows the sputtered water to drain back into reservoir 414. This line 438 leads to an inlet 442 of ozone generator 444 through which air from the reservoir is provided to the ozone generator. An outlet 448 of ozone generator 444 is coupled to venturi port A. A second line 446 coupled to top 441 of reservoir 414 is coupled to normally closed solenoid valve SV1, in turn communicating with external air, and which may lead, as by tubing not shown, to outside atmosphere.

In operation of this embodiment, power is initially applied to pump 400, simultaneously energizing ozone generator 444 and applying an energizing potential to reed switches 418 and 420. As water circulates through the immersion facility, ozone and air is drawn into venturi port A from ozone generator 444 and reservoir 414, and sanitizer in solution is drawn into venturi port B. As oxygen and air in reservoir 414 becomes depleted through diffusion into the flow of water at the venturi, the water level in reservoir 414 rises, carrying float 424 upward to a point where switch 418 is closed. When this happens, solenoid valve SV1 opens and allows the suction from pump 400 to draw water from reservoir 414 that in turn draws air through the open solenoid valve, causing the water level to fall and air to enter the reservoir. Typically, a water level in reservoir 414 would be maintained approximately as shown, or perhaps slightly higher, in the drawings, with the upper switches shown elevated for clarity. When float 424 falls to a point where reed switch 418 opens, solenoid valve SV1 closes to terminate air being admitted into reservoir 414, and the cycle repeats itself. Thus, as air and oxygen in reservoir 414 are dissipated into the water by the venturi, make-up air containing oxygen from the atmosphere is admitted into reservoir 414 via solenoid SV1.

In the event too much air is inadvertently admitted into the system, which may occur when an automatic mechanical pool cleaner is connected to the system or a water level in the facility is too low, float 424 falls with the lowered water level until switch 420 is closed. This energizes solenoid SV2 closed and energizes solenoid valve SV1 open. As stated, when solenoid SV2 is closed, flow of water from reservoir 414 is prevented from returning to pump 400, pressurizing reservoir 414 with water pressure from venturi 406 and allowing excess air to escape from reservoir 414 via the opened solenoid valve SV1. As the water level rises, float 424 rises, opening switch 420 and in turn opening solenoid valve SV2 and closing solenoid valve SV1. At this point, hysteresis cycling as described above resumes. In the event where foam is developed or sputtering into air line 438 occurs, a water separator 447 (dashed lines) may be located in line 438 to ozone generator 444, with the separated water being conveniently drained back to reservoir 414.

FIG. 22 illustrates another closed loop system except this system is coupled in series with the water flow. In this system, which may be a stand alone or retrofit system, the entire volume of water flowing through the system is pumped by a relatively small circulation water pump 500 (as compared to the powerful pump found in spas and hot tubs) through the system. Initially, water is drawn from the immersion facility by the suction side S of pump 500 through a venturi 502, a contact region 504 and water/air reservoir 506. The water is then returned to the facility via pressure side P of the pump through an optional flow switch 508. A small portion of the circulated water from pressure side P is applied to a chemical dispenser 512. As stated, dispenser 512 may be any type of chemical dispenser suitable for dispensing sanitizing and/or other beneficial chemicals. Particularly, and also as described, the dispenser may be configured to receive an erosion cake, other slow dissolving cake containing the chemicals or a liquid chemical feeder, and which may also include an adjustable valve 514 for regulating a quantity of chemicals provided to the facility as described in the foregoing.

Within reservoir 506, also as described, is a vial or tube 516 containing an upper, normally open magnetically operated switch 518 and a lower, normally open magnetically operated switch 520. A float 522 having a magnet 524 embedded therein is positioned to rise and fall with the water level within reservoir 506. As described above, float 522 may be maintained, as by a vertical guide, in a rotationally fixed position about tube or vial 506 so as to reliably operate the switches. Switch 518, when closed, is coupled to open a normally closed solenoid valve SV3 to admit external air into the system via an air line coupled between ozone generator 526 and valve SV4. Switch 520, when closed, is coupled to close a normally open solenoid valve SV4, closing an air line 528 that otherwise admits air containing ozone into reservoir 506.

Venturi 502, as described above, may be a conventional venturi, a built-in venturi or a multi-port venturi including a mixing chamber, with one port C coupled to receive ozone from ozone generator 526 and the other port D coupled to receive chemicals in a solution from chemical dispenser 512. As stated, the inlet side 530 of the venturi is coupled to the suction side of the facility from which water is drawn, with the outlet side 532 of the venturi coupled to contact region 504, which also as stated may be approximately 4 feet to about 8 feet in length, and is shown as a serpentine path that may be implemented as a counterflow system as described in the incorporated patents.

In operation, as the spa, hot tub, whirlpool tub or the like is being filled, as would occur during a change of water, a flow switch 508 may be used to disable activation of pump 500 until a water level in the facility reaches a level sufficient for operation. Such a flow switch may also be used in any of the described embodiments. At that point, pump 500 may be activated to begin circulation of water through the system. Water is drawn from the facility through venturi 502 where ozone is provided via port C and other chemicals are provided via port D. The water then is drawn through contact region 504 to ensure the thorough mixing of the chemicals and ozone with the water. The water is then drawn from contact region 504 into reservoir 506, and subsequently into pump 500. Pump 500 then pumps the water back to the facility, with a small portion of the water being diverted to chemical feeder 512. As stated, chemicals in a solution are provided from chemical feeder 512 to port D of ozone generator 526.

During operation, a water level, along with float 522, in reservoir 506 is typically near a top of the reservoir. When depletion of air occurs, the float rises to close normally open switch 518, in turn energizing normally closed solenoid valve SV3 to an open position to admit air into the system through normally open solenoid valve SV4. In turn, this causes a water level within reservoir 506 to fall due to the suction from pump 500. When the float 522 falls below a point that maintains switch 518 in a closed position, switch 518 opens to close solenoid valve SV3, shutting off flow of air to reservoir 506. Air is then gradually drawn through ozone generator 526 under the influence of suction from port C of the venturi. As air gradually diffuses into the water, float 522 rises to close switch 518 and admit more air into reservoir 506. This process repeats itself endlessly while pump 500 is activated.

At some point, too much air may enter the system, as by a foaming of the water, a leak, bubbles being drawn into the suction inlet or some other event. When this occurs, the excess air accumulates in reservoir 506, causing float 522 to fall to a point where switch 520 is closed by magnet 524. When switch 520 closes, energizing solenoid valve SV4 to a closed position, air circulation between ozone generator 526 and reservoir 506 is terminated to prevent large quantities of air from reaching the pump. At this point, only water is circulating through reservoir 506. Over a relatively short period of time, 5-10 minutes or so, turbulence within reservoir 506 and the air provided from the reservoir to the venturi creates sufficient diffusion so as to reduce the amount of air within reservoir 506 and causing float 522 to rise to a point where switch 520 is opened. This in turn allows air within reservoir 506 to again be circulated through ozone generator 526 and venturi 502, generating ozone that rapidly diffuses into the water. The other components of air, primarily nitrogen and carbon dioxide, also diffuse into the water although at a slower rate. As described, as air diffuses into the water from venturi 502, the water level rises in reservoir 506 until float 522 opens switch 518, allowing air into the system from solenoid valve SV3 and repeating the hysteresis process as described above to periodically allow make-up air into the system.

FIG. 23 illustrates a system generally identical to that shown in FIG. 22, with the exception that the system of FIG. 23 is connected in a parallel configuration as opposed to a direct connection as shown in FIG. 22. Here, FIG. 23 would typically be a stand-alone or retrofit application wherein water pump 500 may be a relatively small circulation pump, or may utilize the existing pump of a spa, hot tub or similar facility. As such, the system of FIG. 23 may or may not be self-contained within a package housing the other components depending mainly on the choice of which type of pump to use. Such a package would be sufficiently small so as to be installed in a spa, hot tub or whirlpool tub enclosure, as described in my referenced and incorporated patents and patent applications. As noted with respect to FIG. 22, a pressure drop across venturi 502 causes a suction from the pump to be felt in reservoir 506.

Likewise, FIG. 24 is a generally identical system to that shown in FIG. 21, with the water pump 400 venturi 410, contactor 412, and separator 414 coupled in series with water flow. This embodiment may be configured as a stand-alone retrofit as simple as a suction inlet pipe or hose leading from the immersion facility, with a return hose or pipe leading to the facility. As such, the system of FIG. 24 may be conveniently housed in a single package as described above. Where the embodiment of FIG. 21 may utilize a more powerful pump as is typically found with a spa, swimming pool or other such facility, the embodiment of FIG. 24 would typically utilize a smaller circulation pump, which as stated is connected in series to the immersion facility. As such, pump 400 draws water directly from the facility, with a return flow being from reservoir 414 via solenoid valve 436. In order to prevent reservoir 414 from being pressurized by a flow of incoming water, outlet 426 of the reservoir and downstream components may have a larger diameter than upstream components. This prevents water from being expelled from solenoid valve SV1 and into ozone generator 444. Operation is as described for the embodiment of FIG. 21 so that when float 424 rises and closes switch 418, solenoid valve SV1 opens to allow air into the system. As the outlet for this system is not coupled to the suction side of the pump but simply drains to the facility, reservoir 414 is mounted or otherwise positioned above a water level of the facility to prevent a siphoning effect from filling reservoir 414 and to cause water to drain from reservoir 414 to allow make-up air into the reservoir. When float 424 falls with a lowered water level within reservoir 414, solenoid valve SV2 is closed to restrict the water outlet and valve SV1 opened to bleed air so that water rapidly fills reservoir 414.

As described in the foregoing, the various embodiments of my closed loop system allow for versatility of installation and are easily accommodated by all spas, hot tubs, whirlpool tubs, swimming pools and any other similar immersion facility. In some instances, such as the embodiment of FIG. 24, installation may be as simple as connecting an inlet hose from the immersion facility to a package containing the system, which as stated may contain a small circulation pump, and connecting an outlet hose from the package to the immersion facility. The chemical dispenser portion may be accessed as by opening a door or lid on the package, or pulling out a cartridge containing the chemical feeder from an outside or inside of the package, as described in the parent case for this application. Where necessary, check valves may be installed to prevent water from backing up into air lines, such as between the venturi and ozone generator. In other instances, and as described, a water separator may be installed between the reservoir and ozone generator in any of the described embodiments to prevent water from entering the ozone generator by way of an air line.

In other applications of the aforementioned embodiments of ozone sterilization systems, and as stated, cooling towers for air conditioning and other equipment are known to be a source of Legionnaires disease. In some cooling towers there may be an open reservoir of water where water is pumped over a heat exchanger, and in other cooling towers the water is in a closed system. Either of these systems would benefit with installation of one of the ozone sterilization systems as disclosed above. Here, by way of example, the pump of the cooling tower may be connected in a bypass configuration as shown in FIGS. 21 and 23, or in a series configuration as shown in FIGS. 22 and 24. In any of these systems air bubbles are removed from the flow of water in the cooling tower system and through the pump as ozonites are provided to sterilize the system. A chemical dispenser may also be coupled to the system to provide sanitizing or other beneficial chemicals.

As with any electrical components, power and ground potentials are conventionally coupled to the solenoid valves and switches in accordance with the above-described functions, as should be apparent to those skilled in the art.

FIGS. 25a through 27 illustrate components and methods that may be used to provide means for injecting ozone in a gas mixture, which may be ozonated air, into intake lines associated with a jetted tub water circulation system when such lines are dry or at least not filled with water (i.e., lines may be moist but not filled, thereby providing an air or gas passageway, e.g., for a gas mixture including ozone in gaseous form). Such components and methods may also incorporate a water filter for filtering particulates and precipitates from water in the tub. Here, it is known that reactions of ozone with dissolved material in water causes precipitates to form, some of which being capable of discoloring walls of a bathing or immersion facility. FIG. 25a shows how a filter assembly 600 comprising an inner basket 610, filter media 620, and outer basket 630, and having an opening through which a hose for ozonated air may be inserted, may be placed over an existing inlet 640 in a wall 650 or a bottom of a tub, thereby creating a cavity 616 (FIG. 25b) wherein an ozonated gas mixture may be introduced via hose 614. Inlet 640 may employ safety features to prevent hair, straps, clothing, or other such materials from being drawn into inlet 640, thereby creating an entrapment and drowning hazard for users. A filter assembly of the instant invention may provide multiple functions, some of which aid implementation of a multiphase-phase treatment modality noted earlier herein. One function is to help contain low pressure ozonated air such that ozonated air, supplied to a cavity 616 (FIG. 25b) formed between filter assembly 600 and wall 650, before water is introduced into a tub, is generally forced to flow into a tube or other plumbing associated with inlet 640, while such plumbing is generally empty of water, thereby exposing bioslimes or other contaminants therein to ozonated air, or another gas mixture including ozone, in a gaseous ozone treatment phase of a single phase or multi-phase treatment modality. Filter assembly 600 should therefore be affixed to inlet 640 or tub wall 650 in a manner that helps contain ozonated air introduced therein, and which can withstand a small pressure differential that may be created in cavity 616 when ozonated air is being supplied thereto. Filter assembly may be affixed to inlet 640 or tub wall 650 using a removable or relocatable adhesive such as used on 3M™ Post-It™ notes, by using adhesive Velcro™ strips, magnets, by installing an attachment bracket to which a filter assembly may be clipped or otherwise mounted, or by other conventional means. For example, in order to help position and retain filter assembly 600 in a desired position while ozonated air is being introduced into cavity 616, and while a tub or spa is filling with water, rim 612 of an inner basket may be coated with a repositionable adhesive (e.g., similar to that found on 3M™ Post-It™ notes) having sufficient adhesion to hold filter assembly 600 and ozonated gas mixture supply hose 614 securely against a wall 650 of a tub, but which can be removed by hand and which preferably leaves no residue when removed. In some embodiments, another function of filter assembly 600 is to provide filtering of water after a tub, spa, or other vessel is filled with water and a circulation pump is activated so as to draw water into inlet 640. Filter assembly 600 must therefore be able to withstand forces associated with a pressure differential created across filter assembly 600 when a circulation pump is activated. In some embodiments, one or more spring-loaded or otherwise biased check valves or pressure relief valves, spring-loaded sections, doors, or flaps, seams that separate under a selected level of stress or pressure differential, or other pressure relieve mechanism 613 may be included in filter assembly 600 to prevent damage to filter assembly 600 or to circulation pump or other component if a filter becomes clogged or otherwise blocked. Filter media 620 may be of any conventional type capable of removing particulates and may be selected and sized so as to not unduly restrict flow of water through an existing circulation pump in a jetted tub or spa while removing most particulates inherently present in supplied water and/or those particulates precipitated by treatment of water with ozone as described herein. For example, a filter media similar to a paper coffee filter, as used in drip coffee-makers, has been found suitable for many applications, but other filter media, such as pressed fibers or open cell foams, or even porous materials such as sintered metals, plastics, or ceramics, could also be used. Inner basket 610 may be made of a screen mesh; a porous material such as Porex™ or a porous ceramic, including sintered metals, plastics, or ceramics; a formed sheet of metal, plastic, of other material having therein a plurality of openings through which water may flow; or of other materials and construction that will permit a flow of water through a supported filter media 620 while withstanding forces of a pressure differential created across filter assembly 620 when the tub is filled with water and circulation pump is activated. Outer basket 630 may be a generally rigid material, such as a screen, or other porous or sieve-like material, generally having larger openings than an inner basket, but in some embodiments, outer basket 630 may be a flexible material, such as a net (e.g., similar to a hair net), which may be held in place by a elastic band. In some embodiments, a filter assembly may have a form of a truncated cylinder, similar to construction of air filters found in older automobiles, and filter media may include fan-folds or similar features to increase surface area. In some embodiments, outer basket 630 may be omitted and a filter media 620 may also have an adhesive material around a rim of a filter and be made of a material sufficiently stiff to withstand a small outward pressure differential that may exist when an ozone generator and associated air pump are supplying ozonated air through ozone supply hose 614. In some embodiments, inner and outer baskets 610, 630, respectively, and filter media 620 may be made of a deformable material that deforms without significant resilience so that filter assembly 600 may be deformed to comply with contours in wall 650 when a user presses assembly 600 into place. In some embodiments, such inner and outer baskets 610, 630, respectively, and filter media 620 may be manufactured having shapes as needed to fit contours in specific models or types of tubs or spas from different manufacturers of tubs or spas. In embodiments described just above, inner and outer baskets 610, 630 would generally be used multiple times, but filter media 620 would generally be replaced or cleaned, as by reverse flow washing, after each use. In some embodiments, an additional layer or component 618 may be included to help prevent outward flow of ozonated gas introduced into cavity 616 while allowing inward flow of water after tub is filled and a circulation pump is activated. Such a layer or component 618, for example, may be made of a sheet of silicon rubber having ridges 619 (FIG. 25c) on an outward facing surface, so as to support filter media 620 with minimal blockage of water flow through filter, and having short slits 617 (e.g., ¼ inch to 1 inch long, more or less) cut between such ridges so that such slits are generally closed while ozone gas is being introduced at low pressure into cavity 616, but such that such slits may be pulled open by force of water flow after tub or spa is filled with water and a circulation pump is activated. The mesh size or other features of inner basket 612 may be increased or otherwise adjusted to accommodate such use of an addition layer 618 of material. In still other embodiments, filter assembly 600 may be made as an integrated or one-piece assembly such that it is economical to replace an entire assembly 600 after each use, or after a few uses. In such embodiments, for example, filter assembly 600 may be made of a sintered plastic material providing a desired degree of porosity and filtering while also providing sufficient structural strength to withstand forces of circulating water in application where filter assembly 600 is used to also filter water while a circulation pump is activated. In other such embodiments, a filter assembly 600 may be made of a porous or sieve-like material over which a separate filter, such as a paper filter, is placed. In some embodiments, in order to enhance a filter assembly's ability to help retain ozonated air within a cavity 616, an inner surface of a filter media 620 may be coated with, or a filter media may be impregnated with, a material 622 having a reduced permeability to ozone or to a gas mixture including ozone, especially when dry or only damp, but which material may also be water soluble or have other properties so that such material goes into solution and thereby, or otherwise, permits flow of water through filter media 620 when water is introduced into a tub or spa and a circulation pump is activated. For example, a water soluble sanitizer such as potassium bromide or sodium bromide or other sanitizer compound, or a water soluble gel including a water soluble aromatherapy compound may be used as material 622.

FIG. 26 illustrates another embodiment of a filter assembly 600a which may be used in some embodiments and installations of the instant invention. In this embodiment, an inner basket 610a preferably constructed of a plastic which may be injection molded, but which may also be constructed using other materials or techniques, so as to generally provide functions and features described above for inner basket 610, Filter media 620a may likewise have many of the features noted earlier for filter media 620, but may be affixed to inner basket 610a by use of a string or band 621a, which may be an elastic band or which may be a wire tie or a nylon cable tie, such as commonly used to bundle electrical wires together, or other similar device.

FIG. 27 illustrates yet another embodiment of a filter assembly 600b that may be used in some embodiments and installations of the instant invention. In this embodiment, a filter 620b made of a media that can help block or retard escape of ozonated gas from a cavity similar to cavity 616 (FIG. 25b) when ozonated gas at low pressure is provided to such cavity before a tub is filled with water, but which filter can sufficiently maintain its shape to provide effective filtering of water after a tub or spa is filled with water and a circulation pump pulling water into inlet 640 is activiated. In this embodiment, strips of material 612a including small hooks, such as used in a hook and loop fastener such as Velcro™, may be mounted, as by a repositionable or a semi-permanent adhesive, onto a wall 650 of a tub in various positions surrounding an inlet 640. Said hooks may engage fibers inherent in filter 620b so as to hold such filter in position over inlet 640 in a manner which also creates a cavity similar to cavity 616 (FIG. 25b) into which an ozonate gas may be introduced as before, or corresponding strips of loop fasteners may be adhesively or otherwise affixed to filter 620b so as to engage strips of hook fasteners mounted on a wall 640 (or a bottom) of a tub or spa. In other embodiments, positions of hook and loop fastener strips may be changed so that loop fasteners are on a tub wall and hook fasteners are adhesively or otherwise attached (e.g., stitched) to filter 620b.

FIG. 28 illustrates an embodiment of another ozone injection device 660 that may be used as part of an embodiment of the instant invention, particularly in a retrofit installation, to aid implementation of a two-phase treatment modality wherein, in one treatment phase, ozone in a gas mixture is pumped into plumbing lines when such lines are not filled with water in order to expose bioslimes and other contaminants to ozone when such bioslimes or other contaminants are in a dry or only moist state, wherein their susceptibilities to ozone may differ from susceptibilities when in a fully wetted state. In another phase of a two-phase treatment modality, bioslimes and other contaminants, including bacteria, spores, or oocytes swept from a bioslime by moving water, are exposed to ozone injected in water which is then allowed to flow through or stand in such lines, or in a tub or holding tank of a water holding facility. A device 660 such as illustrated in FIG. 28 may be inserted into or placed around a water outlet nozzle 645 of a jetted tub, spa, or other water holding facility and held therein or thereupon by friction, by an adhesive, by a clamp, or by other conventional gripping or sealing means, including, for example, compression and radial expansion of an O-ring or other sealing member between other members when brought together, as by threads or cams. Device 660 of FIG. 28 has features that support implementation of a multi-phase treatment modality, and is particularly suitable for a retrofit application of an ozone treatment system to an existing jetted tub or spa installation, but such features could also be implemented in a newly manufactured tub or spa. Features include provisions, such as a connection fitting 664 and passageway 666 for pumping a gas mixture including ozone at low pressure from a hose 668, which may be conventionally attached to fitting 664, into a chamber 662 communicating with tubing and/or other plumbing that provides water to outlet nozzle 645 when a circulation pump is activated. Another feature includes a valve 670 which may function as a biased check valve that generally retards outward flow of a gas mixture including ozone from chamber 662 so that such gas mixture is generally induced to flow into tubing and other plumbing components communicating with outlet nozzle 645, thereby exposing bioslimes or other contaminants therein to a concentration of ozone sufficient to cause oxidation or other sterilizing reactions. Chamber 662 communicates with chamber 663 via passageway 665, which may be shaped so as to enhance a Venturi effect, with respect to passageway 666 communicating with hose 668, when water from nozzle 645 is flowing outward through ozone injection device 660. Valve 670, communicating with chamber 663, may be a duck bill valve formed of silicon rubber or other suitable ozone resistant material, or valve 670 may be otherwise constructed (e.g., using spring-loaded flap or flaps, or spring-loaded cam operated iris valve, or having multiple flaps of a resilient material which normally touch or nearly touch so as to retard escape of fluid at low pressure, but which fold outward so as to permit flow of a fluid at higher pressure) so as to remain generally closed when a pressure difference between chamber 663 and atmospheric pressure external to valve 670 is low (e.g., being a few psi gage or less), but which opens wide so as to permit a nearly unrestricted full flow of water, preferably directly outward, into a tub or spa when a circulation pump is activated and water flows outward from nozzle 645 through chamber 662, passageway 665, chamber 663, and valve 670. In some embodiments, when circulation pump is activated and water is flowing outward through injection device 660, an inherent or enhanced Venturi effect may be used to draw a gas mixture including ozone from an ozone source such as described earlier herein into water flowing through device 660, thereby providing ozone to water in a tub, spa, or other water holding facility so that contaminants in such water, as well as contaminants which may still be attached to a interior of a pipe or other plumbing components in a water circulation path is also exposed to ozonated water. As noted earlier herein, an air flow rate through an ozone generator providing ozonated air or another gas mixture including ozone may be adjusted so as to deliver ozone at a lower concentration such that relatively more ozone is absorbed in water than is released into air in such an embodiment. A main body 667 of ozone injection device 660 may be formed generally of silicon rubber, plastic, metal, or other ozone resistant resilient or rigid material. Valve 670 may be formed integrally with main body 667 or may be a separate component conventionally attached to main body 667. Ridges, O-ring channels, or other conventional features may be incorporated within or conventionally attached to main body 667 to enhance placement and sealing of injection device 660 within or over nozzle 645.

FIG. 29 illustrates another embodiment of an ozone emitting device 680 that may be used to support a two-phase treatment modality by first injecting a gas mixture including ozone into a nozzle 645 and thus into plumbing components communicating therewith so as to treat bioslimes or other contaminants, as noted earlier, and then continue to emit ozone in bubbles into water in a tub or spa after a circulation pump is activated, so that pressure from such pump causes ozone emitting device 680 to be forced out of nozzle 645. Ozone emitting device 680 may be weighted, through selection of materials or via separate weights added thereto, so that device 680 generally settles toward a bottom of a tub or spa after being ejected from a nozzle 645, and may further include an optional drag flap 688. A purpose of drag flap 688 is to increase fluid flow drag on ozone emitting device 680 so that it may be drawn by motion of moving water near an intake (e.g., 640) of a jetted tub water circulation system after being ejected from nozzle 645 so that at least some of the ozonated gas bubbles and water with ozone may be immediately drawn into an inlet and thence into pipes, pumps, and other plumbing associated with a jetted tub, spa, or other water holding facility, thereby increasing a concentration of ozone in water flowing therethrough and thus efficacy in treating bioslimes and other contaminants. A secondary effect, which may be of benefit in some embodiments and installations of the instant invention, is that drawing ozone from emitters 680 into a water circulation inlet will lead to enhanced mixing of ozone in water and reaction with contaminants therein, thus reducing outgassing of ozone into air of an enclosure wherein a tub or spa may be located. A main body 682 of ozone emitting device 680 may be made of an ozone resistant, resilient material, such as a silicon rubber, and may be tapered, with optional ridges, so that it may be easily inserted into or upon a nozzle 645 and retained and sealably mated therein or thereupon by friction, by a mating of a resilient gripping ridge, grove, or other gripping region on an ozone emitting device 680 with a matching grove or ridge on or within nozzle 645, by inserting or otherwise installing into or upon conventional cylindrical surfaces of conventional jetted tub nozzles, or by another mating technique that provides characteristics described below. Friction or other mating technique should be sufficient so that device 680 is not dislodged by any small forces exerted on device 680 by pressure of a gas including ozone that may be provided at low pressure through hose 668 conventionally attached to a tube or passageway 684, and through a diffuser 686 communicating with such passageway 684, so that ozonated gas flows through diffuser 686 into tubing and other plumbing components communicating with nozzle 645. However, friction or other mating technique between ozone emitting device 680 and nozzle 645 should be low enough that device 680 is readily ejected from nozzle 645 and into a tub or spa when a circulation pump providing pressurized water to nozzle 645 is activated. An optional check valve 685 may be included in a flow path of ozonated gas to prevent backflow of water into an ozone generator, and to increase ejecting force, when a circulation pump is activated and water flows out through nozzle 645. However, the material used in the diffuser portion will normally present a much higher impedance to the flow of water than to flow of an ozonated gas, with a result that the diffuser itself will effectively serve as a check valve to prevent backflow of circulating water to an ozone generator before ozone emitter device 680 is ejected from nozzle 645 or another opening in which such emitter may be used to inject ozone into a line emptied of water. An optional ring 683 with optional ribs or ridges may be included in construction of device 680 to provide a friction fit and sealing to an outer surface of nozzle 645 in addition to, or instead of, a friction fit and seal on an inner surface of nozzle 645. Diffuser 686 may be made of porous stone, as use in an oxygen bubbles for an aquarium, or a sintered plastic, metal, ceramic, or other material, or other porous material, or a shell or barrier having a plurality of small openings, so that bubbles emitted therefrom, when diffuser 686 is located in water, are small. Porosity of diffuser 686 may be selected or adjusted to provide a suitable tradeoff between higher absorption in water of ozone from smaller bubbles and pressure needed to cause emission of a suitable quantity of ozonated gas through diffuser 686.

FIGS. 30*a* through 30*c* provide cross-sectional and exterior views of another embodiment of an ozone emitting device 680*a* that may be used in some embodiments of the instant invention, and FIG. 30*d* illustrates a hose attachment fitting 687 that may be used to attach a hose to emitting device 680*a*. In device 680*a* a molded plug 682*a* made of a resilient, ozone resistant material such as silicon rubber has cavities 681, 689 formed in ends thereof with a passageway 684*a* communicating therebetween. Cavity 681 accepts a hose connection fitting 687 (FIG. 30*d*) and cavity 689 accepts a diffuser, which may be made of materials as noted earlier so as to provide passage of a gas including ozone and to form small bubbles when such diffuser emits such gas below a surface of a body of water. In some embodiments, diffuser 686*a* may comprise a cylindrically shaped length of resilient material, wherein numerous small openings are formed, or which may be made of a sintered material, such as chips of silicon rubber, so as to provide porosity through which a gas mixture including ozone may be emitted as small bubbles. An outer end 669 of diffuser 686*a* is completely or partially sealed, as by crimping, adhesive, caulk, or by use of sintered or other porous material as used in other portions of diffuser 686*a*. An open, opposite end of diffuser 686*a* is held in cavity 689 by friction, adhesive, or other conventional means, so that a gas mixture including ozone may flow from passageway 684*a* into an interior of diffuser 686*7a* and be emitted therethrough. A weighted ring 687*a* and a drag flap 687*b* may be added in assembling ozone emitting device 680*a* for purposes noted earlier herein. Ridges 677*a*, 677*b* or other gripping regions may be of different diameters to accommodate sealing, as by friction fit, into nozzles 645 of different diameters, as may be used by different jetted tub or spa manufacturers. A groove 678 or other feature may be molded into or otherwise added to a shape of emitter 680*a* to permit grasping and manual removal of emitter 680*a* from a nozzle 645 if necessary.

FIGS. 31*a* and 31*c* provide different views of a different embodiment of ozone emitting device 680*b* wherein a molded plug 682*a*, as described earlier, is combined with a different diffuser 686*b*, which may be made of a sintered plastic, such as available from Porex Technologies, Fairburn, Ga., USA, or from other porous materials available from other sources. Diffuser 686*b*, FIG. 31*b*, may be bonded into plug 682*a* by an adhesive or by other conventional techniques that do not block or otherwise degrade flow of a gas into diffuser 686*b* and emission therefrom. Diffuser 686*b* may also be clamped within plug 682*a*, as by a ratcheting hose clamp, nylon tie, or similar conventional clamps. Diffuser 686*b* could also be formed with a shouldered edge or mating rim that secures with a mating recess formed within resilient plug 682*a*.

After having thus described my invention and the manner of its use, it is apparent that incidental changes may be made thereto that fairly fall within the scope of the following appended claims, wherein I claim

The invention claimed is:

1. A system for providing a multiphase treatment of biofilms and other contaminants in water circulation lines of an immersion facility wherein water is repeatedly circulated comprising:
   an ozone generator for generating ozone in a feed gas,
   means for promoting a flow of said feed gas through said ozone generator, generating an ozonated said feed gas, and,
   at least one ozone emitter coupled to said ozone generator and receiving said ozonated feed gas, said ozone emitter further comprising:
   an ozone receiving structure,
   a gripping region on said ozone emitter, said gripping region configured to sealably engage an opening in said water circulation line,
   and further wherein said gripping region is configured to allow said ozone emitter to be ejected from said opening when a water circulation pump is activated to force water from said opening,
   a diffuser in said ozone emitter for emitting said ozonated feed gas into said water circulation line when said ozone emitter is engaged in said opening,
   said diffuser having a much higher impedance for flow of water therethrough than for flow of a gas, thereby preventing water from entering said ozone emitter when said ozone emitter is submerged in said water.

2. The system of claim 1 wherein said ozone emitter is configured to sink in said water after being ejected from said opening.

3. The system of claim 2 wherein said ozone emitter further comprises a drag enhancing member to promote movement of said ejected emitter in a direction of water circulation toward an inlet of said water circulation lines.

4. The system of claim 1 further comprising a cover for an inlet to said water circulation lines, said cover configured for receiving said ozonated feed gas from said ozone generator and directing said ozonated feed gas into said water circulation lines while said water circulation lines are at least partially empty of water and subsequently while water is circulating through said water circulation lines.

5. The system of claim 4 wherein said cover comprises a filter material that generally contains said ozonated feed gas within said water circulation lines while said water circulation lines are at least partially empty of water but which permits flow of water and acts as a particulate filter when said water is circulating through said water circulation lines.

6. The system of claim 5 wherein said filter material is coated with a water soluble material that generally prevents passage of ozonated gas through said filter material before exposure of said coated filter material to water but which dissolves when exposed to water to permit flow of said water through said filter.

7. The system of claim 5 wherein said cover includes a pressure differential release mechanism to permit flow of water through said cover when flow through said filter material becomes too restricted.

8. The system of claim 1 further comprising a sensor operatively coupled to said ozone generator to provide said ozonated feed gas to said water circulation lines upon detection of conditions indicating said immersion facility is being filled or about to be filled with water for use.

9. The system of claim 1 further comprising an oxygen concentrator providing said feed gas to said ozone generator, said feed gas having an enhanced concentration of oxygen.

\* \* \* \* \*